US010574237B2

(12) United States Patent
Cocchi et al.

(10) Patent No.: US 10,574,237 B2
(45) Date of Patent: Feb. 25, 2020

(54) PHYSICALLY UNCLONABLE CAMOUFLAGE STRUCTURE AND METHODS FOR FABRICATING SAME

(71) Applicant: SypherMedia International, Inc., Westminster, CA (US)

(72) Inventors: Ronald P. Cocchi, Seal Beach, CA (US); Lap Wai Chow, S. Pasadena, CA (US); James P. Baukus, Westlake Village, CA (US); Bryan J. Wang, South Lake Tahoe, CA (US)

(73) Assignee: VERIMATRIX, Meyreuil (FR)

( * ) Notice: Subject to any disclaimer, the term of this patent is extended or adjusted under 35 U.S.C. 154(b) by 0 days.

(21) Appl. No.: 15/675,418

(22) Filed: Aug. 11, 2017

(65) Prior Publication Data

US 2017/0359071 A1  Dec. 14, 2017

Related U.S. Application Data

(60) Continuation of application No. 14/985,270, filed on Dec. 30, 2015, now Pat. No. 9,735,781, which is a
(Continued)

(51) Int. Cl.
H03K 19/177  (2006.01)
G06F 17/50  (2006.01)
(Continued)

(52) U.S. Cl.
CPC ... *H03K 19/17736* (2013.01); *G06F 17/5068* (2013.01); *G06F 21/14* (2013.01);
(Continued)

(58) Field of Classification Search
None
See application file for complete search history.

(56) References Cited

U.S. PATENT DOCUMENTS 5,636,133 A  6/1997 Chesebro et al.
5,783,846 A  7/1998 Baukus et al.
(Continued)

OTHER PUBLICATIONS

PCT International Search Report and Written Opinion dated Jan. 16, 2018 for PCT Application No. PCT/US2017/052304.
(Continued)

*Primary Examiner* — Minh D A
*Assistant Examiner* — James H Cho
(74) *Attorney, Agent, or Firm* — Gates & Cooper LLP

(57) ABSTRACT

An application specific integrated circuit (ASIC) and a method for its design and fabrication is disclosed. In one embodiment, the camouflaged application specific integrated circuit (ASIC), comprises a plurality of interconnected functional logic cells that together perform one or more ASIC logical functions, wherein the functional logic cells comprise a camouflage cell including: a source region of a first conductivity type, a drain region of the first conductivity type, and a camouflage region of a second conductivity type disposed between the source region and the drain region. The camouflage region renders the camouflage cell always off in a first camouflage cell configuration and always on in a second camouflage cell configuration having a planar layout substantially indistinguishable from the first configuration.

46 Claims, 38 Drawing Sheets
(14 of 38 Drawing Sheet(s) Filed in Color)

Related U.S. Application Data continuation-in-part of application No. 13/940,585, filed on Jul. 12, 2013, now Pat. No. 9,542,520, which is a division of application No. 13/370,118, filed on Feb. 9, 2012, now Pat. No. 8,510,700, which is a continuation-in-part of application No. 12/380,094, filed on Feb. 24, 2009, now Pat. No. 8,151,235, and a continuation-in-part of application No. 12/578,441, filed on Oct. 13, 2009, now Pat. No. 8,418,091, which is a continuation-in-part of application No. 12/380,094, filed on Feb. 24, 2009, now Pat. No. 8,151,235, and a continuation-in-part of application No. 13/789,267, filed on Mar. 7, 2013, now Pat. No. 9,355,199, which is a continuation of application No. 12/578,441, filed on Oct. 13, 2009, now Pat. No. 8,418,091, which is a continuation of application No. 12/380,094, filed on Feb. 24, 2009, now Pat. No. 8,151,235.

(60) Provisional application No. 62/098,108, filed on Dec. 30, 2014.

(51) Int. Cl.
  *G06F 21/14* (2013.01)
  *H01L 27/02* (2006.01)
  *H01L 27/118* (2006.01)
  *H03K 19/17736* (2020.01)
  *H03K 19/17768* (2020.01)

(52) U.S. Cl.
  CPC ... *H01L 27/0207* (2013.01); *H03K 19/17768* (2013.01); *G06F 17/5045* (2013.01); *G06F 17/5072* (2013.01); *H01L 27/11807* (2013.01)

(56) References Cited

U.S. PATENT DOCUMENTS

| | | |
|---|---|---|
| 5,809,281 A | 9/1998 | Steele et al. |
| 5,821,582 A | 10/1998 | Daum |
| 5,866,933 A | 2/1999 | Baukus et al. |
| 5,930,663 A | 7/1999 | Baukus et al. |
| 5,946,478 A | 8/1999 | Lawman |
| 5,973,375 A | 10/1999 | Baukus et al. |
| 6,064,110 A | 5/2000 | Baukus et al. |
| 6,104,639 A | 8/2000 | Hayashi et al. |
| 6,117,762 A | 9/2000 | Baukus et al. |
| 6,294,816 B1 | 9/2001 | Baukus et al. |
| 6,305,000 B1 | 10/2001 | Phan et al. |
| 6,351,172 B1 | 2/2002 | Ouyang et al. |
| 6,459,629 B1 | 10/2002 | Clark, Jr. et al. |
| 6,467,074 B1 | 10/2002 | Katsioulas et al. |
| 6,613,661 B1 | 9/2003 | Baukus et al. |
| 6,740,942 B2 | 5/2004 | Baukus et al. |
| 6,748,579 B2 | 6/2004 | Dillon et al. |
| 6,774,413 B2 | 8/2004 | Baukus et al. |
| 6,791,191 B2 | 9/2004 | Chow et al. |
| 6,815,816 B1 | 11/2004 | Clark, Jr. et al. |
| 6,893,916 B2 | 5/2005 | Baukus et al. |
| 6,897,535 B2 | 5/2005 | Chow et al. |
| 6,919,600 B2 | 7/2005 | Baukus et al. |
| 6,924,552 B2 | 8/2005 | Baukus et al. |
| 6,940,764 B2 | 9/2005 | Clark, Jr. et al. |
| 6,944,843 B2 | 9/2005 | Bansal |
| 6,979,606 B2 | 12/2005 | Chow et al. |
| 7,008,873 B2 | 3/2006 | Chow et al. |
| 7,009,443 B2 | 3/2006 | Illegems |
| 7,042,752 B2 | 5/2006 | Okuda |
| 7,049,667 B2 | 5/2006 | Chow et al. |
| 7,170,317 B2 | 1/2007 | White |
| 7,217,977 B2 | 5/2007 | Chow et al. |
| 7,217,997 B2 | 5/2007 | Wyland |
| 7,279,936 B2 | 10/2007 | Gliese et al. |
| 7,328,419 B2 | 5/2008 | Vuong et al. |
| 7,383,521 B2 | 6/2008 | Smith et al. |
| 7,454,323 B1 | 11/2008 | Bain |
| 7,500,215 B1 | 3/2009 | Massabki et al. |
| 7,733,121 B2 | 6/2010 | Phoon et al. |
| 7,844,936 B2 | 11/2010 | Melzner |
| 7,895,548 B2 | 2/2011 | Lin et al. |
| 8,111,089 B2 | 2/2012 | Cocchi et al. |
| 8,168,487 B2 | 5/2012 | Clark, Jr. et al. |
| 9,479,176 B1 * | 10/2016 | Eble, III .......... H03K 19/17768 |
| 2002/0096744 A1 | 7/2002 | Chow et al. |
| 2002/0096776 A1 | 7/2002 | Chow et al. |
| 2004/0000928 A1 * | 1/2004 | Cheng ................ H03K 19/1737 326/41 |
| 2004/0061186 A1 | 4/2004 | Chow et al. |
| 2004/0103377 A1 | 5/2004 | Eaton et al. |
| 2004/0130349 A1 | 7/2004 | Morgenshtein et al. |
| 2004/0144998 A1 | 7/2004 | Chow et al. |
| 2005/0093572 A1 | 5/2005 | Sun et al. |
| 2005/0140389 A1 | 6/2005 | Gliese et al. |
| 2005/0161748 A1 | 7/2005 | Chow et al. |
| 2005/0230787 A1 | 10/2005 | Chow et al. |
| 2006/0075374 A1 * | 4/2006 | McElvain ........... G06F 17/5045 716/116 |
| 2007/0261015 A1 | 11/2007 | Morgenshtein et al. |
| 2008/0216038 A1 | 9/2008 | Bose |
| 2008/0237644 A1 | 10/2008 | Tripathi |
| 2008/0282208 A1 | 11/2008 | Anderson et al. |
| 2010/0218158 A1 | 8/2010 | Chow et al. |
| 2010/0231263 A1 | 9/2010 | Fish et al. |
| 2010/0301903 A1 | 12/2010 | Cocchi et al. |
| 2011/0113392 A1 | 5/2011 | Chakraborty et al. |
| 2011/0148457 A1 * | 6/2011 | Abramovici ............... G06F 7/00 326/8 |
| 2015/0278419 A1 | 10/2015 | Yang et al. |
| 2016/0004808 A1 | 1/2016 | Feng et al. |

OTHER PUBLICATIONS

Non-Final Office Action dated Feb. 6, 2019 for U.S. Appl. No. 16/056,268.
Final Office Action dated Jul. 20, 2019 for U.S. Appl. No. 16/056,268.
Applicant-Initiated Interview Summary dated Dec. 2, 2019 for U.S. Appl. No. 16/056,268.
Renewed Petition under 37 C.F.R. §1.84(a)(2) dated Dec. 2, 2019 for U.S. Appl. No. 16/056,268.
Amendment under 37 C.F.R. 1.116 dated Dec. 2, 2019 for U.S. Appl. No. 16/056,268.

* cited by examiner

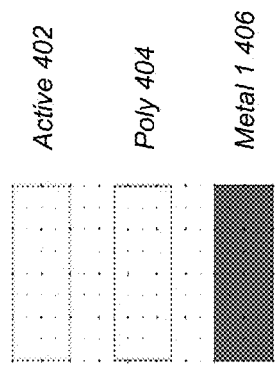
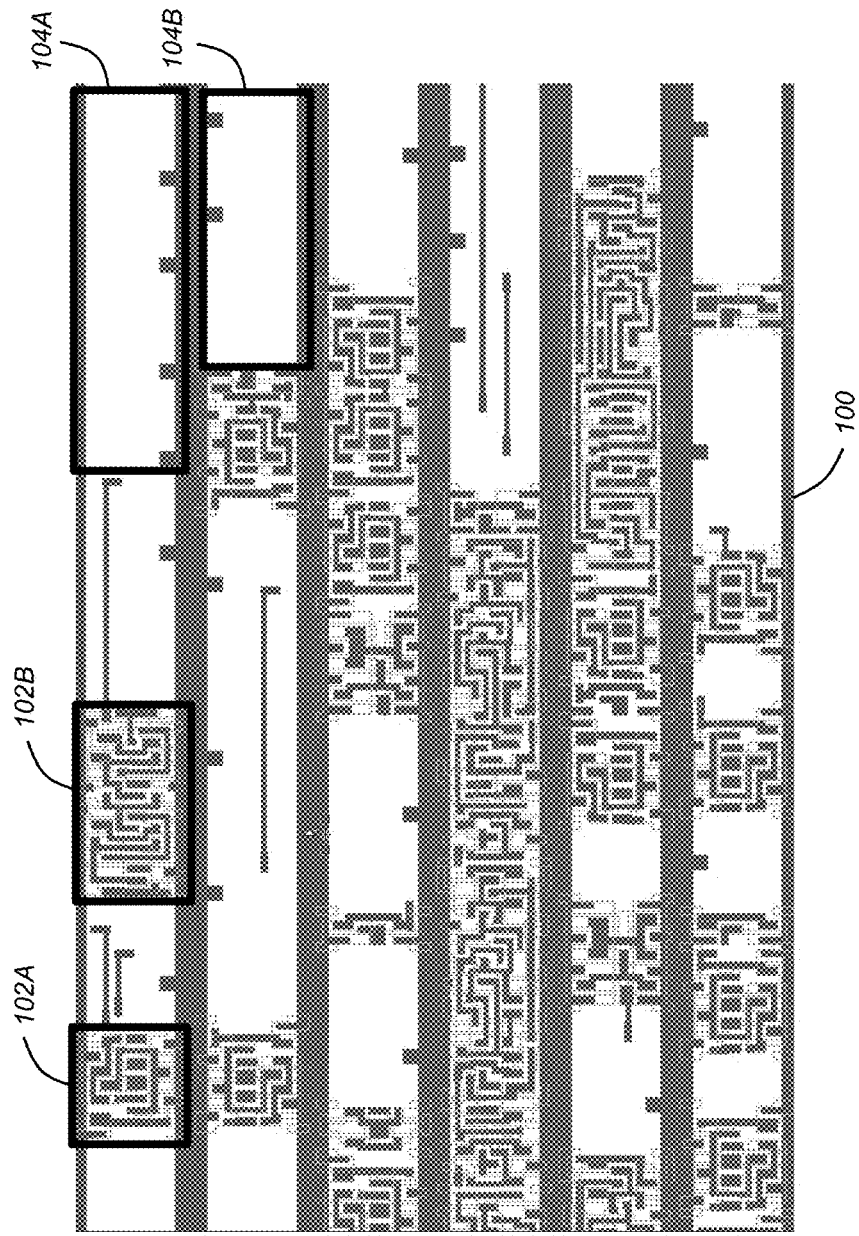
FIG. 1

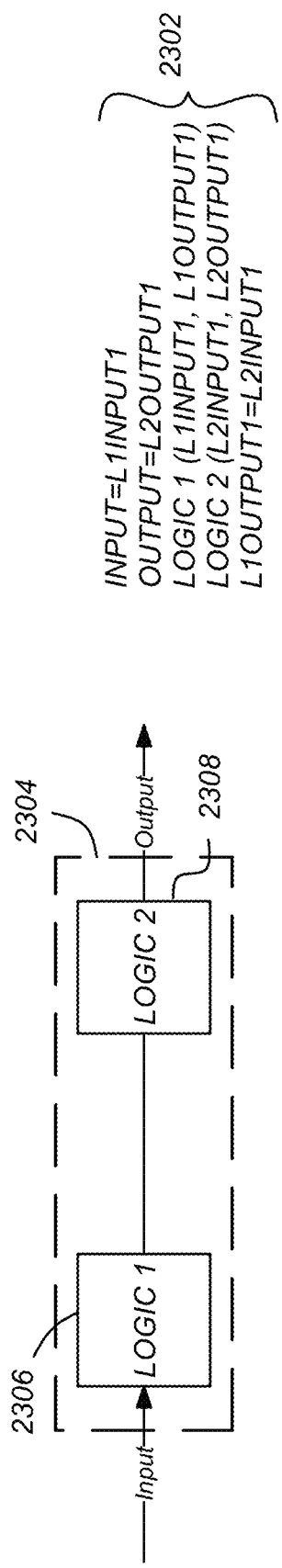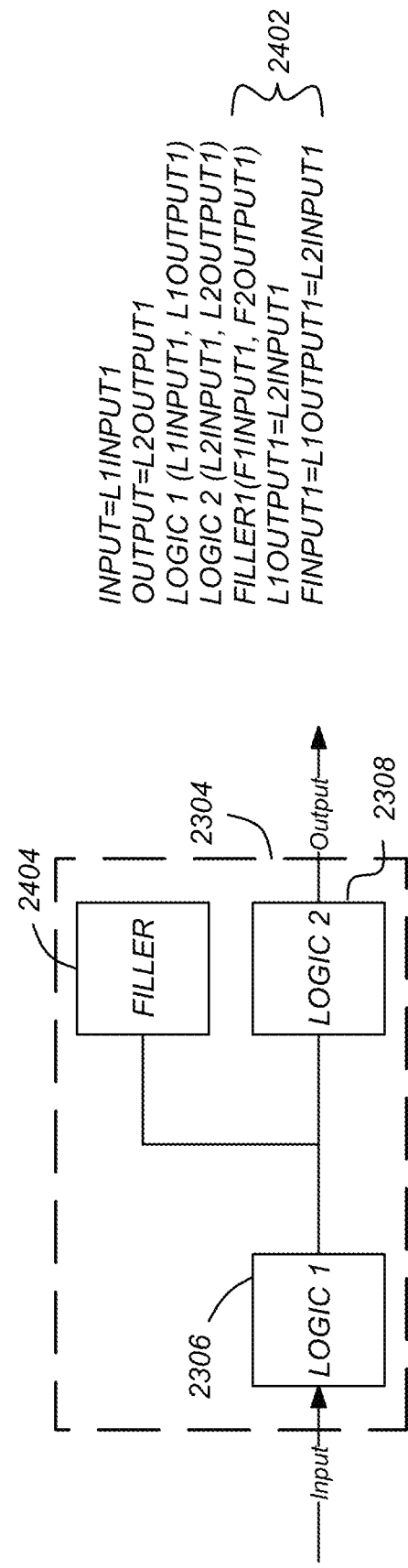
FIG. 23
FIG. 24

PHYSICALLY UNCLONABLE CAMOUFLAGE STRUCTURE AND METHODS FOR FABRICATING SAME

CROSS-REFERENCE TO RELATED APPLICATIONS

This application is a continuation of U.S. patent application Ser. No. 14/985,270, entitled "PHYSICALLY UNCLONABLE CAMOUFLAGE STRUCTURE AND METHODS FOR FABRICATING SAME," by Ronald P. Cocchi, Lap W. Chow, James P. Baukus, and Bryan J. Wang, filed Dec. 30, 2015, issued Aug. 15, 2017 as U.S. Pat. No. 9,735,781, which application:

Claims benefit of U.S. Provisional Patent Application No. 62/098,108, entitled "METHOD AND APPARATUS FOR BUILDING AN UNCLONABLE ELECTRONICS SYSTEM WITH CIRCUIT CAMOUFLAGE," by Ronald P. Cocchi, Lap W. Chow, James P. Baukus, and Bryan J. Wang, filed Dec. 30, 2014, both of which application is hereby incorporated by reference herein.

Is a continuation-in-part of U.S. patent application Ser. No. 13/940,585, entitled "METHOD AND APPARATUS FOR CAMOUFLAGING A STANDARD CELL BASED INTEGRATED CIRCUIT WITH MICRO CIRCUITS AND POST PROCESSING," by Bryan J. Wang, Lap Wai Chow, James P. Baukus, and Ronald P. Cocchi, filed Jul. 12, 2013, which application is a divisional of U.S. patent application Ser. No. 13/370,118, filed Feb. 9, 2012 and entitled "METHOD AND APPARATUS FOR CAMOUFLAGING A STANDARD CELL BASED INTEGRATED CIRCUIT WITH MICRO CIRCUITS AND POST PROCESSING," by Ronald P. Cocchi et al. and issued Aug. 13, 2013 as U.S. Pat. No. 8,510,700, which application is:

a continuation-in-part of U.S. patent application Ser. No. 12/380,094, filed Feb. 24, 2009 and entitled "CAMOUFLAGING A STANDARD CELL BASED INTEGRATED CIRCUIT," by Lap Wai Chow, James P. Baukus, Bryan J. Wang, and Ronald P. Cocchi, issued Apr. 3, 2012 as U.S. Pat. No. 8,151,235; and a continuation-in-part of U.S. patent application Ser. No. 12/578,441 filed Oct. 13, 2009 entitled "METHOD AND APPARATUS FOR CAMOUFLAGING A STANDARD CELL BASED INTEGRATED CIRCUIT," by Lap Wai Chow, James P. Baukus, Bryan J. Wang, and Ronald P. Cocchi, issued Apr. 9, 2013 as U.S. Pat. No. 8,418,091, which is a continuation-in-part of U.S. patent application Ser. No. 12/380,094, filed Feb. 24, 2009 and entitled "CAMOUFLAGING A STANDARD CELL BASED INTEGRATED CIRCUIT," by Lap Wai Chow, James P. Baukus, Bryan J. Wang, and Ronald P. Cocchi, issued Apr. 3, 2012 as U.S. Pat. No. 8,151,235;

Is also a continuation-in-part of U.S. patent application Ser. No. 13/789,267, filed Mar. 7, 2013, entitled "METHOD AND APPARATUS FOR CAMOUFLAGING A STANDARD CELL BASED INTEGRATED CIRCUIT," by Lap Wai Chow, James P. Baukus, Bryan J. Wang, and Ronald P. Cocchi, issued May 31, 2016 as U.S. Pat. No. 9,355,199, which application is a continuation of U.S. patent application Ser. No. 12/578,441, filed Oct. 13, 2009, entitled "METHOD AND APPARATUS FOR CAMOUFLAGING A STANDARD CELL BASED INTEGRATED CIRCUIT," by Lap Wai Chow, James P. Baukus, Bryan J. Wang, and Ronald P. Cocchi and issued Apr. 9, 2013 as U.S. Pat. No. 8,418,091, which application is a continuation-in-part of U.S. patent application Ser. No. 12/380,094, filed Feb. 24, 2009, entitled "CAMOUFLAGING A STANDARD CELL BASED INTEGRATED CIRCUIT," by Lap Wai Chow, James P. Baukus, Bryan J. Wang, and Ronald P. Cocchi, issued Apr. 3, 2012 as U.S. Pat. No. 8,151,235;

all of which forgoing applications are hereby incorporated by reference herein.

BACKGROUND OF THE INVENTION

1. Field of the Invention

The present invention relates to systems and methods for protecting printed circuits from reverse engineering and in particular to a system and method for camouflaging a standard cell based integrated circuit.

2. Description of the Related Art

In today's standard-cell based application specific integrated circuit (ASIC) design, the logic function of the chip is modeled and simulated in higher-level hardware description languages (VHDL or VERILOG). It is then synthesized in a silicon compiler (e.g. SYNOPSIS) to generate a netlist using logic cells from a targeted standard-cell library. The netlist will be used in the backend physical design phase to perform the Place and Route of library cells, generating the full circuit layout of the ASIC for manufacturing. The Place and Route process uses an automated computer program placing all logic cells in appropriate locations, then connecting them with metal and via layers according to the connection information in the netlist. ASICs designed using this approach are vulnerable to reverse engineering (RE) attack. RE of an ASIC involves the steps of functional identification of logic cells and the extraction of the cells' connections. With the latest optical and scanning electron microscopic techniques, an ASIC's logic circuits and its wiring network can be easily extracted by RE.

In a standard Place and Route process of an ASIC, some unused silicon areas with no logic cells will usually occur during cell placement due to the requirement of efficient routing. The presence of the unused silicon areas provides extra information, like the cell boundaries, to the reverse engineering process. RE usually starts the functional identification of logic cells near the unused silicon areas of the ASIC.

The desire to protect hardware and associated intellectual property from reverse engineering and cloning has long been present in commercial and government applications. A conventional integrated circuit is susceptible to the aforementioned RE using a variety of techniques that analyze the manufactured silicon die and extract a functional circuit model. Once the functional circuit model is extracted, a counterfeit device can be produced that performs the same function as the original circuit, or a function that is intentionally altered with a Trojan circuit. Alternately, a digital circuit may then be emulated by an off-the-shelf microprocessor or Field Programmable Gate Array (FPGA).

Camouflage techniques have been used to protect logic cells in Application Specific Integrated Circuits (ASICs) against reverse engineering attacks since the late 1980s. Such systems attempt to fill open spaces in layers with metals and via that are appear functional, but are not. While such methods make RE difficult, additional techniques are needed to further discourage RE of such circuits.

What is needed is are additional techniques that can be used either independently from or in conjunction with the above techniques to further discourage RE. This disclosure describes such techniques.

SUMMARY OF THE INVENTION

Application-specific integrated circuits (ASICs) built with standard-cell technology are vulnerable to piracy and fail to protect sensitive intellectual property by enabling reverse engineering of the design. The present invention ameliorates this problem by providing a structure for camouflage cells having RE-discernable layouts that are (1) substantially indistinguishable from other functional logical cells and (2) substantially indistinguishable from each other, even though such camouflage cells actually perform differently than other camouflage cells. In one embodiment, the camouflaged application specific integrated circuit (ASIC), comprises a plurality of interconnected functional logic cells that together perform one or more ASIC logical functions, wherein the functional logic cells comprise a camouflage cell including: a source region of a first conductivity type, a drain region of the first conductivity type, and a camouflage region of a second conductivity type disposed between the source region and the drain region. The camouflage region renders the camouflage cell always off in a first camouflage cell configuration and always on in a second camouflage cell configuration having a planar layout substantially indistinguishable from the first configuration.

In another embodiment, the camouflaged ASIC is fabricated by identifying at least one logical cell of the interconnected functional logic cells as a camouflage cell, and defining a routing of the plurality of interconnected logical cells, including the camouflage cell. Advantageously, this technique can be performed on a user computer configured to support computer-aided design (CAD) of integrated circuits to generate etching and masking layer patterns, for example, as described in "Physical Design Essentials—An ASIC Design Implementation Perspective," by Golshan, Khosrow, Springer 2007, ISBN: 978-0-387-36642-5, which is hereby incorporated by reference herein.

BRIEF DESCRIPTION OF THE DRAWINGS

The patent or application file contains at least one drawing executed in color. Copies of this patent or patent application publication with color drawing(s) will be provided by the office on request and payment of the necessary fee.

Referring now to the drawings in which like reference numbers represent corresponding parts throughout:

FIG. 1 is a diagram illustrating a portion of the ASIC design with unused silicon areas or gaps;

FIGS. 4A-5C are diagrams depicting how a filler cell physical layout design can be defined based on the physical layout design of a standard 2-input NAND gate from a typical standard cell library;

FIG. 23 is a diagram illustrating an exemplary embodiment of a logical description of interconnected functional logic or cell combination performing a desired logical function;

FIG. 24 is a diagram showing an embodiment of a functionally inert filler cell;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In standard-cell based ASIC design, the logic function of the chip is modeled and simulated in higher level hardware description languages such as "Very High Speed Integrated Circuit Hardware Description Language (VHDL) or VERILOG. It is then synthesized in a silicon compiler such as SYNOPSIS to generate a netlist using logic cells from a targeted standard-cell library (hereinafter referred to as "library cells). The netlist is then used in the backend physical design phase to locate (e.g. physically place) the library cells on the ASIC and route connections between those library cells (a process known as a "Place and Route" or PR of the library cells), thereby generating the full circuit layout of the ASIC for manufacturing. The PR process uses an automated computer program placing all logic cells in appropriate locations then connects them with metal and via layers according to the connection information in the netlist.

ASICs designed using this approach are vulnerable to reverse engineering (RE) attack. Reverse engineering of an ASIC involves the steps of functional identification of logic cells and the extraction of the cells' connections. With the latest optical and scanning electron microscopic techniques, an ASIC's logic circuits and its wiring network can be easily extracted by RE.

In a standard PR process of an ASIC, some unused silicon areas (gaps) with no logic cells will usually occur during cell placement due to the requirement of effective routing of circuit connections from one cell to another. The presence of the unused silicon areas provides extra information, like the cell boundaries, to the reverse engineering (RE) process. RE usually starts the functional identification of logic cells near the unused silicon areas of the ASIC.

FIG. 1 is a diagram illustrating a portion of the ASIC design 100 with unused silicon areas or gaps 104A, 104B. A typical ASIC design includes an active layer, a poly layer, and a plurality of metal layers and vias to interconnect the layers. However, in the example shown in FIG. 1, only layers up to Metal 1 (active 402, poly 404, and metal 1 406) are depicted so that unused areas can be clearly shown.

Figure 2:
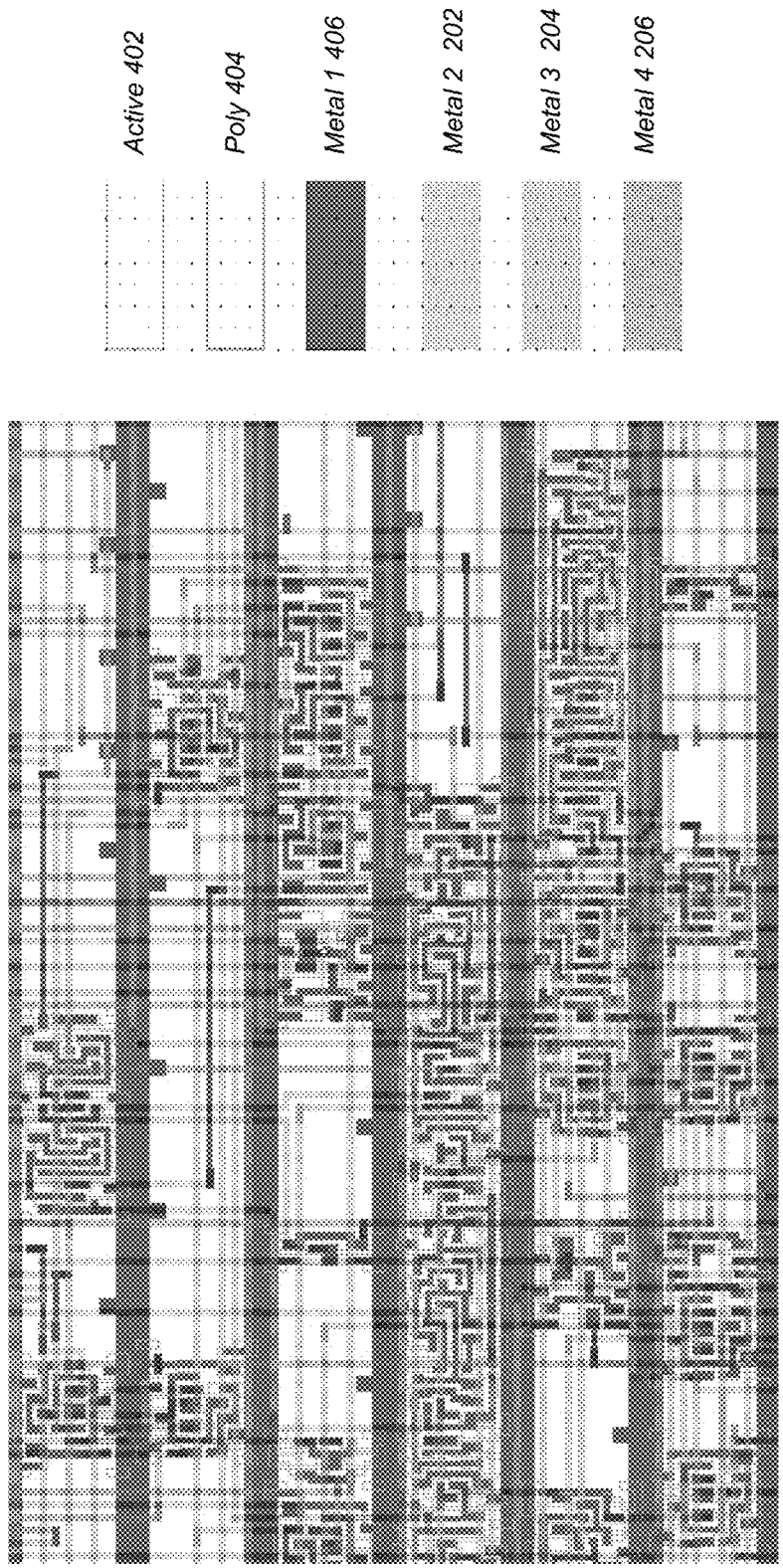
FIG. 2 is a diagram illustrating the same portion of the ASIC design as shown in FIG. 1, but also illustrating all the connecting metal layers.

FIG. 2 is a diagram illustrating the same portion of the ASIC design 100 as shown in FIG. 1, but also illustrating all the connecting metal layers.

Figure 3:
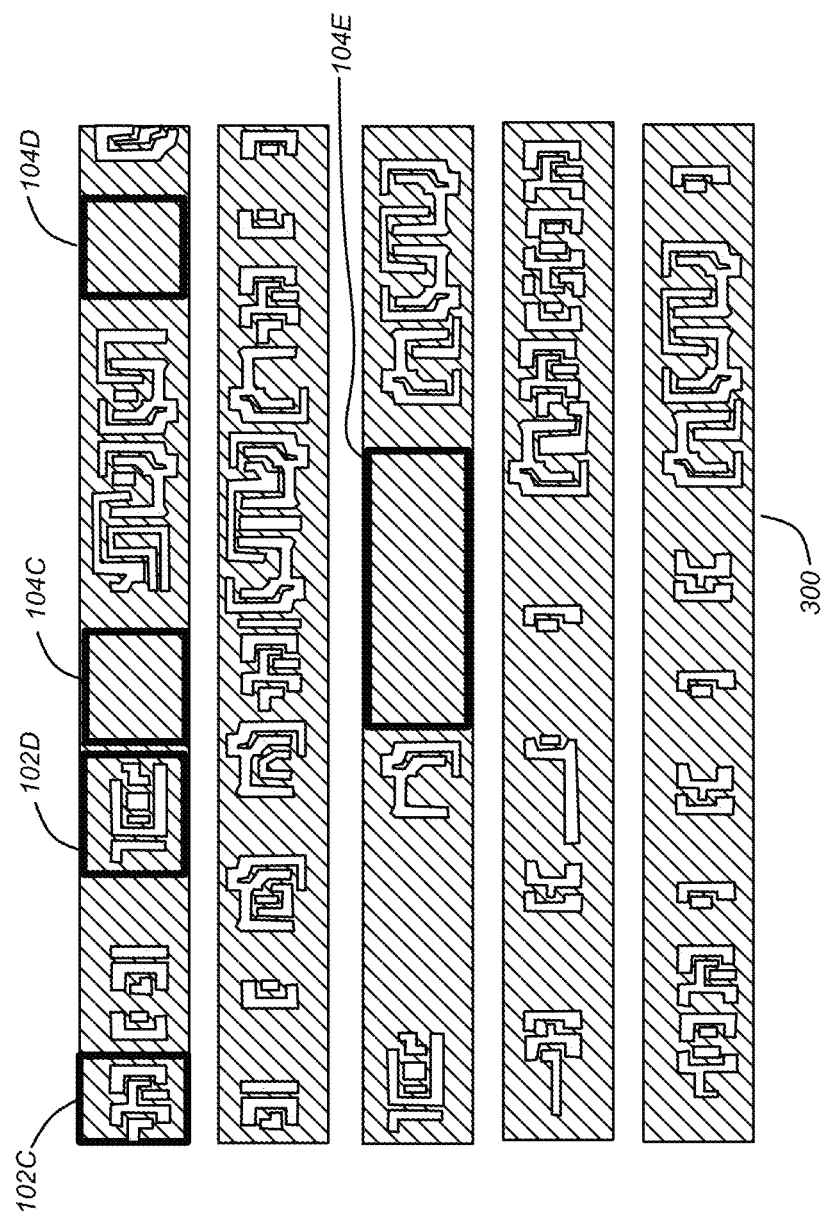
FIG. 3 is the scanning-electron-microscopic view of a portion of an actual ASIC after the removal of higher connecting metal layers, leaving only the first metal layer.

FIG. 3 is the scanning-electron-microscopic view of a portion of an actual ASIC 300 after the removal of higher connecting metals (Metal 2 and up), leaving only the first metal layer (Metal 1). Note that the ASIC 300 includes gaps 104C-104E, functional logic cells 102C, 102D interconnected by circuit traces in the Metal 1 layer to perform one or more of the functions performed by the ASIC. Filling the unused silicon areas with layers in Metal 1, Contact, Poly and Active implant provides a camouflage effect to the ASIC and make RE more difficult.

As described above, U.S. Pat. No. 6,924,552, which is hereby incorporated by reference herein, discloses the filling of higher metal and via layers to protect ASIC from RE, using an algorithm that make the filled layers of metals and vias appear like real connectors. However, this filling algorithm is not applicable to layers like Metal 1, Contact, Poly and Active implants and most of the metals generated are not connected to any voltage source and thus are vulnerable to the 'voltage contrast' technique used in reverse engineering.

A more effective way of filling in the unused silicon spaces with layers of Metal 1, Contact, Poly and Active implants to create a strong camouflage effect to protect the ASIC 100 from reverse engineering is described below. This method also includes a process to connect a large number of metal traces generated by the metal fill process in U.S. Pat. No. 6,924,552 to voltage sources.

U.S. Pat. Nos. 7,049,667, 6,815,816, 6,774,413, 6,924,522 attempt to protect ASICs from RE by making either the logic cell identification or the connection extraction difficult. In contrast, the technique described below uses unused areas in an ASIC to create a camouflage effect to increase the RE effort of an ASIC by a factor of ten or more. One aspect of the technique is the design of the filler cells to fill some or all unused silicon areas in an ASIC.

This may be implemented by (1) using one or more filler cells that appear similar to or substantially the same to a reverse engineer, yet to provide either no logical functionality or a modified logical functionality (e.g. an "AND" logical cell has been altered to perform an "OR" logical function or no function at all); (2) using one or more filler cells that are unmodified from the library cells, but connecting them to provide no A logic cell (e.g. a cell implementing a logical function such as "OR," "AND," "NOR," or "NAND") is selected from the standard cell library, and a filler cell is designed. Importantly, the filler cell is designed so that the physical design layout (the size, location, and material composition of the different layers of the filler cell) is similar to or substantially the same as the physical design layout for a functional logical cell, but different in that the physical design layout is modified so that the filler cell provides no logical function or a modified logical function.

Typically, the reverse engineer analyzes the ASIC by "stripping" or "peeling" the chip. This involves grinding or etching away the encapsulating materials and each layer of the ASIC, photographing the layers with an electron microscope to discover the layout of and interconnection of the logic cells in the ASIC. The reverse engineer may also attach probes to different parts of the ASIC logic cells to measure voltages. Such attacks require a large investment in effort and special equipment that is typically only available to chip manufacturers. The process of stripping the chip can be both difficult and expensive.

As is well known, with sufficient time and with sufficient resources, virtually any device can be reverse engineered to create a new device that performs the same functionality without duplicating the original structure. However, if the costs of successfully stripping the chip, discovering the underlying functionality and producing counterfeit ASICs are such that the resulting counterfeit ASICs are commercially unviable (for example, because they are not sufficiently less expensive than a genuine ASIC or because the genuine ASIC functionality can be changed to render the counterfeit ASICs usable for a commercially insufficient time), then the camouflaging functionality effectively protects the producer of the genuine ASICs.

Filler cells having physical design layout that is similar to but different than the corresponding library cell may have significant changes (either in terms of the number physical design layout elements changed or in terms of the extent of the change(s)) from those of the library cells such that a reverse engineer can manually inspect and note the differences. However, if those changes, taken together, define camouflaging that renders reverse engineering by automated means commercially unviable. Hence, "similar to, but different from" in this context, refers to changes that render reverse engineering commercially unviable.

"Substantially the same" means that a small number (for example, as few as one but as many as several) physical layout elements of the library cell have been added, removed, or altered, to produce the filler cell, but all other of the elements of the physical design layout of the filler cell remain the same.

Different examples of physical design layouts that are "similar to" or "substantially the same" are provided below. For example, small changes in specific layers can be made to alter the function of the filler cell to maintain a constant output at either '0' or '1' (equivalent to Vss or Vdd output) without regard to the input state.

FIGS. 4A-5C are diagrams depicting how a filler cell physical layout design can be defined based on the physical layout design of a standard 2-input NAND gate 102E from a typical standard cell library.

Figures 4A, 4B, 4C:
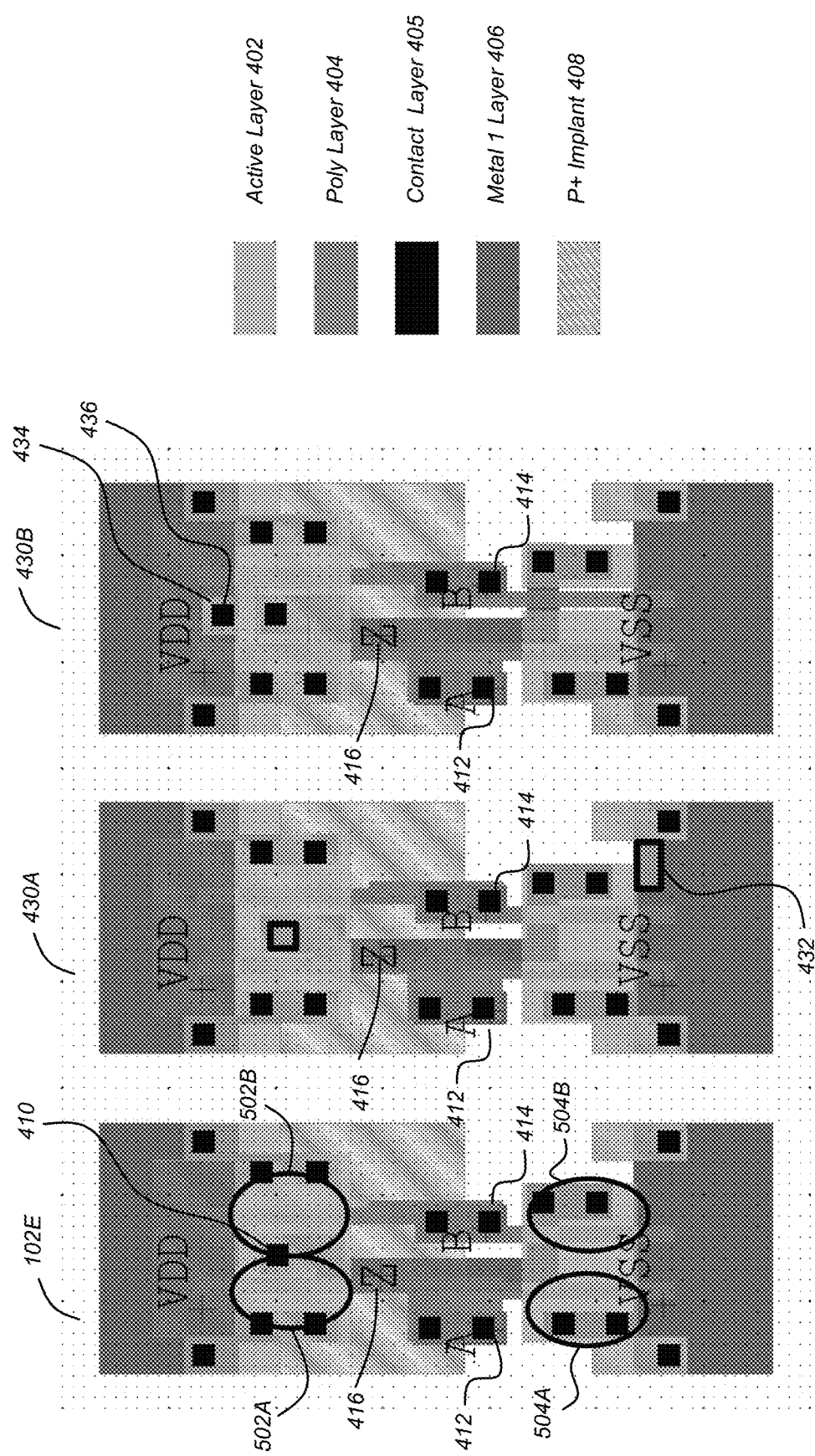
Figure 5A:
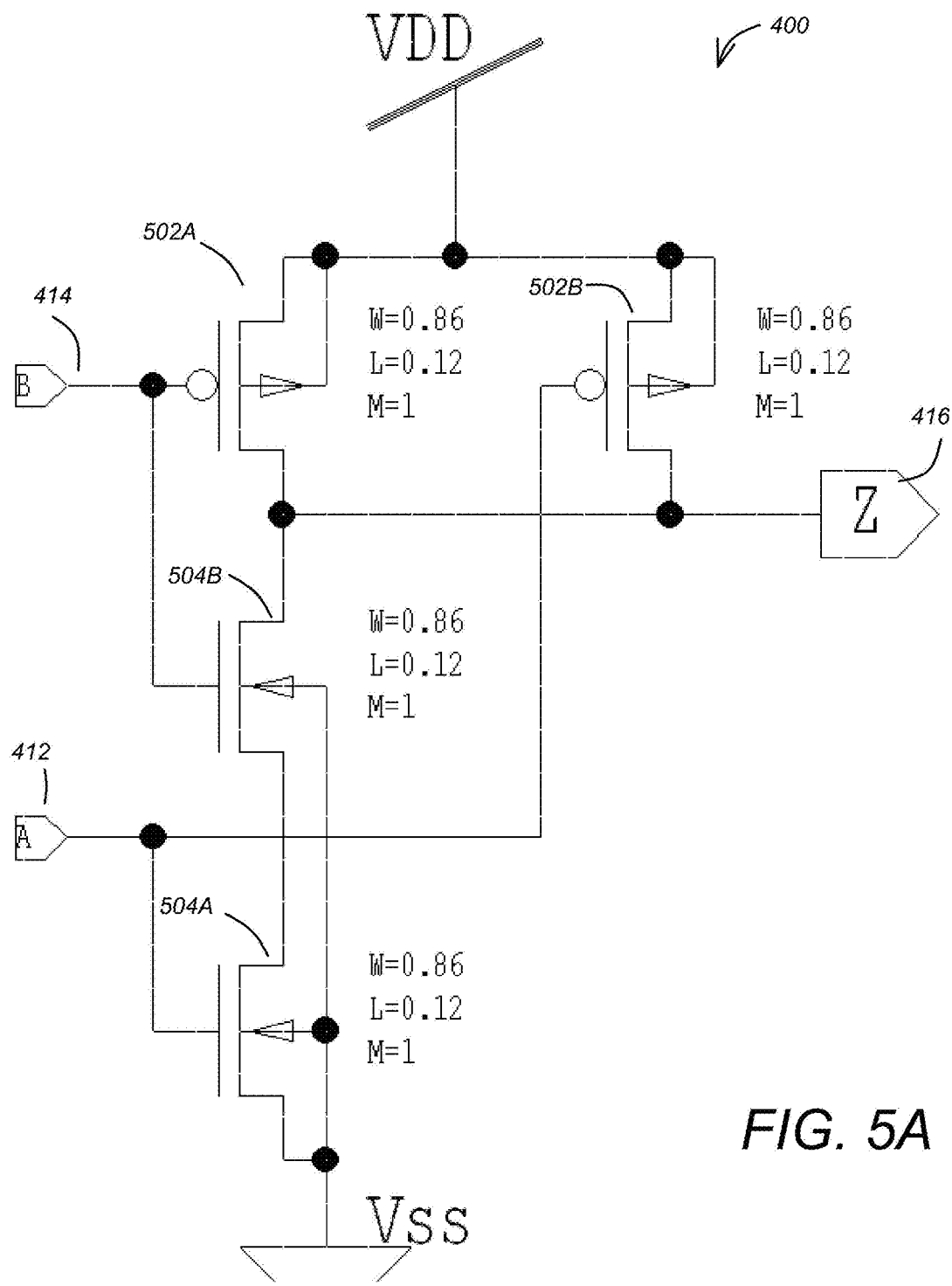

FIG. 4A is a diagram illustrating a physical design layout for a standard two-input NAND gate 102E, and FIG. 5A is a diagram illustrating a schematic diagram for the physical design layout shown in FIG. 4A.

A standard 2-input NAND gate 102E comprises two parallel connected P devices 502A, 502B connected between the output (Z) 416 and Vdd, and two series connected N devices 504A, 504B between the output (Z) and Vss, as shown in FIG. 5A.

Referring first to FIG. 4A, the physical design layout comprises a plurality of layers disposed over one another on a multilayer circuit board. The layers include an active layer 402, a poly layer 404, a contact layer 405, a first metal layer (Metal 1) 406 and a P+ implant (P-doped) layer 408. The P devices 502A, 502B are formed by the overlap of the Poly layer 404, P+ implanted layer 408 and active layer 402 shown in FIGS. 4A-4C while the N devices are formed by the overlap of Poly layer 404 on an N+ implanted active layer (the N+ active layer is formed by an active layer with no coverage of P+ implant layer.

Figure 5B:
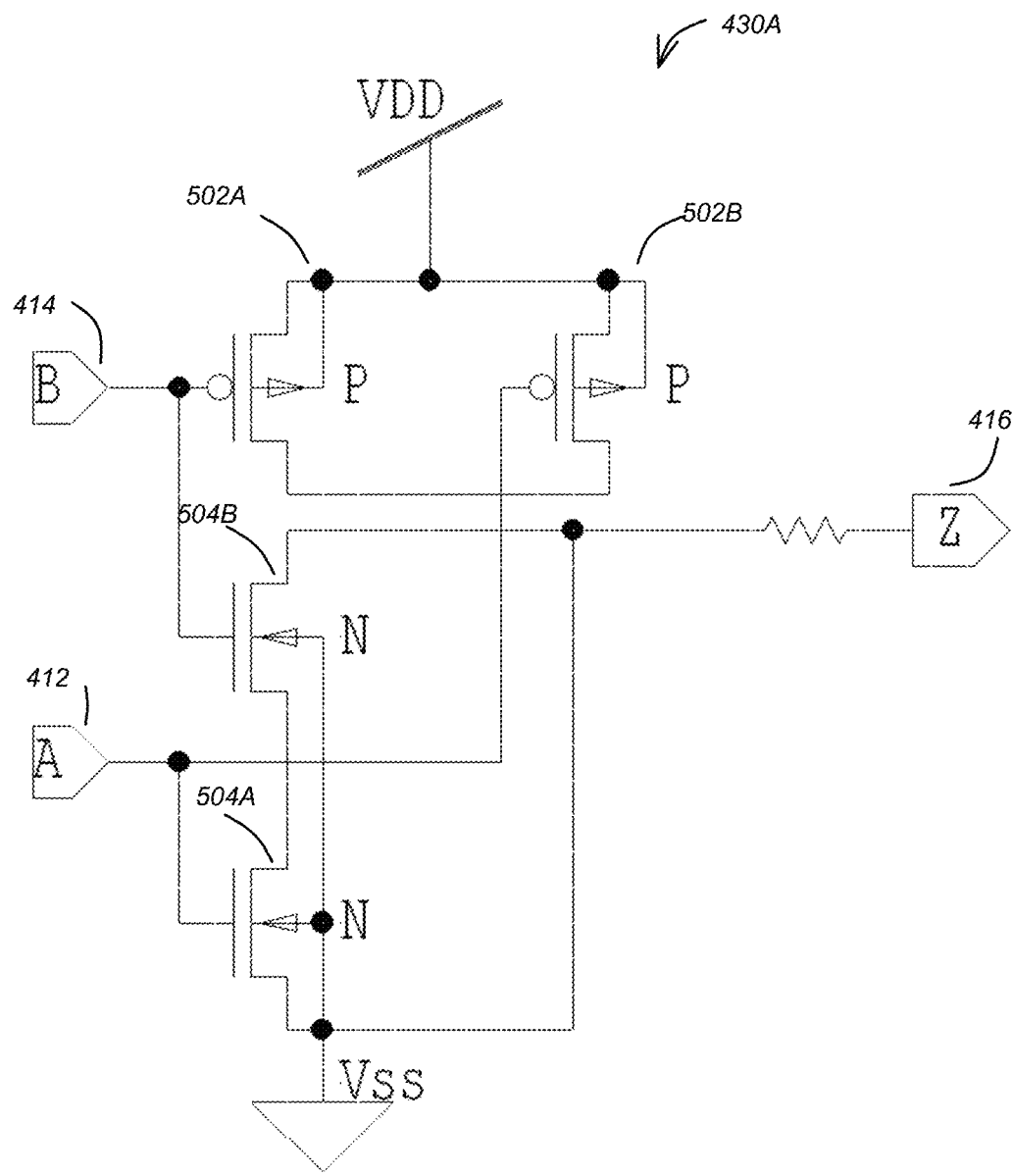

FIGS. 4B and 4C are diagrams depicting exemplary physical design layouts for two possible filler cells 430. FIG. 4B is a diagram depicting an exemplary physical design layout for a filler cell 430A in which the output is always a logical zero, while FIG. 5B is a schematic diagram of the exemplary filler cell 430A shown in FIG. 4B.

Note that the exemplary layer modifications of the 2-input NAND gate 400 shown in FIG. 4B result in an output of logical one while retaining substantially the same physical layout design. The modifications from the physical design layout of the standard cell 400 include layout changes in contact layer 405 and active layer 402 to make the output potential (Z) always equal to Vss (logical zero). The contact layer 405 refers to contacts connecting the Metal 1 layer to the doped Active (N or P doped) layers and the Poly layer. Specifically, in FIG. 4B, contact 410 is missing in the output connection to P-channel devices and an extra piece 432 of N+ Active layer is added to short the output (Z) 416 to Vss (logical zero). The result is a non-functioning logic circuit with its output always at '0' or Vss.

Figure 5C:
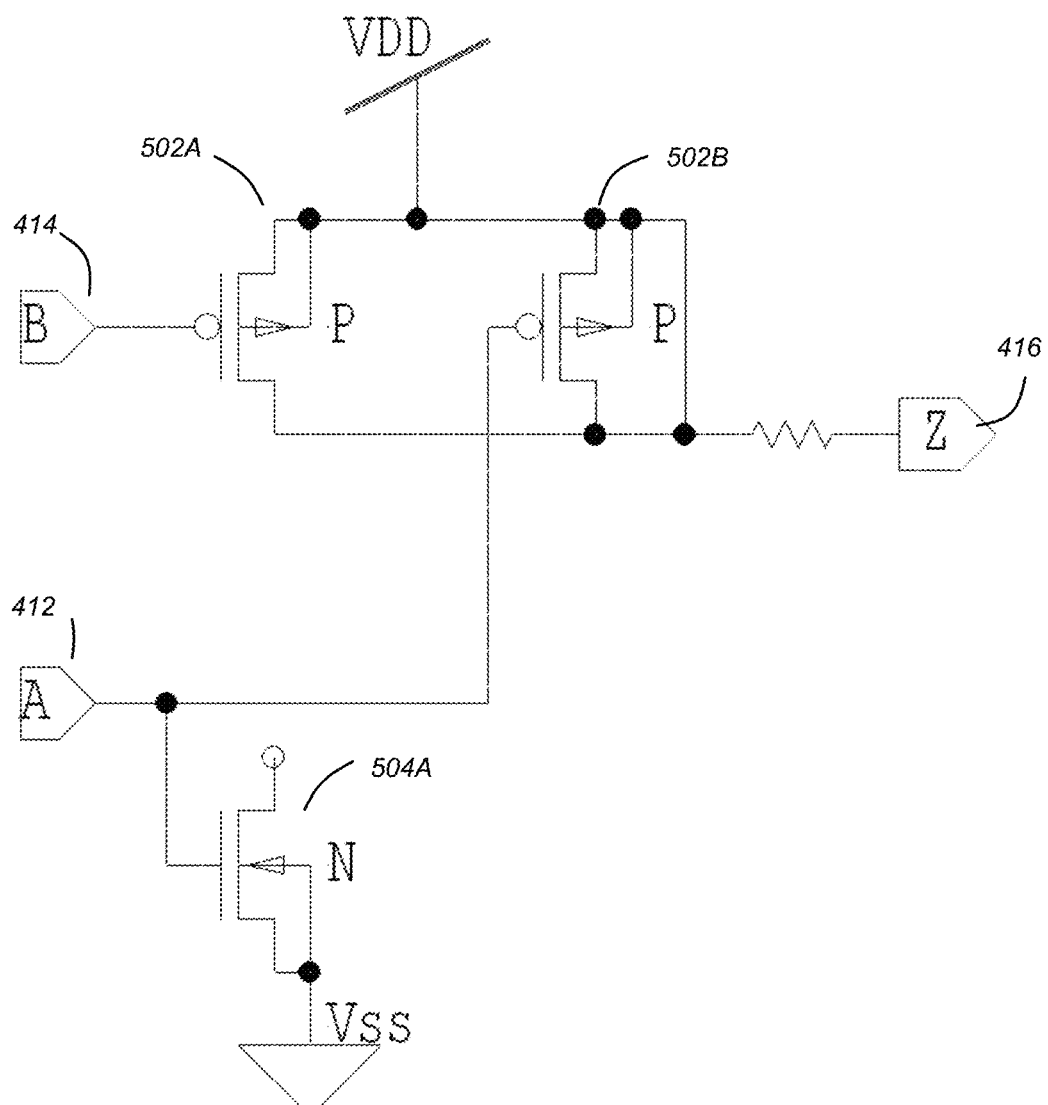

FIG. 4C is a diagram depicting an exemplary physical design layout for a filler cell 430B in which the output is always a logical one, and FIG. 5C is a schematic diagram of the exemplary filler cell 430B in which the output is always a logical one.

Note that the exemplary layer modifications of the 2-input NAND gate 400 shown in FIG. 4C result in an output (Z) 416 that is always equal to Vdd (logical one), while minimizing changes to the physical layout design, thus camouflaging the 2-input NAND gate 102E. Specifically, in FIG. 4C, the output (Z) 416 of filler cell 430 in FIG. 4C is shorted to Vdd through added contact 436 and the P+ Implant region 408. In order to have the output (Z) 416 not influenced by its inputs (A, B), the active layer 402 in FIG. 4C was also modified in the N+ Active region 434 making the output (Z) 416 isolated from the N devices. FIGS. 5A-5C are the schematics associated with the layout in FIGS. 4A-4C, respectively.

All filler cells 430 are designed to deliver a constant output of either logical zero or logical one, independent of the logical values at their inputs (inputs A 412 and B 414 in FIGS. 4A-4C and 5A-5C). These filler cells 430 perform no logic function but only serve as camouflage cells in the unused silicon areas 104. Hundreds of such filler cells 430 can be designed by modifying logic cells 102 from a standard cell library with minor variations in different circuit layers to accommodate the effect of having a constant output of either a logical one or a zero but no logical function.

FIGS. 4B and 4C present only examples of for purposes of illustration. While the filler cell 430 designs shown in FIGS. 4A and 4B may still be detectable using reverse engineering techniques, when taken in the aggregate with the other techniques described below, these filler cells 430 can be used to sufficiently camouflage the ASIC to make RE many times more difficult. Other camouflage techniques like those described in U.S. Pat. Nos. 7,049,667, 6,815,816, 6,774,413, 6,924,522 (which are hereby incorporated by reference) for hiding connections or isolations can be used to enhance the camouflage effect of these filler cells 430. Also, multiple variations of filler cells can be designed with reference to one library cell so to reduce the effect of a specific signature in certain layers of the filler cell design.

Since each filler cell 430 is designed according to a logic cell 102 in the library, the physical size of the designed filler cell 430 will be the same as the original reference logic cell 400. However, different newly designed filler cells 430 can have different sizes and thus be able to fill into different sized gaps 104. In ASIC design terminology, a routing track is a circuit trace that interconnects the logical cells 102. The size of a logic cell 102 and the gaps 104 or empty silicon space between logic cells 102 are typically counted in terms of the number of routing tracks, and the minimum size of the designed filler cell is one routing track. In other words, only one routing track will be able to route through this cell 104. Routing track size is the minimum width of the track plus the minimum space to the next track.

In a standard logic cell library, there is seldom any logic cell 102 with a width of only one routing track but gaps 104 in between logic cells 102 of an ASIC 300 can be as small as one track. Special filler cells 430 of one routing track width can be designed to fill in the minimum gap of one routing track space.

Figures 6A, 6B:
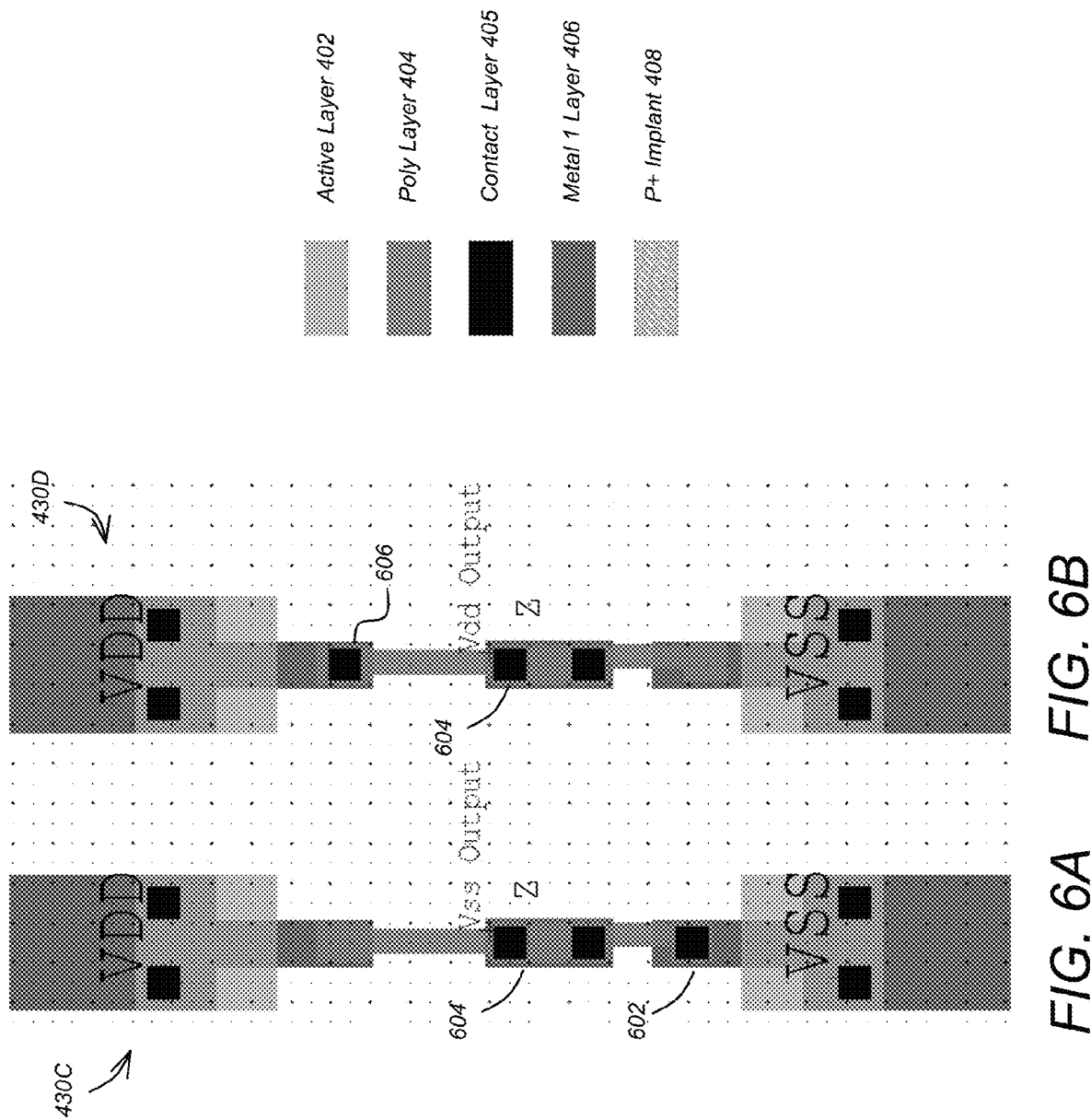
FIGS. 6A and 6B are diagrams depicting single track width filler cells.

FIGS. 6A and 6B are diagrams depicting single track width filler cells 430C and 430D. The filler cell 430C depicted in FIG. 6A uses contact 602 to short the output 604 (Z) to the voltage Vss (logical zero), and the filler cell 430D uses contact 606 to short the output 604 (Z) to voltage Vdd (logical one) through the poly layer 404. The active layer 402 is also present to increase the camouflage effect of these filler cells. Again, other camouflage techniques described in the references (e.g. U.S. Pat. Nos. 7,049,667, 6,815,816, 6,774,413, 6,924,522 etc.) can also be used to make the actual circuit connection of these filler cells difficult to be determined by reverse engineering.

Figure 7:
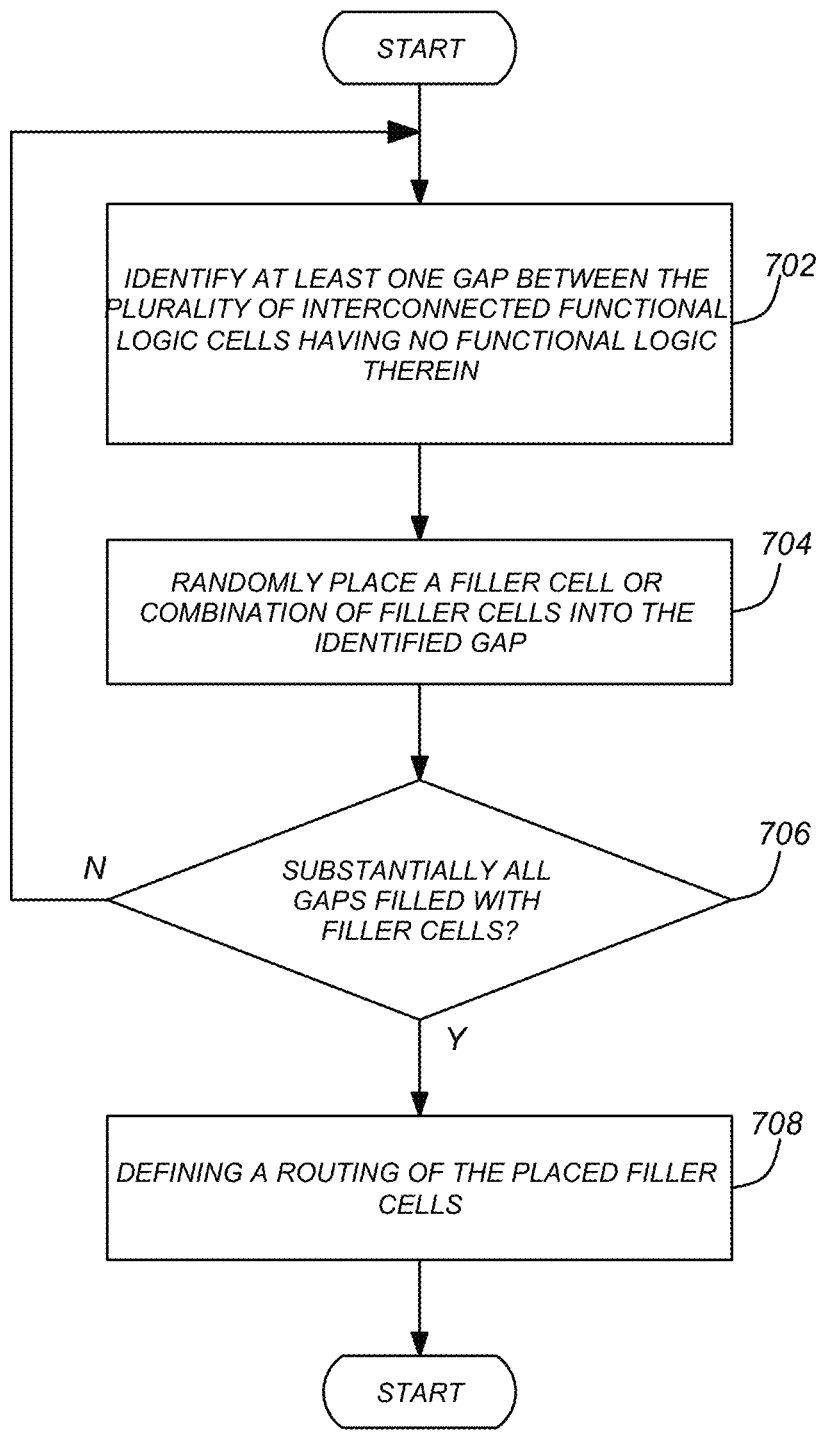
FIG. 7 is a flow chart illustrating representative method steps that can be used to practice one embodiment of the invention.

FIG. 7 is a flow chart illustrating representative method steps that can be used to practice one embodiment of the invention. In block 702, at least one gap 104 is identified between a plurality of interconnected functional logic cells 102. Such gaps 104 have no functional logic within their boundaries. Next, a filler cell 430 or combination of a plurality of filler cells 430 are placed into the identified gap 104, as shown in block 704. In one embodiment, the placement of filler cells 430 is accomplished randomly. This randomness can be implemented by randomly selecting from different filler cell 430 designs or different filler cell 430 combinations. As shown in block 706, the operations of block 702 and 704 are repeated until substantially all of the gaps 104 are filled with filler cells 430. This can be accomplished by running a computer program for the random placement of one filler cell or a combination of filler cells into the unused silicon area of the post Place and Route standard cell portion of the ASIC.

Figure 8:
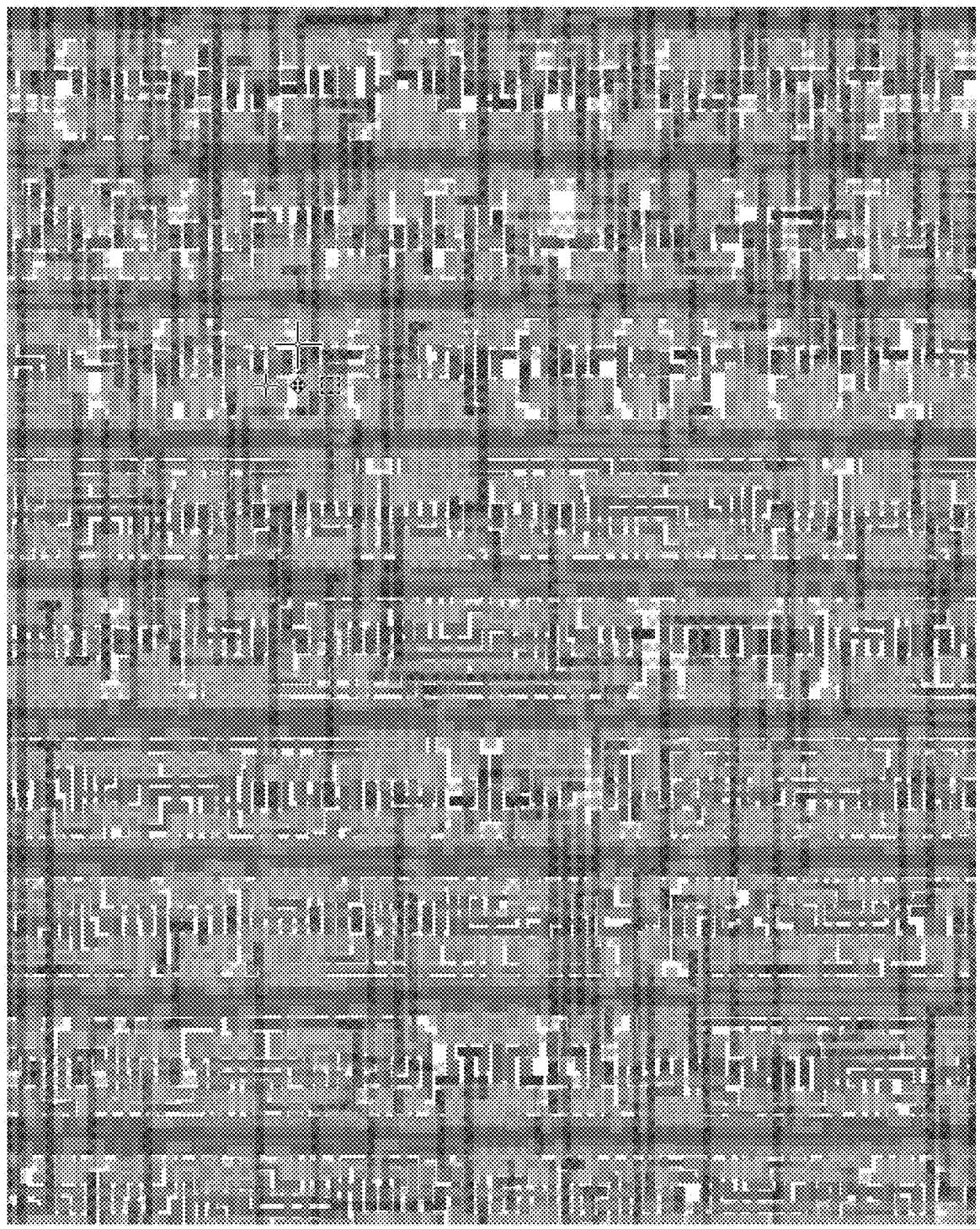
FIG. 8 is a diagram showing an exemplary ASIC after the completion of selected operations of FIG. 7.

FIG. 8 is a diagram showing an exemplary ASIC after the completion of the operations of blocks 702-706.

Figure 9:
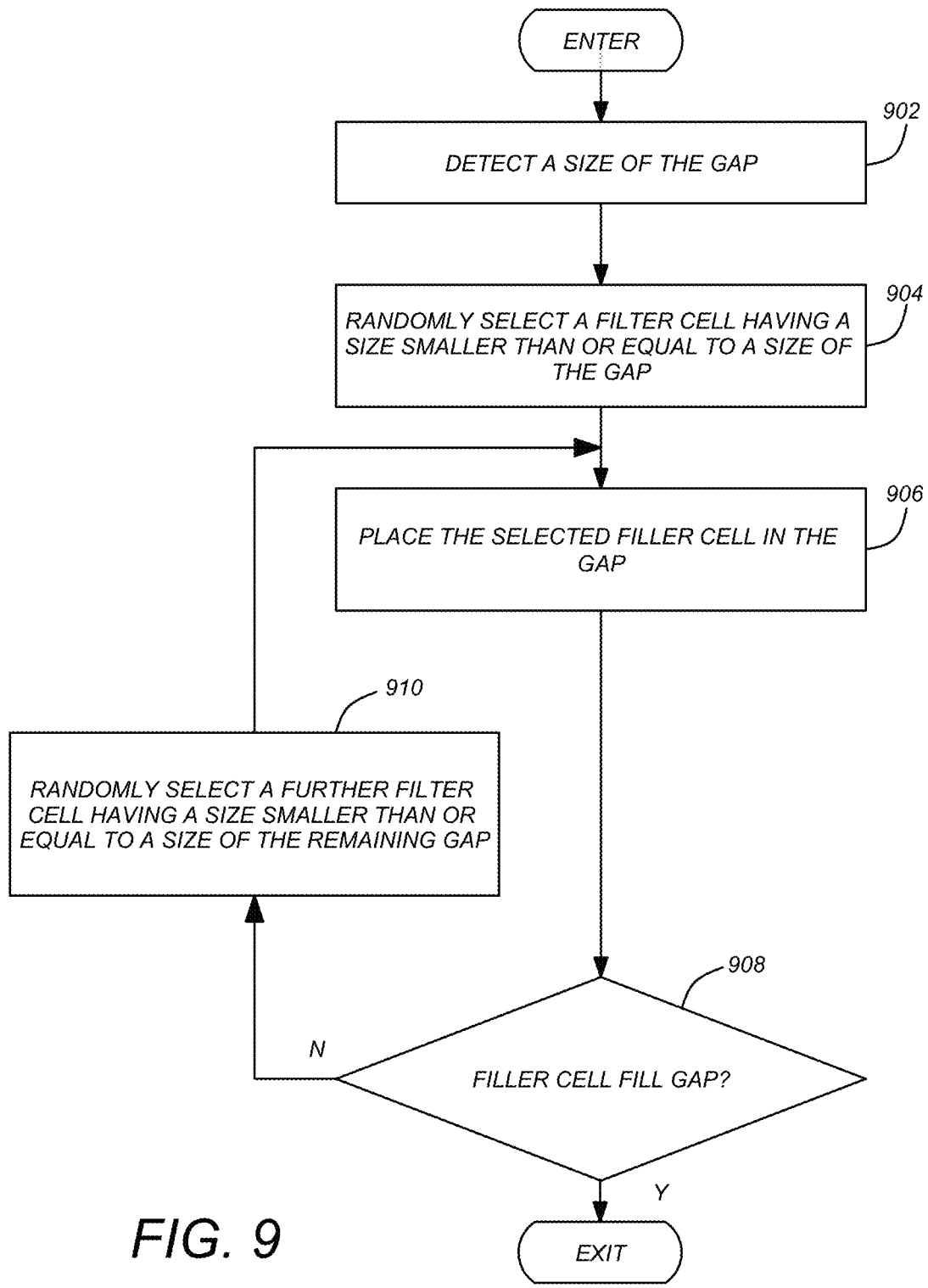
FIG. 9 is a diagram illustrating one embodiment of how filler cells or combinations of filler cells can be randomly placed into identified gaps.

FIG. 9 is a diagram illustrating one embodiment of how filler cells 430 or combinations of filler cells 430 can be randomly placed into identified gaps. As shown in FIGS. 1 and 2, the standard cell region of an ASIC is comprised of rows of placed logic cells with connecting conductive traces or wirings. After an ASIC design is finished, all the layer information of the design is stored in a graphical data system (GDS) file, ready to release for mask making. GDS is an industry accepted database file format for IC layout design. The GDS file describing the ASIC layout can be input to an algorithm or computer program and used to detect, in the standard cell region, each gap 104 (unused silicon area) in each row of logic cells, as shown in block 902. It then randomly picks a filler cell 430 from the newly designed filler cells 430 with a size smaller than or equal to the size of the gap 104, and places it in that gap 104, as shown in blocks 904-906. If the first randomly chosen filler cell 430 does not fully fill the gap 104, then another filler cell 430 with a size smaller than or equal to the remaining space is randomly selected and placed until the space is fully utilized, as shown in blocks 908-910.

In one embodiment, the filling program sequentially processes the ASIC layout from space to space and row to row until it finishes filling all the unused silicon areas in the standard cell portions of the die.

Returning to FIG. 7, a routing is defined for the placed filler cells 430, as shown in block 708.

Figure 10:
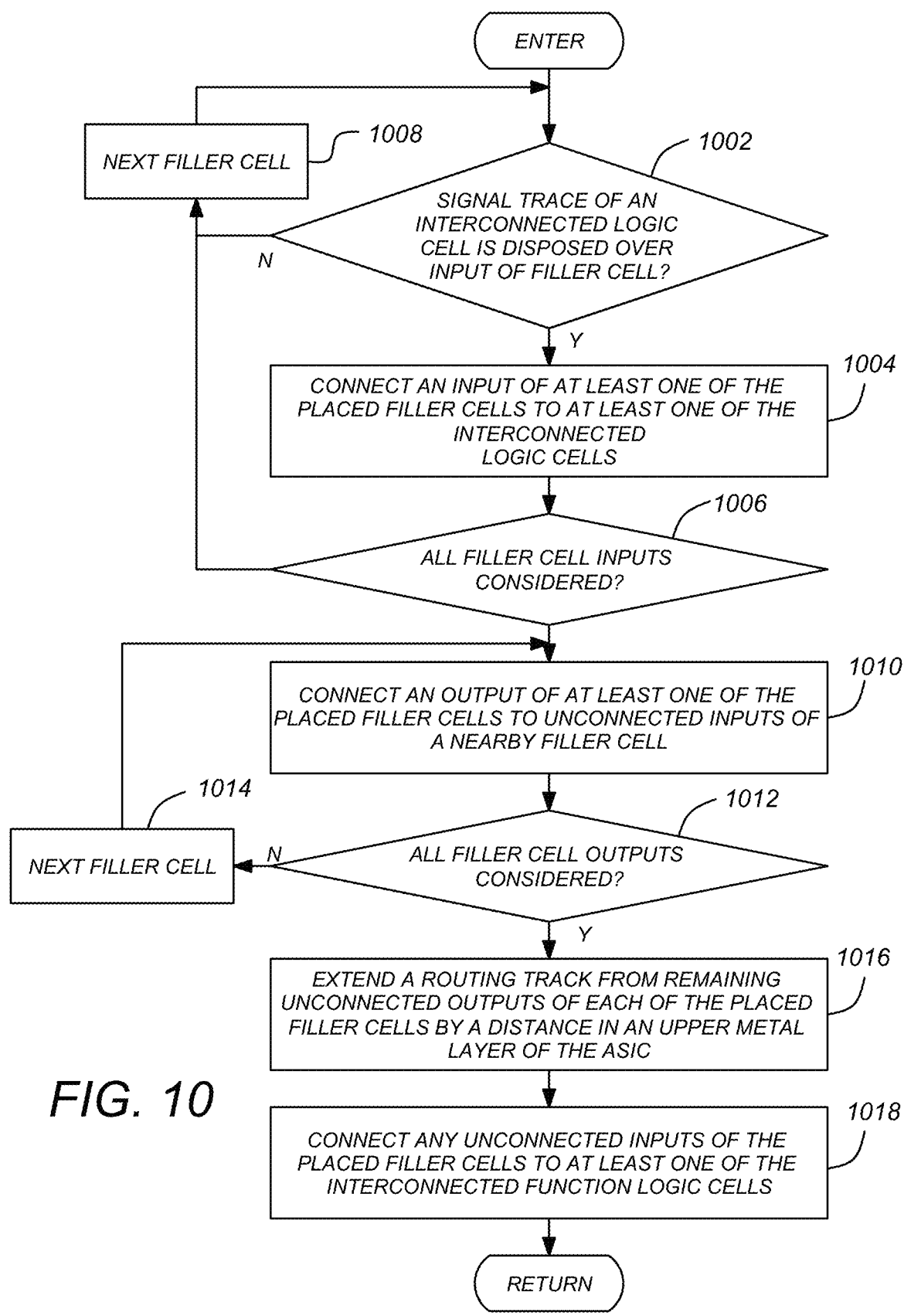
FIG. 10 is a diagram presenting exemplary operations that can be used to route the placed filler cells.

FIG. 10 is a diagram presenting exemplary operations that can be used to route the placed filler cells. The illustrated steps can be performed on a general or special purpose computer using interfaces standard to ASIC design programs.

The first routing connects the inputs of the filler cells to the existing ASIC network if those ASIC network signals go directly over the filler cell 430 inputs in the Metal 1 layer. Standard logic cells 102 and also the filler cells 430 are all designed such that inputs and outputs are in the metal 1 layer, making the higher metal layers available for routing between cells.

First, as shown in block 1002, the ASIC layout is examined to determine if a signal trace of an interconnected logic cell 102 is disposed over an input of a placed filler cell 430. If not, the next filler cell 430 is examined, as shown in block 1008. If a signal trace of an interconnected logic cell 102 is disposed over an input of a placed filler cell 430, an input of at least one of the placed filler cells 430 is connected to at least one of the interconnected logic cells 102, as shown in block 1004. This process is repeated until a desired number filler cell 430 inputs have been considered, as shown in block 1006. In one embodiment, all filler cells 430 inputs are connected to an interconnected logic cell 102 wherever possible.

Figure 11:
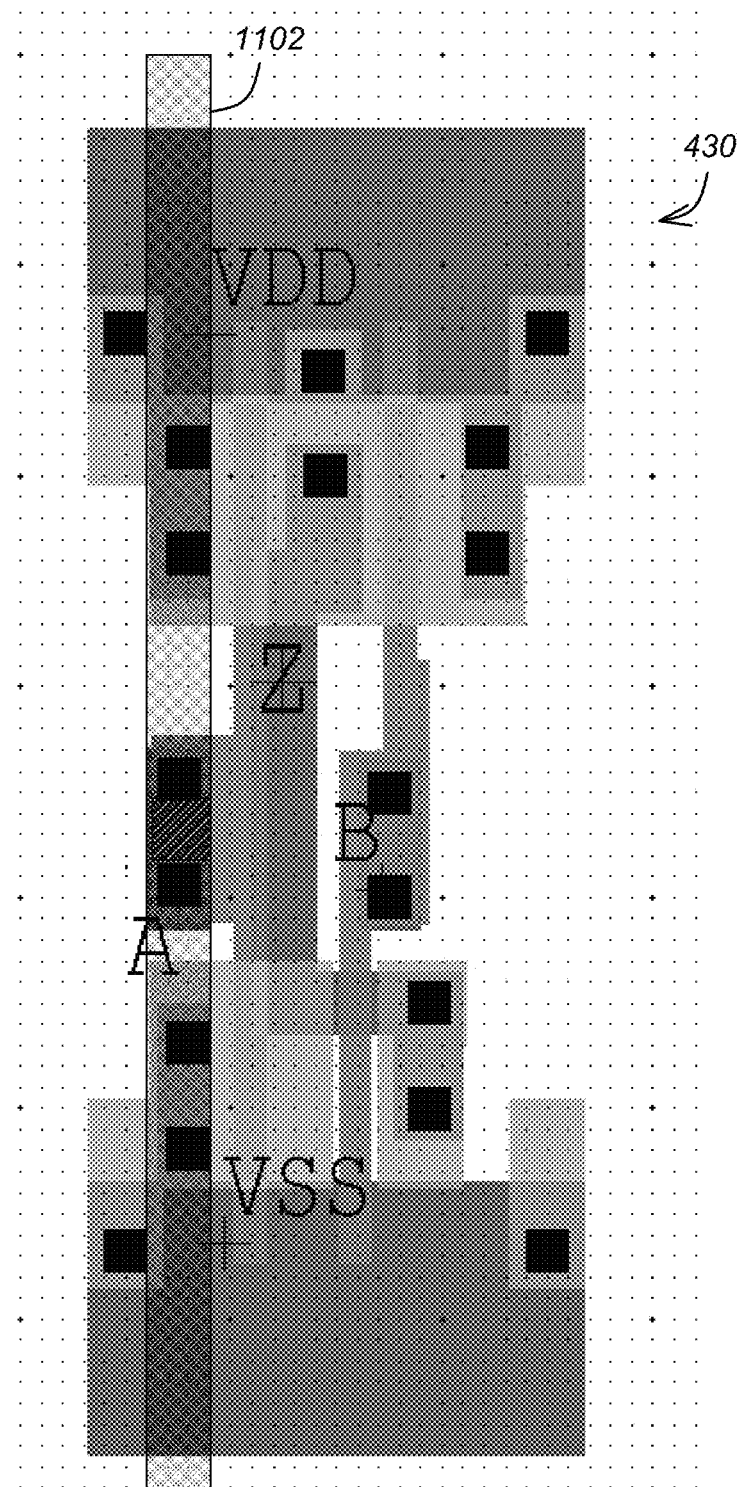
FIG. 11 is a diagram illustrating a signal wiring or trace in a metal 2 layer from the ASIC network running on top of the filler cell input A disposed in the metal 1 layer.

FIG. 11 is a diagram illustrating a signal wiring or trace 1102 in the metal 2 layer from the ASIC network running on top of the filler cell 430 input A disposed in the metal 1 layer 406. This condition is detected and a via is placed to connect the ASIC signal trace 1102 in the Metal 2 layer 202 to the filler cell 430 input A in the Metal 1 layer 406. The input of the filler cell 430 is recognized by the special 'input layer' in the filler cell design. Once an input of a filler cell 430 is connected, a routing program generates another identification layer to differentiate this filler cell 430 input from other (currently uncommitted or unconnected) filler cell 430 inputs. Since only the inputs of filler cells 430 are connected to the ASIC signals (and not the outputs), these connections result in only a minor increase of the capacitive loading on those tapped ASIC signals, and they will not change the ASIC logic function.

Next, the outputs of the filler cells 430 are connected (via signal traces) to nearby uncommitted inputs of other filler cells 430, as shown in block 1010.

Figure 12:
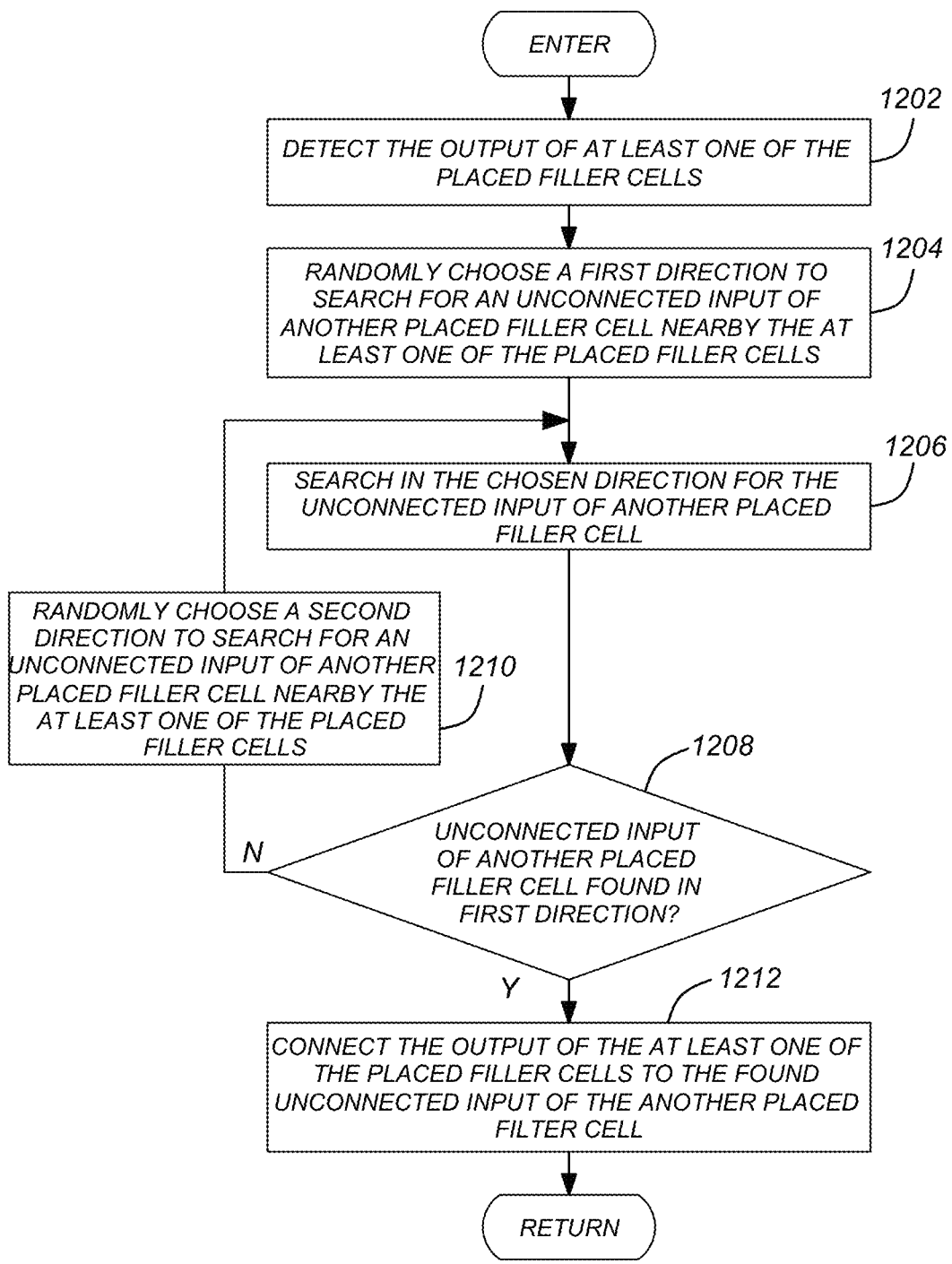
FIG. 12 is a flow chart illustrating exemplary method steps that can be used to connect filler cell outputs to nearby uncommitted inputs to other filler cells.

FIG. 12 is a flow chart illustrating exemplary method steps that can be used to connect filler cell 430 outputs to nearby uncommitted inputs to other filler cells 430. In block 1202, the presence of an output of a filler cell 430 is detected by the recognition of the output identification layer in the filler cell 430 design. Then, a direction is chosen (preferably randomly) to search for an unconnected input of another placed filler cell 430, as shown in block 1204. In one embodiment, the direction is chosen as either left, right, up or down to start a search and the search is performed within a certain 'search dimension' in width and length, for the presence of any input of other filler cells 430. A search is then performed in the chosen direction for an unconnected input of another placed filler cell 430, as shown in block 1206.

If an unconnected input of another filler cell 430 is identified, one or more layers of higher level metal layers and vias are used connect the output of the first identified filler cell 430 to the input of the second identified filler cell 430, as shown in block 1212. If the search does not find any other filler cell in one direction, it will start the search with another direction, which may also be chosen at random, a shown in blocks 1208 and 1210. At the same time, if an input of another filler cell 430 is identified but the routing program can not make the connection between the identified output and input (for example, due to wiring congestion or too many traces already located in the area between the output and input), it will start the search in another direction.

Returning to FIG. 10, the operations of block 1010 (which are described in more detail in FIG. 12) are repeated until all of the filler cell 430 outputs have been considered, as shown in blocks 1012 and 1014.

The 'search dimension' is a parameter controlling the area (length and width) of the search. If this dimension is too large, the time of each search may become excessively long, while a search dimension that is too small will result in a high percentage of filler cell 430 outputs not able to find any other filler cell 430 input to make a connection. The value of the 'search dimension' can be optimized based on the size and routing trace congestion level of the ASIC.

In general, the 'search dimension' is defined in terms of the number of metal routing tracks in horizontal direction and the number of rows of logic cells in the vertical direction. Optimal 'search dimension' values can be between '1 row by 50 tracks' to '5 rows by 500 tracks'.

Another parameter used in the second routing program is the 'number of inputs' to which an identified output will be connected. The 'number of inputs' parameter can also be a randomly chosen number for each identified filler cell 430 output with a value between 1 and 6, for example. The 'number of inputs' parameter determines the maximum number of filler cell 430 inputs for which an identified filler cell 430 output is to be connected. This parameter value is also equivalent to the maximum number of input searches that will be performed for each identified filler cell 430 output. For example, if the value is randomly picked at '2' for a specific filler cell 430 output, this output will be connected to '2' or fewer inputs of other filler cells 430 (some searches may end up with no connection due to wiring congestion). In this example, this portion of the routing process will stop after the second search-and-route process for this filler cell 430 output.

In one embodiment, an attempt is made to connect the output of every placed filler cell 430 to some input of other filler cells 430. The identification of a filler cell 430 output is through a special "identification" layer designed in the filler cell 430. The identification layer is a special design layer that is defined to differentiate this filler cell from the other ASIC standard logic cells (when the presence of this layer is detected, the cell is a filler cell). The identification layer can be thought of as a layer that is "opaque" over the regions of filler cells and "transparent over regions of functional logic cells, but is not physically realized in the ASIC. To find a filler cell output, the identification layer can be examined in each row of cells of the ASIC standard cell region.

Figure 13A:
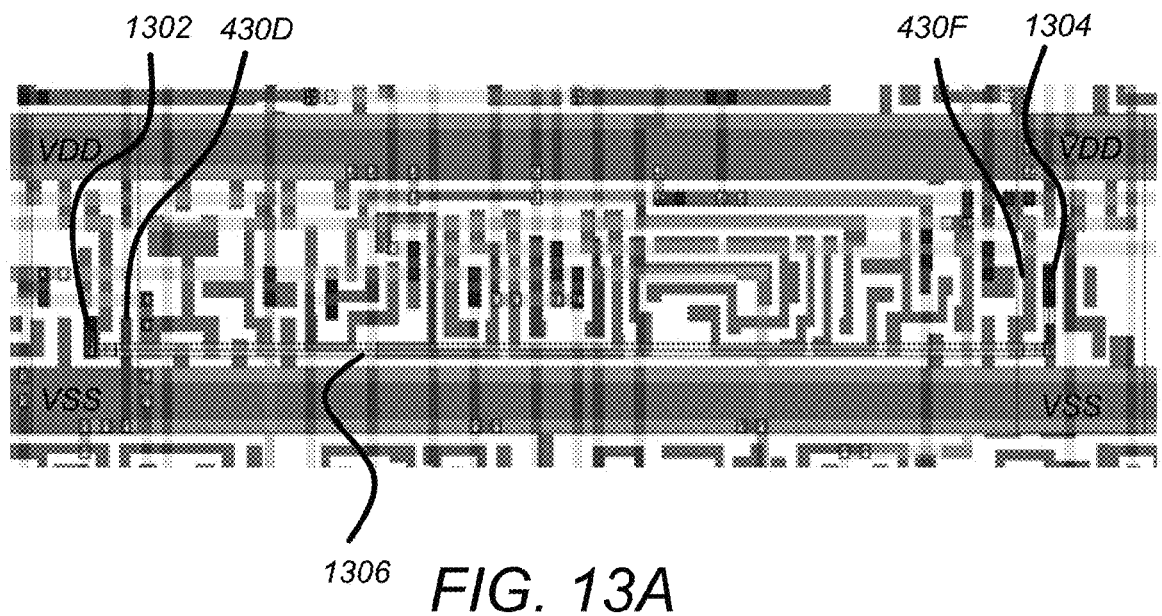
FIGS. 13A and 13B are diagrams illustrating a portion of an ASIC, showing an example of a trace routed by using described techniques.
Figure 13B:
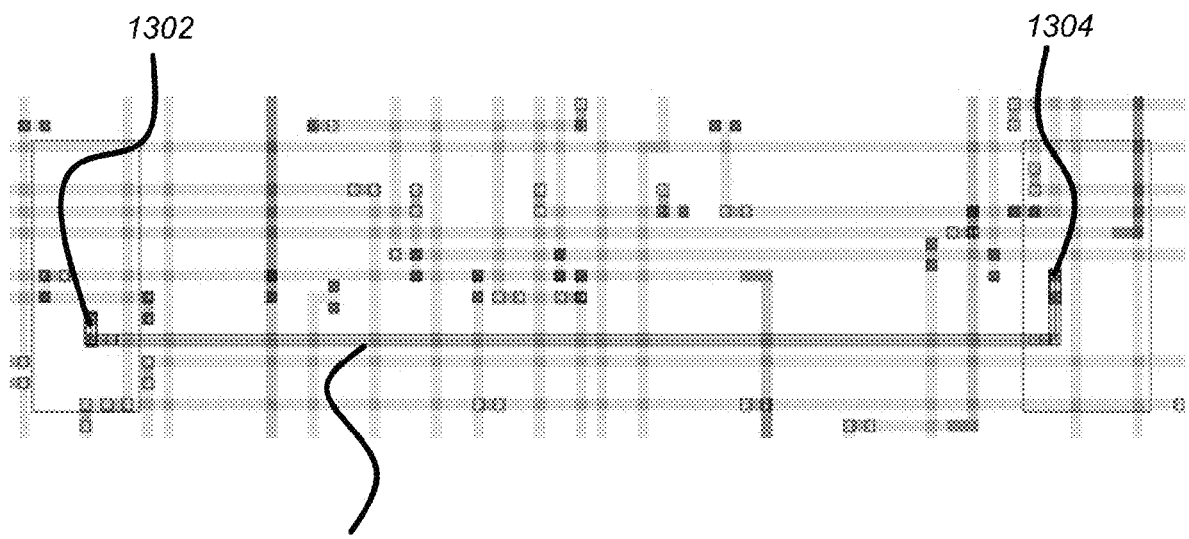

FIGS. 13A and 13B are diagrams illustrating a portion of an ASIC, showing an example of a trace routed by using the foregoing technique. The output 1302 of a filler cell is identified, and a search is made in the horizontal direction to find the nearest filler cell 430 input 1304, resulting in the routing of a metal trace 1306. FIG. 9A shows the several layers of the ASIC including the metal 1, via 1, metal 2, via 2, metal 3 and via 3 and metal 4 layers. FIG. 9B illustrates the same ASIC and routing as FIG. 9A, but does not depict the metal 1 layer, thus providing a clearer view of the connection wire (or signal trace) defined using the technique described above. An output 1302 for the filler cell 430D at the left was detected, and it was randomly determined to search horizontally to the right of the filler cell 430D. Within the predefined 'search dimension' (in this example, 2 rows by 50 tracks) another filler cell 430F was found with its input A 1304 uncommitted. A wiring connection 1306 from the output of the first filler cell 430D to the input of the further filler cell 430F was defined. This wiring connection 1306 was routed in the Metal 2 layer to via 1, touching down to the output or input in the Metal 1 layer of both filler cells 430D and 430F, then with the Metal 3 layer and Via 2 making the final connection between the two traces in the Metal 2 layer. In this example, the parameter 'number of inputs' was picked randomly to be 1. Therefore, the process stops further searches after one input is routed to this identified output.

There are two scenarios in which the output of a filler cell 430 will complete the foregoing processes and remain with no connection with a connection to the input of another filler cell 430. The first is if no input of any other filler cell 430 is identified after searching in all four directions. The second is, when the ASIC wiring in that specific area is congested to the point that no wiring connection is possible within the 'search dimension'.

Returning to FIG. 10, for these remaining unconnected filler cell 430 outputs after the performance of the operations of blocks 1002-1012 of FIG. 10, operations are performed to extend the routing track or wiring connection of the uncommitted filler cell 430 output to a distance by wiring in higher metal and via layers of the ASIC, as shown in block 1016. The goal of this extension is not to target the connection between outputs and inputs of filler cells 430. Instead, its purpose is to camouflage the filler cell 430 output by connecting to that filler cell 430 output what appears to be a functional routing wire.

Figure 14:
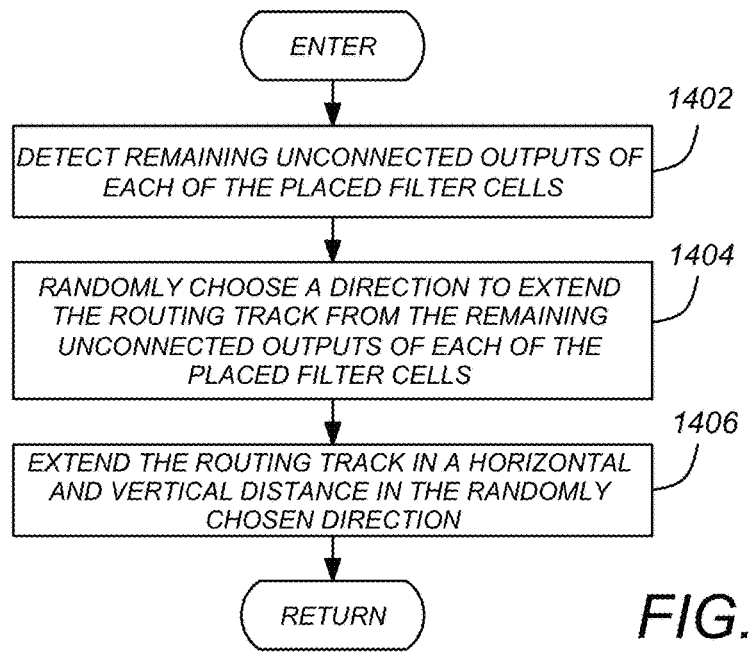
FIG. 14 is a diagram illustrating exemplary method steps that can be used to extend a routing track from remaining unconnected outputs of the placed filler cells.

FIG. 14 is a diagram illustrating exemplary method steps that can be used to extend a routing track from remaining unconnected outputs of the placed filler cells 430, as described in block 1016 of FIG. 10.

First, block 1402 detects the unconnected filler cell output of each of the placed filler cells 430. Block 1404 then picks a direction (e.g. left, right, up or down) to extend the routing track from the remaining unconnected outputs of each of the placed filler cells 430. The direction may be randomly chosen. Then, a routing track or wiring connection is extended from the filler cell 430 output to higher metals through vias, thus extending the output signal of the filler cell 430 to a horizontal and vertical distance along the chosen direction. This is shown in block 1406.

The 'total horizontal length' and the 'total vertical length' of wiring are the two controlling parameters that define the horizontal and vertical metal length by which the router can extend the output connector. The process described in FIG. 14 will stop the horizontal metal extension when the actual extended horizontal length of the metal reaches the specified 'total horizontal length'. It also stops the vertical extension if the same condition for vertical extended metal is met. In the example described here, the metal 1 and metal 3 layers may be used for horizontal extension while the metal 2 and metal 4 layers may be used for vertical extension. For each filler cell 430 output being extended, the parameters of the 'total horizontal length' and the 'total vertical length' can be chosen to be a random number in microns (um) between 10-200.

Preferably, the extended metal wiring is realized as much as possible in the highest level of metal layers (e.g. the metal 4 layer for vertical extension and the metal 3 for horizontal extension). This is for two reasons. The first is to avoid the metal 2 and metal 1 layers, which are typically more congested due to the routing between functional logic cells 102 in the ASIC. This is because ASICs usually consume more of the lower metal layers, metal 2 and metal 1, for inter-cell 102 routing and for internal connections within the logic cells 102. The other purpose of having the filler cell 430 outputs extended to higher metal layers is to prepare for the future possible tapping of these extended output signals to metal features created in the metal fill process. Examples of the metal fill process are described in U.S. Pat. No. 6,924,552, which is hereby incorporated by reference herein.

The metal fill process in can also be used to fill up all unused metal tracks to further camouflage the ASIC to protect it from reverse engineering.

The metal fill process will produce a large number of floating metal structures that can be differentiated by the voltage contrast technique in a reverse engineering process using a scanning electron microscope. Connecting some of these filled metals to known potentials will make them look like real connectors under voltage contrast. Due to the fact that reverse engineering starts the attack with the highest layer of metal, a floating metal trace at the highest level will reveal that both it and the traces in the lower metal layers connected to it are false connectors. Hence, it is desirable to have as many as possible of the highest-level metal traces generated from the metal fill process connected to a known voltage potential. Bringing the filler cell 430 output voltages, either Vdd or Vss, to the highest level of metal layer (the metal 4 layer in this discussion) makes the tapping of the high layer metals generated from the metal fill process easier and will result in a higher percentage of such high level metals being connected to known potentials.

In areas with highly congested routing wires, the third routing program will stop when there is no possible route for the continuation of the metal layer extension before the specified 'total extended length' is reached.

Figure 15:
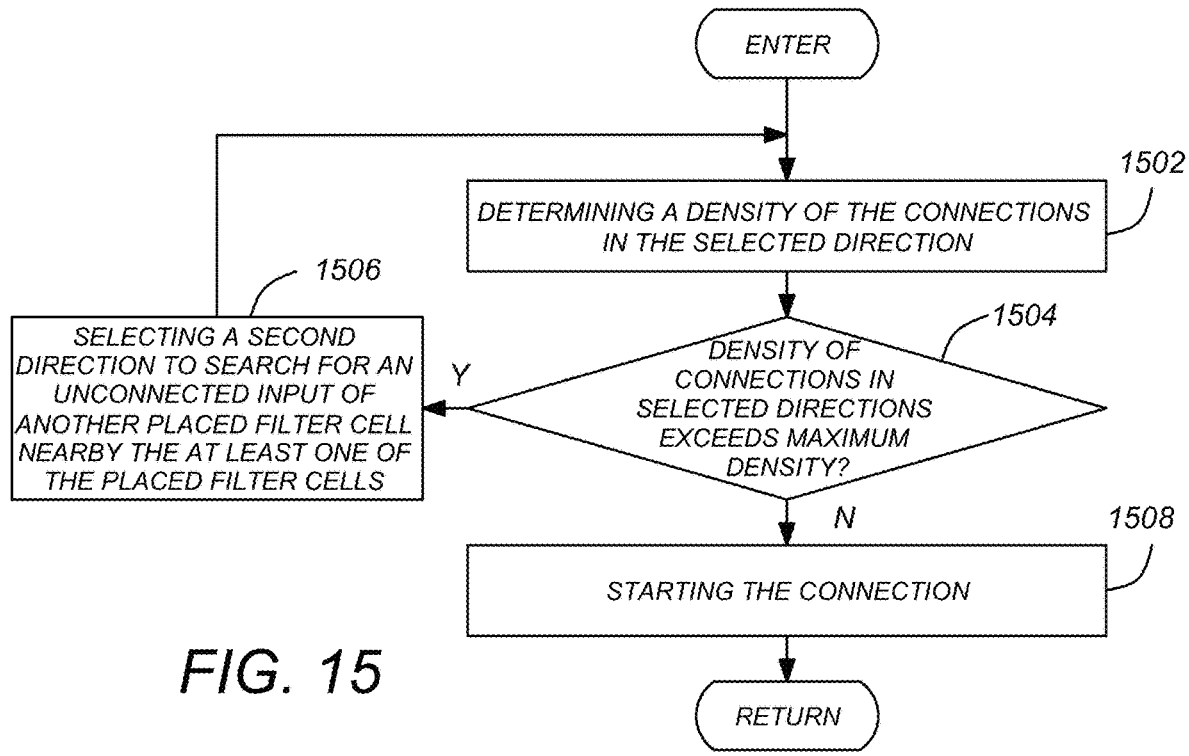
FIG. 15 is a diagram illustrating exemplary method steps that account for the situation where no possible routes are definable.

FIG. 15 is a diagram illustrating exemplary method steps that account for the situation where no possible routes are definable (e.g. due to congestion). First, the density of connections in the selected direction is determined, as shown in block 1502. If the density of connections exceeds a maximum density, a different direction is selected, as shown in blocks 1504-1506. If the density does not exceed the maximum density, the connection is begun in the selected direction and extended the desired length, as shown in block 1408.

Figure 16:
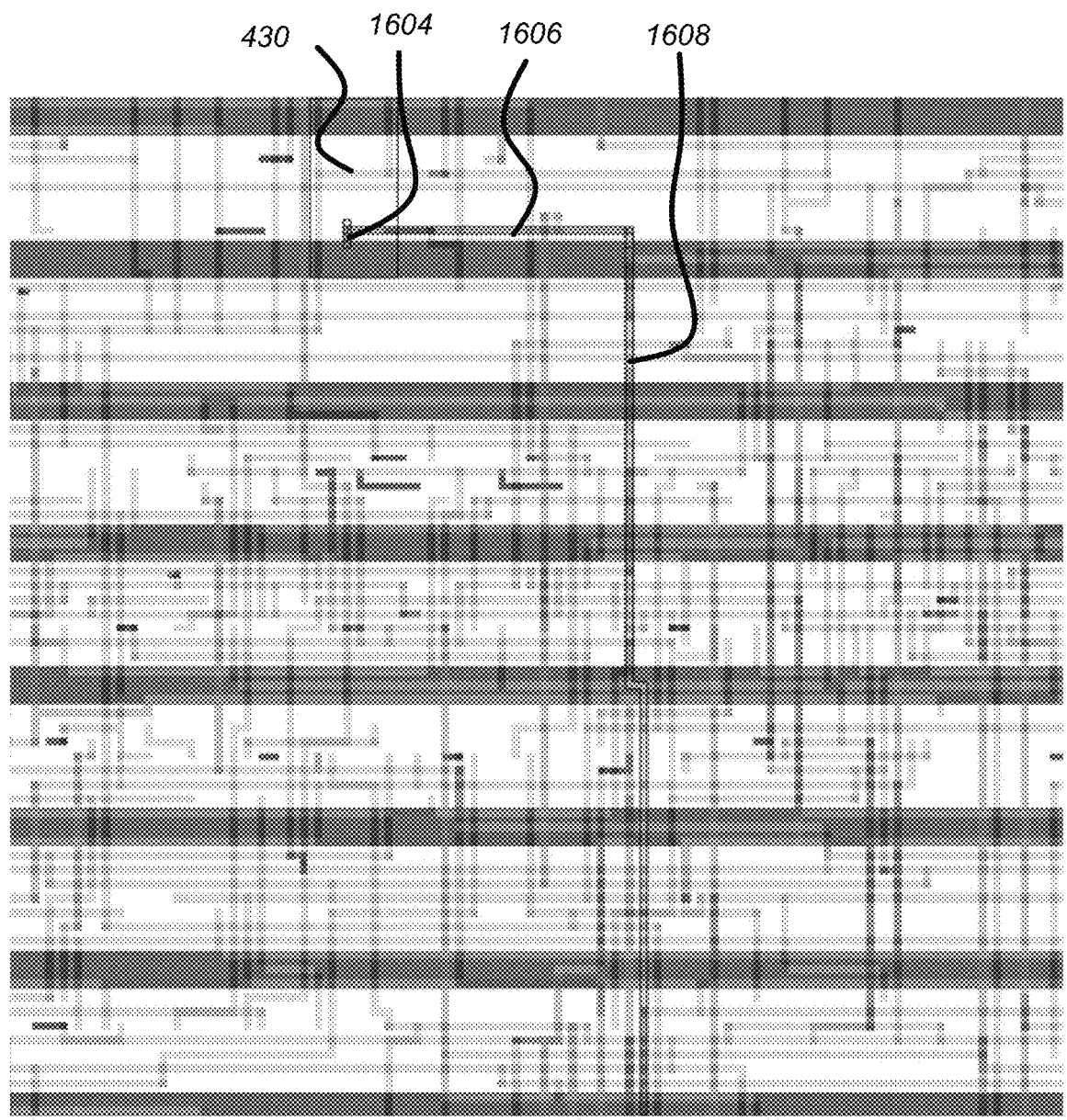
FIG. 16 is a diagram illustrating an exemplary result of the extension process.

FIG. 16 is a diagram illustrating an exemplary result of the extension process described above. An output 1604 of a filler cell 430 being extended 8 um horizontally in the metal 3 layer by a first trace portion 1606 and 25 um vertically in the metal 4 layer 1608.

After the third routing, the outputs of placed filler 430 cells are connected to some higher metal layers and extended a distance away from the filler cells 430. However, there are still some filler cell 430 inputs which are not connected anywhere and left floating.

Figure 17:
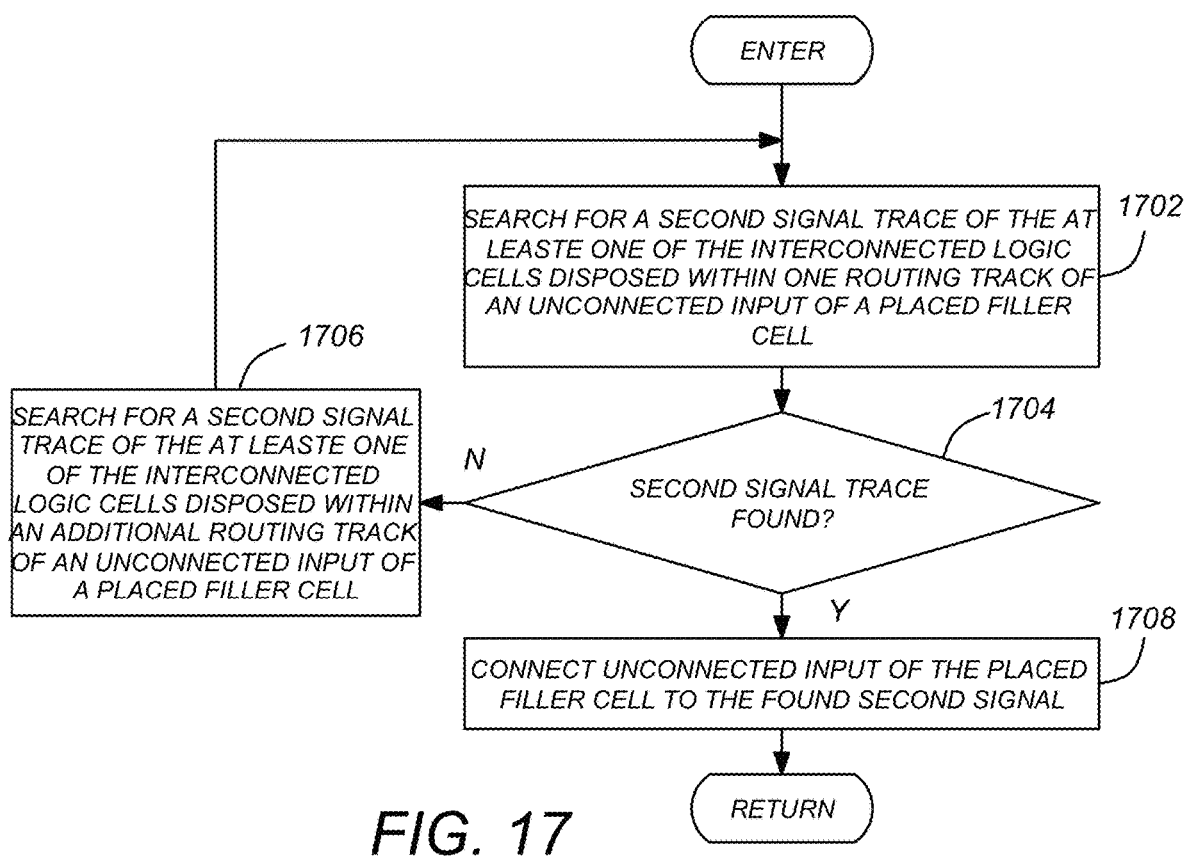
FIG. 17 is a diagram illustrating exemplary method steps that can be used to connect the remaining filler cell inputs to further ASIC logic cell signals.

FIG. 17 is a diagram illustrating exemplary method steps that can be used to connect the remaining filler cell 430 inputs to further ASIC logic cell 102 signals.

A search is performed for a second signal trace of at least one of the ASIC signals in the interconnected logic cells 102 (not signals from the output of the filler cells 430) disposed within one routing track of a floating (unconnected) input of a placed filler cell 430, as shown in block 1702. Typically, this search is performed in the metal 2 layer.

If a second signal trace is found, the unconnected input of the placed filler cell 430 is connected to the found second signal, as shown in block 1708. This can be accomplished by creating a connection between the floating filler cell 430 input to the chosen signal using higher metal layers and vias.

If a second signal trace is not found within one track, an expanded search is performed until an interconnected logic cell 102 signal is found, as shown in blocks 1704 and 1706. Typically, the search is expanded by searching for a second signal trace of an interconnected logic cell 102 within two signal tracks, then three signal tracks, until a second signal trace is identified. This process continues until a second signal trace is found or is determined to be unavailable. In case more than one signal is found within the same distance from the floating input node of the filler cell, one of them is picked at random.

Figure 18A:
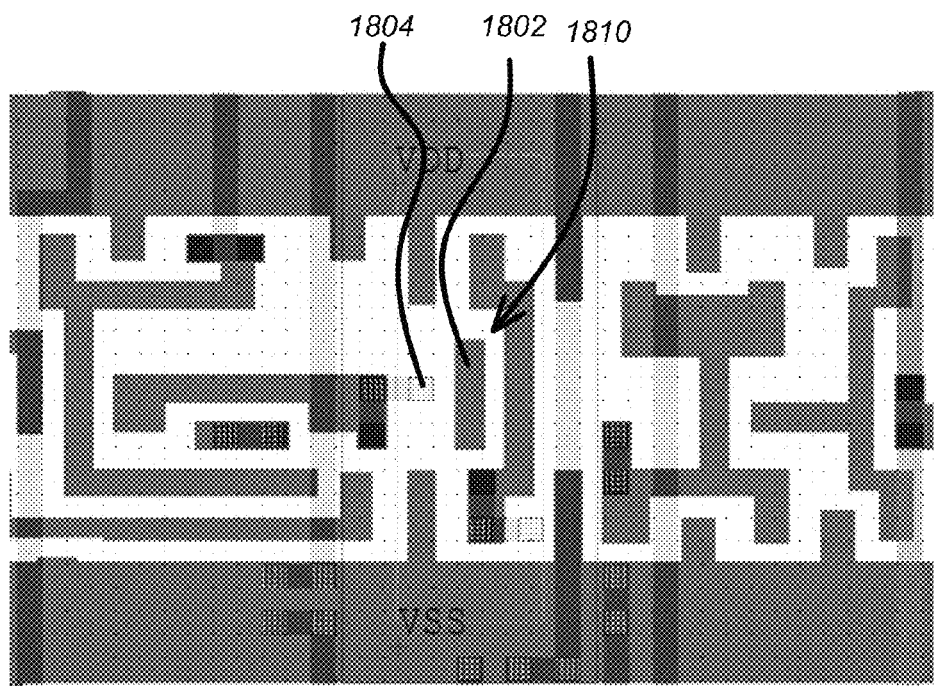
FIG. 18A is a diagram showing an example of a signal trace found one track away from a floating unconnected input of a filler cell.
Figure 18B:
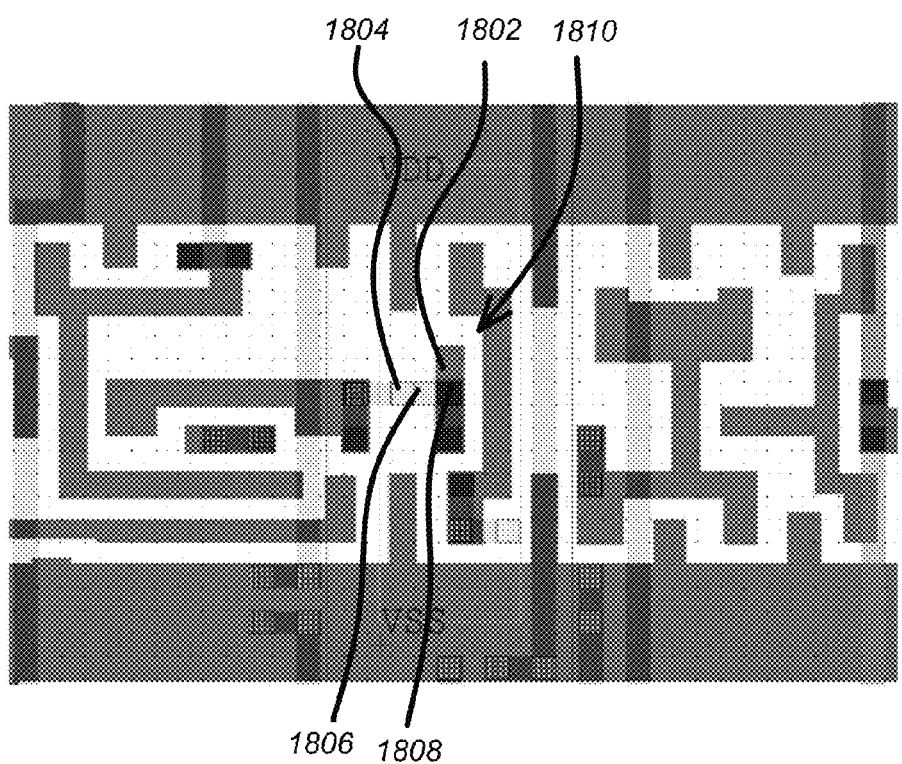
FIG. 18B shows a connection between the filler cell input and a chosen ASIC signal 1804.

FIG. 18A is a diagram showing an example of a signal trace 1804 found one track away (and to the left) from the floating unconnected input A of filler cell 1810 in the metal 2 layer 1802, on the left side of the unconnected input A of the filler cell. FIG. 18B shows the connection in via 1 and metal 2 layers created between the filler cell input A 1802 and the chosen ASIC signal 1804.

At this point, all filler cell 430 inputs and outputs are connected or extended to some higher level metal layers.

Next, a metal fill process can be performed to generate ASIC-like routing metal wirings and vias to fill up all unused routing channels available in the ASIC areas. An exemplary method to perform this metal fill process is described in U.S. Pat. No. 6,924,552, which is hereby incorporated by reference herein. The metal fill process is a very strong ASIC protection technique that increases the quantity of image information that a reverse engineer has to analyze by 5 to 10 times.

Because a floating metal wire can be easily identified using voltage contrast techniques with a scanning electron microscope, the effect of the metal fill process in protecting ASIC from reverse engineering can be enhanced by connecting as many metal fill wirings as possible to a known voltage.

After the metal fill process, another process can be performed to propagate the output voltage of filler cells 430 to the floating metals generated by the metal fill process described above.

Figure 19:
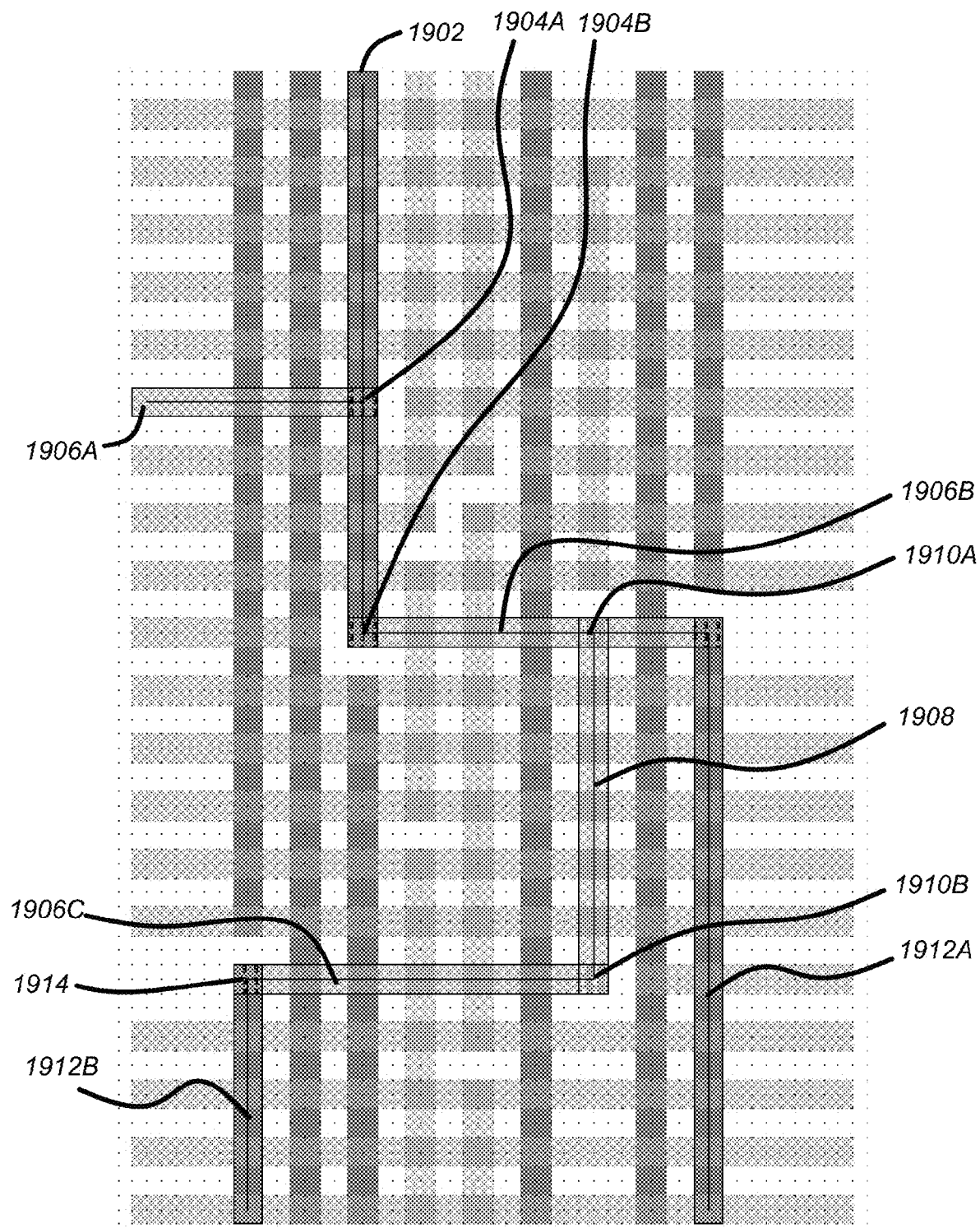
FIG. 19 is a diagram showing an illustration of the process of propagating the output voltage of filler cells to floating metals generated by the metal fill process.

FIG. 19 is a diagram showing an illustration of the process of propagating the output voltage of filler cells 430 to floating metals generated by the metal fill process. In the illustrated example a filler cell extension 1902 has been generated in the metal 4 layer as described in FIG. 14. Further, the above-described metal fill process is performed in the metal 3 and metal 4 layers, resulting is traces 1908 (created in the metal 2 layer), 1906A, 1906B and 1906C (created in the metal 3 layer).

This process starts with the filler cell output extension in the metal 4 layer generated from using the process illustrated in FIG. 14, then searches for any areas in the metal 3 layer filled using the metal fill process above its end region lying just under that piece of extension in the metal 4 layer. Once such a filled metal 3 is found, the process generates a via 1904B at an endpoint of the Metal 3 layer trace 1906A connecting the extended Metal 4 level trace 1902 to the filled Metal 3 layer trace 1906B. These filled Metal 3 layer traces carry the voltage potential of the filler cell 430 output after they are connected with the via 1904B.

The process may propagate the filler cell output voltage present at 1902 further by repeating the same extension process described above. The process then searches for any metal 2 layer trace from metal fill process with its endpoint lying exactly under the connected metal 3, and places a Via 2 1910A there to connect the filled metal 2 layer trace 1908 to the metal 3 layer trace 1906B, as shown in FIG. 19. The result is that the filler cell 430 outputs propagate through the metal 4 layer extension 1902 generated earlier to some filled metal 3 layer trace 1906A, 1906B, and additionally to some filled metal 2 layer trace 1902 generated in the metal fill process. Filled metal 2, 3 and 4 layer traces here are referring to the metal layers traces created in the metal fill process.

This routing process forms connections between a higher metal layer traces (metal 4) to lower metal layers traces (metal 3 and metal 2). The process also forms connections from the lower filled metal 2 layer traces to higher level filled metal 3 traces, and again to the filled metal 4 layer traces as long as the endpoint overlap condition of the two adjoining metal layers is met. This type of connection is shown in FIG. 19 where a metal 2 geometry trace 1908 is connected to the filler cell 430 output (by extension 1902) in the earlier propagation process, and is further connected to another of filled metal 3 layer trace 1906A-1906C.

A similar extension from filled metal 3 layer trace 1906C to filled metal 4 layer trace 1912B and connection by via 1914 is also shown in the FIG. 19. The propagation of the output signal in the fifth routing program will stop when it cannot find any more endpoint overlap of metal layers. Using the metal layer endpoint overlap as a condition for the propagation (as opposed to making inter-layer connections elsewhere along the traces) makes sure the created connection has a similar appearance to the normal wiring of an ASIC. Note that the process need not investigate the metal 1 layer traces, since all possible metal 1 empty spaces were already used during the placement of the filler cells 430.

There are two filler cell 430 output voltages, Vdd and Vss. A further process may be used to start first with those filler cell 430 outputs at the Vdd potential and carry out the propagation of the Vdd voltage to the filled metal layers. After finishing the Vdd output propagation, all the filled metals connected to Vdd will be identified and restricted from the next extension step. This is a process connecting the filled metal traces to the output of 'some' filler cells. Since there are two types of filler cell outputs either at Vdd or Vss, separating the extension process into 'Vdd only' and 'Vss only' avoids the possibility of shorting the Vdd to Vss in the extension. The routing is from the outputs of the filler cells. However, these outputs are all (internally) connected to either Vdd or Vss). Then, filler cell outputs at Vss are propagated to the rest of the filled metals. The purpose of separating the process into the foregoing two steps is to avoid any possible short between Vdd and Vss during the propagation of metal connections.

Figure 20:
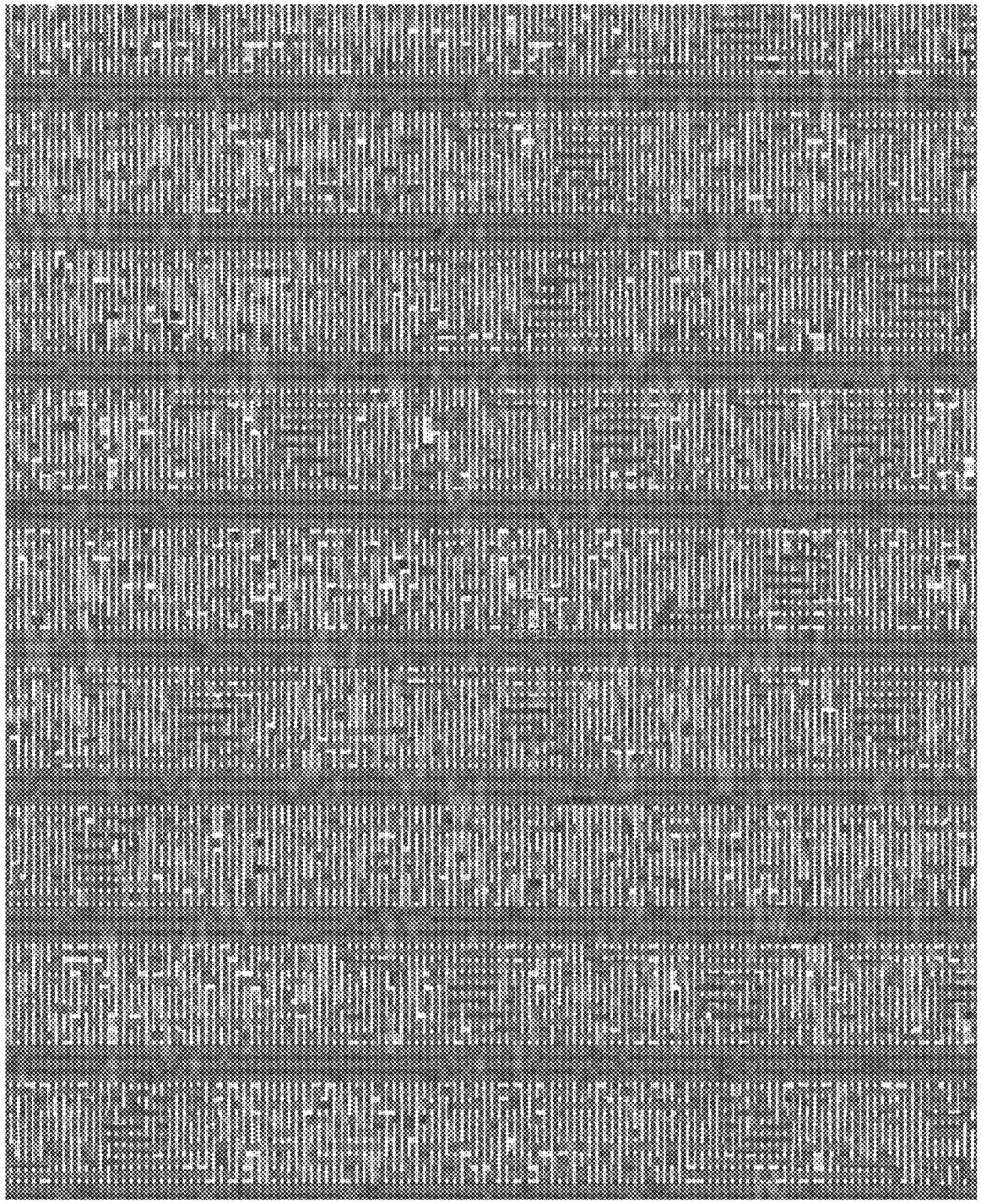
FIGS. 20 and 21 show the final layout of a portion of the ASIC after going through the filler cell placement and all the wire routing procedures described herein.
Figure 21:
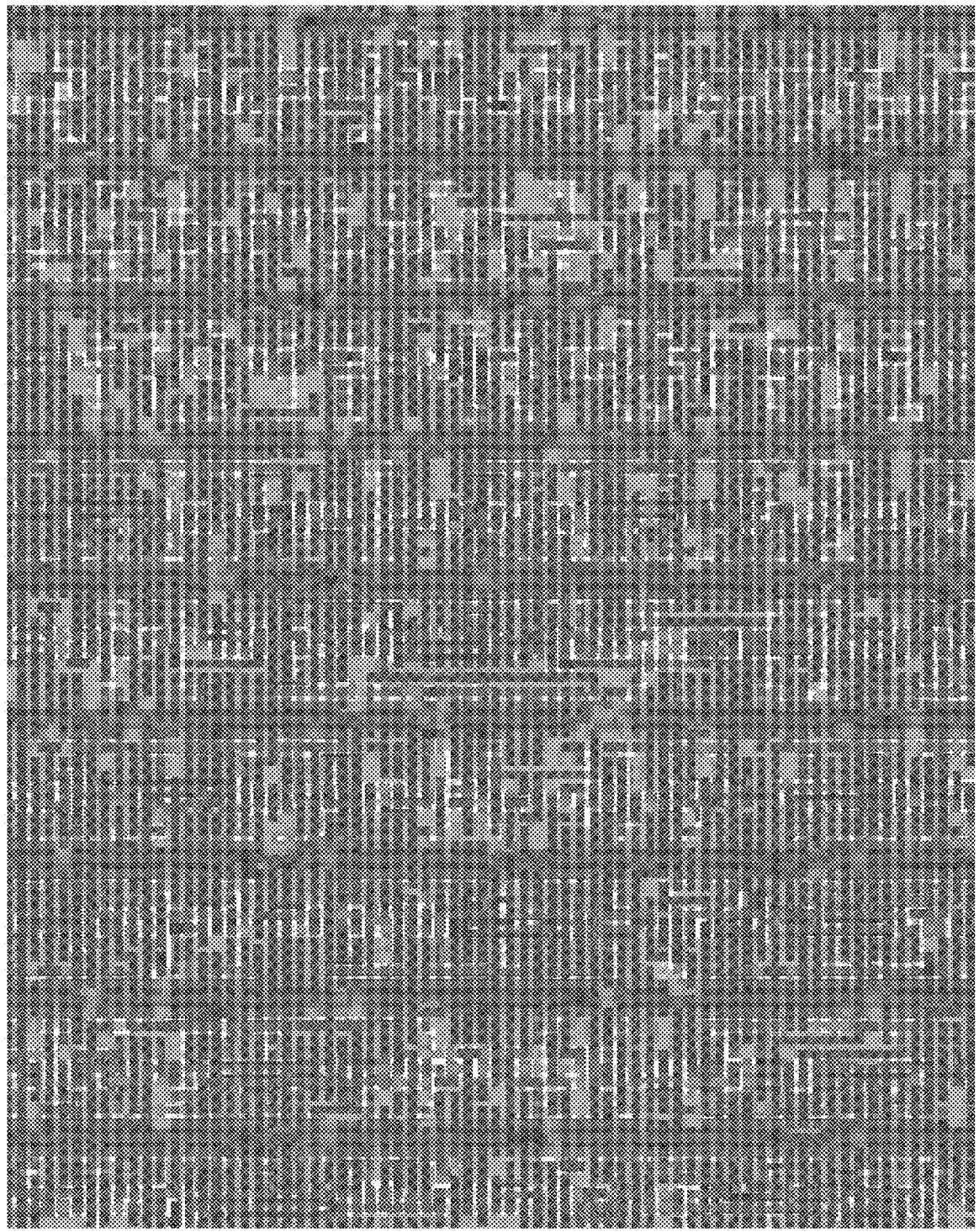

At the end of this process, the ASIC 100 will contain many times more data than the original design, which makes the reverse engineering effort much more difficult. FIGS. 20 and 21 show the final layout of a portion of the ASIC after going through the filler cell placement and all the wire routing procedures described above. FIG. 20 displays only metal layers so as to show the camouflage effect in the metal wiring, while FIG. 21 shows all layers of the ASIC 100 design.

The ASIC 100 camouflage technique described above involves the addition of specially designed filler cells 430 and wiring connections in, preferably, all metal layers. These wiring connections occur from filler cells 430 to filler cells 430, from filler cells 430 to the logic cells 102 of the ASIC 100, and from filler cells 430 to floating metals generated in the metal fill process.

This process can be performed on the final GDS release of an uncamouflaged ASIC 100 design, and thus there will not be any impact on the uncamouflaged ASIC 100 design. The physical size of the ASIC's silicon die (die area) will not be changed since all added circuits and wires use only the unused silicon areas and the vacant metal tracks available in the ASIC 100. Although some filler cell 430 inputs are connected to the ASIC 100 circuit network, the ASIC 100 logic function is not altered. However, there will be a minor increase in the capacitive loading of the tapped ASIC logical cell 102 outputs (due to the added connections to the inputs of the filler cells and to the proximity of the additional filler metal traces). A timing analysis of the post-camouflage ASIC may be performed to verify the timing requirements of the ASIC 100 before production release.

During the reverse engineering of an ordinary ASIC 100, the chip is imaged layer by layer under optical or scanning electron microscopy. The effort first focuses on identifying the function of logic cells 102 by extracting their circuit connections. The logic cell 102 extraction process is very straight forward for a standard cell library with no protection.

An ASIC design usually uses 200 to 300 distinct cells from the standard cell library. Reverse engineering can recognize hundreds of these logic cells in an ASIC within one to two weeks. Because of the unique layout of every logic cell 102, a signature of each logic cell 102 can be established in the metal 1 layer (which is used for device connections within the cell 102). Once logic cells 102 are recognized through circuit analysis, reverse engineering can use the metal 1 layer pattern as a recognition layer to identify the logic cells 102 in the ASIC 100. By recognizing the pattern in metal 1 layer, reverse engineering does not need to re-analyze the circuit for other instances of that logic cell 102. Hence, to pirate a 100-thousand-gate ASIC 100 design, the circuit analysis effort will be the same as a 1-thousand-gate design.

After the circuit extraction and identification of the two to three hundred library cells, extracting the ASIC netlist can begin by tracing the metal wire connections throughout the images of the ASIC's metal layers. Due to the addition of the special filler cells 430 with the same metal 1 layer pattern as a standard logic cell 102, an ASIC 100 protected with this invention will invalidate the reverse engineering assumption of a unique metal 1 pattern for each logic cell 102. Reverse engineering is forced to review all the device formation layers (Active, Poly, Implants and Contact) of every cell in the ASIC 100 area to determine its logical function. This will multiply the circuit extraction and cell identification effort by many times. This technique is even more effective for ASICs 100 with relatively large gate counts. The metal wirings generated in the different routing programs will make these filler cells 430 appear to be part of the ASIC 100 logic and make it difficult to sort them out.

For the camouflage of the metal wiring, the metal fill process described in the '552 patent is effective in resisting reverse engineering attempts to extract the logic netlist. However, many wires generated using this metal fill process are floating and are not driven by any voltage source. They are detectable by voltage contrast techniques with a scanning electron microscope (SEM). The voltage contrast techniques give different brightness levels to connectors or nodes in an ASIC 100 under a SEM according to their voltage potential. Any floating highest level metal layer (Metal 4 in this disclosure) from the metal fill process can be identified with this technique and eliminated from the image data during reverse engineering. Lower levels of floating metal layers, although identified by voltage contrast imaging, can not be eliminated in a reverse engineering effort since some real ASIC 100 routing connectors will show as floating after the de-layering of the higher metal layers. The last process described above provides a high percentage of otherwise floating metals from the metal fill layers with logic level potentials of either Vdd or Vss. This provides a strong enhancement to the metal fill process.

Other Camouflaging Techniques

Other camouflaging techniques can be used either in addition to or in alternative to those described above. For example, combinations of filler cells 430 and logic cells 102 can be created and inserted into the functional logic cells, in such a way that the insertion does not affect the function performed. This can be accomplished by generating a logical description of a cell combination comprising a plurality of filler cells 430 (or filler cells 430 and logic cells 102) using predetermined input and output points.

Figure 22:
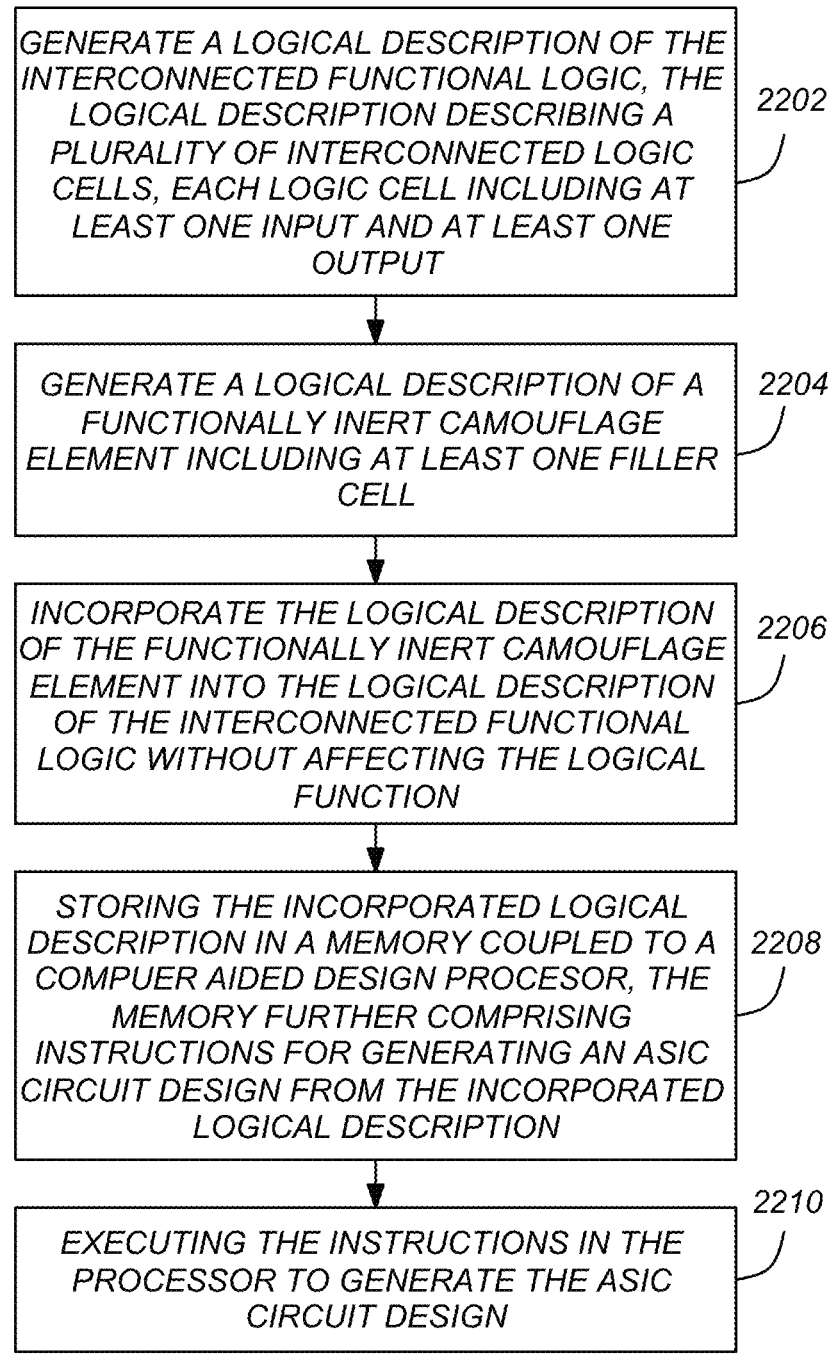
FIG. 22 is a flowchart illustrating further exemplary steps that can be used to camouflage a circuit.

FIG. 22 is a flowchart illustrating exemplary steps that can be used to camouflage a circuit. As shown in block 2202, a logical description of interconnected functional logic is generated, wherein the logical description describes a plurality of interconnected logic cells.

FIG. 23 is a diagram illustrating an exemplary embodiment of a logical description 2302 of interconnected functional logic 2304 or cell combination performing a desired logical function. The interconnected functional logic 2304 comprises logic cell 1 2306 and logic cell 2 2308.

Returning to FIG. 22, a logical description 2402 of functionally inert camouflage element that includes a filler cell 2410 is generated, as shown in block 2204.

FIG. 24 is a diagram showing an embodiment of a functionally inert filler cell 2404. The logical description of the functionally inert camouflage element 2402 is incorporated into the logical description of the interconnected functional logic, as shown in block 2206 and illustrated in FIG. 24. In the context of the present invention, a "functionally inert camouflage element" refers to a one or more individual elements, when combined together and integrated with the baseline (non-modified) circuit design, do not affect the logic function of the baseline circuit design. For example, note that since the output of logic cell 1 2306 is still supplied to the input of logic cell 2 2308, the addition of the filler cell 2404 does not affect the logical function of the interconnected functional logic 2304.

Figure 25:
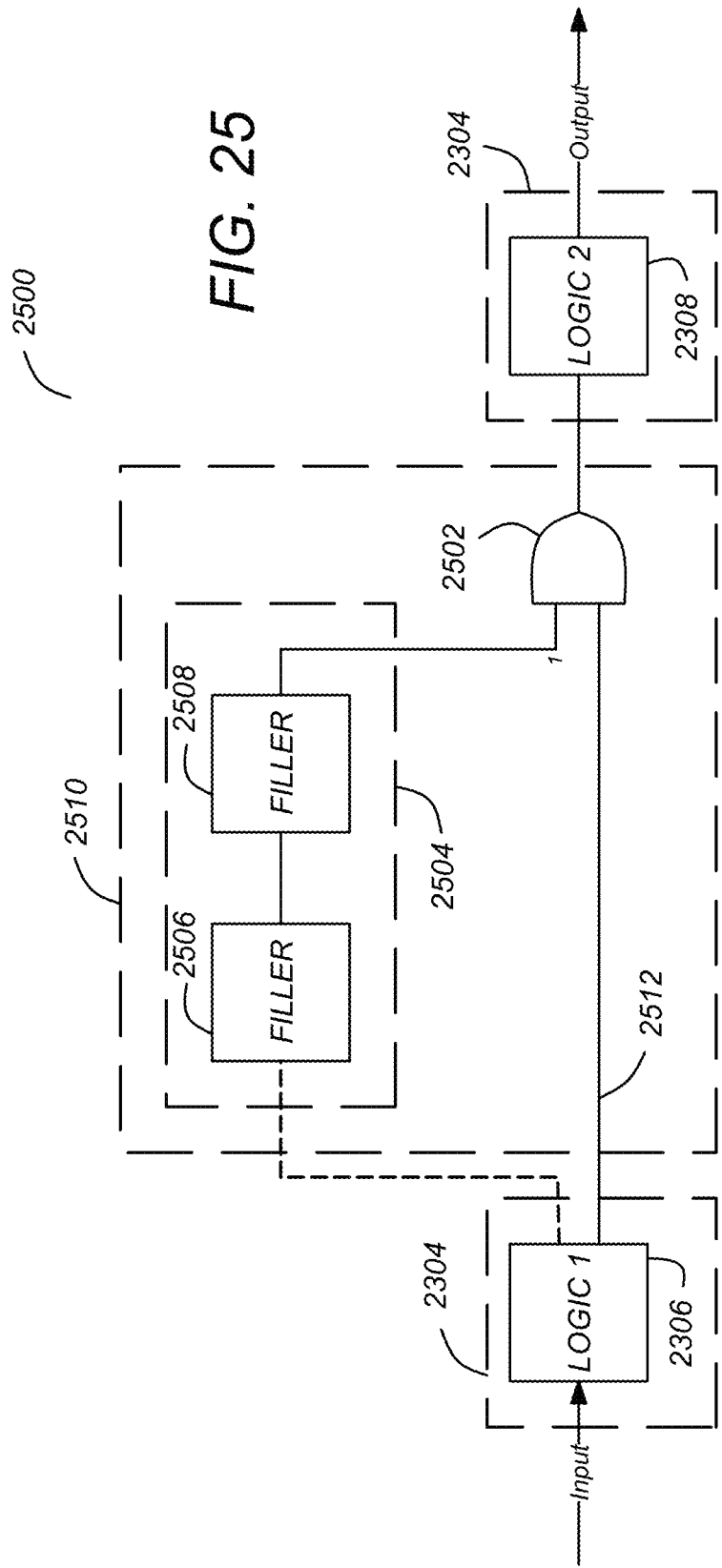
FIG. 25 is a diagram illustrating another example of the insertion of a functionally inert filler cell.

FIG. 25 is a diagram illustrating another example of this technique. In this example, a camouflaging element 2510 comprising a 2 input AND gate 2502 and a filler cell combination 2504 is used to camouflage the operation of logical cell combination 2304. In this example, the output of logic cell 1 2306 is provided to the input of logic cell 2 2308 via the filler cell 2510. In particular the output of logic cell 1 2306 is provided to one of the inputs to the 2-input AND gate 2502, and the output of the 2-input AND gate 2502 is provided to logic cell 2 2308. The output of the filler cell combination 2504, which is configured to always be logic ONE, is connected to the other input of the 2-input AND gate 2502. In this way the added filler cells 2506, 2508 would appear to be a functional part of the circuit, but, in fact, would not affect the function of the unmodified circuit or logical combination 2304. For further camouflaging, the filler cell combination 2504 may receive input from first logic cell 2306 to generate the logic ONE, as shown by the dashed line. The filler cell combination 2504 may generate the logical ONE by a combination of logic gates that always produce an output of one (e.g. $A \oplus B \oplus \overline{A}$) or the output of the filler cell combination 2304 may simply be tied to a positive voltage VDD.

The use of either or both of the foregoing examples would not substantially increase the effort to design the ASIC, and will also have little or no effect in the later stages of layout and verification. Further, if only a relatively small number of filler cells are used in this manner, there little or no impact on the size of the final chip.

The foregoing techniques can also be used to design and use additional standard cells that have substantially the same appearance of the standard cells in the original cell library, yet perform a different logic function. Such cells could be randomly dispersed in the cell netlist at the appropriate point in the design flow. For example, a cell could be designed, using the techniques described in U.S. Pat. Nos. 7,049,667, 6,815,816, and 6,774,413 (which patents are hereby incorporated by reference herein), so that it appears identical to FIG. 4A in the layers shown, but performs a two-input NOR function instead of the NAND function of FIG. 4A. This makes it extremely difficult to determine the true function of the circuit by reverse engineering.

The present invention can also be used to create one or more logical descriptions (e.g. netlists) of combinations of filler cells (or combinations of filler cells and logic cells or combinations of filler cells, logic cells and filler cells) which, when combined, have the same logical function, but which have intermediate logical functions that are different than the uncamouflaged designs. Such combinations would, instead of having inputs which are ignored and/or fixed logic level outputs as described above, would have at least one active input and at least one active output which is some logical function of the active input(s). The circuitry of the true logic function of the combination would be hidden by spreading the logical function over a greater number of cells. The true logic function is further obscured in that it is distributed across a plurality of apparent logic cells instead of occurring in just one cell as would be expected.

Figure 26:
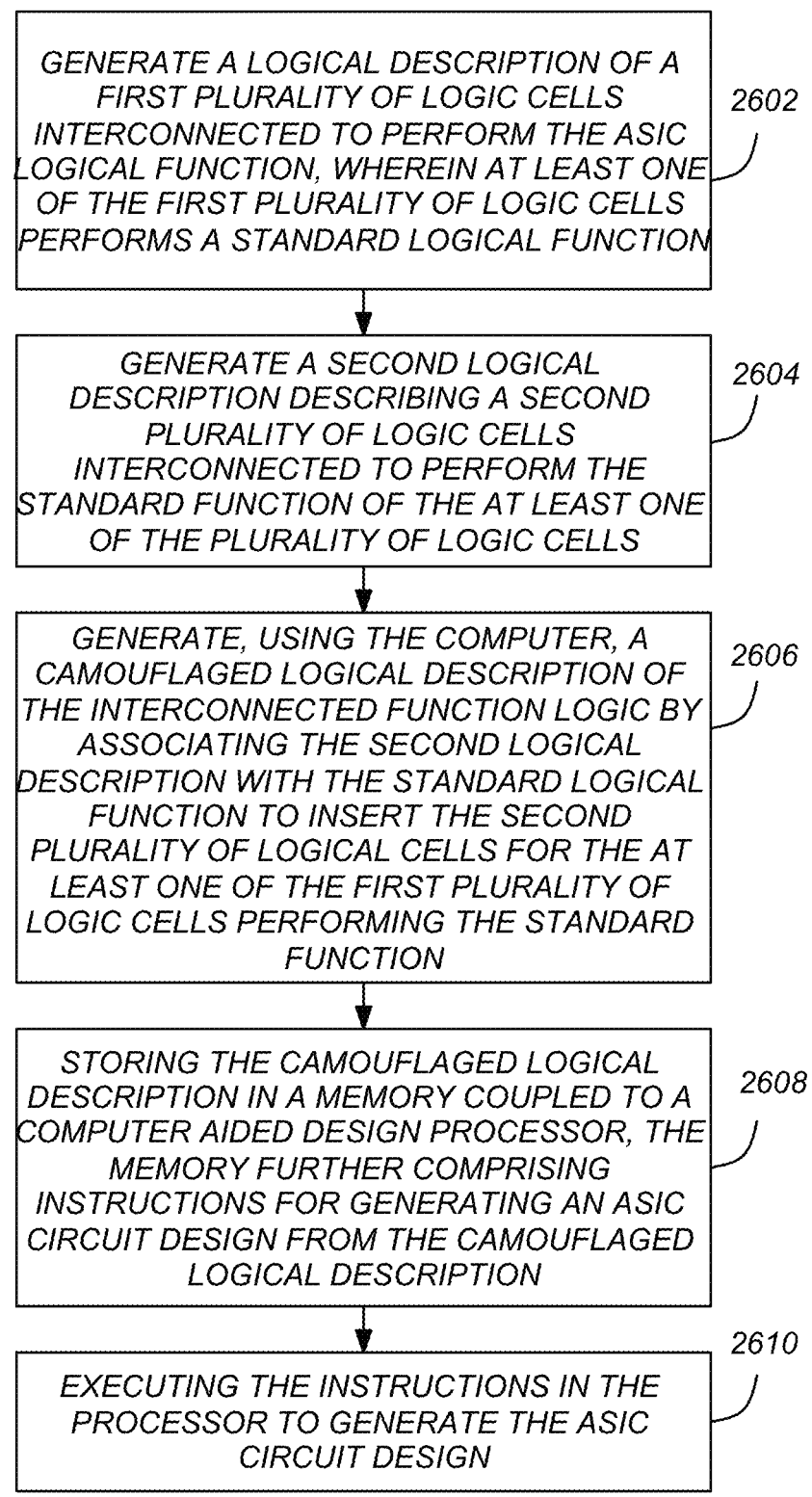
FIG. 26 is a diagram illustrating further exemplary method steps that can be used to camouflage a circuit.

FIG. 26 is a diagram illustrating further exemplary method steps that can be used to camouflage a circuit. First, a logical description of a first plurality of interconnected logical cells that performs the ASIC function is generated, as shown in block 2602. At least one of the plurality of logic cells performs a standard logical function such as a logical AND, OR, NOR, EXCLUSIVE OR, or DELAY. Next, as shown in block 2604, a second logical description is generated that describes a second plurality of logic cells that are interconnected to perform the standard function described above. The second logical description differs from that of the plurality of logic cells that are used to implement the same standard logical function by standard cells in the cell library. Then, in block 2606, a camouflaged description is generated by associating the second logical description with the standard logical function. Thus, when the computer assembles the logic cells together to create the circuit design of the ASIC, the computer will select and insert the second plurality of logic cells for the plurality of logic cells ordinarily associated with the standard function.

In block 2608, the camouflaged logical description is stored in a memory of the computer having instructions for generating an ASIC circuit design from the camouflaged logical description. The instructions are then executed to generate the ASIC circuit design, as shown in block 2610. The ASIC circuit design defines the topology of the layers which physically realize the ASIC.

Figure 27:
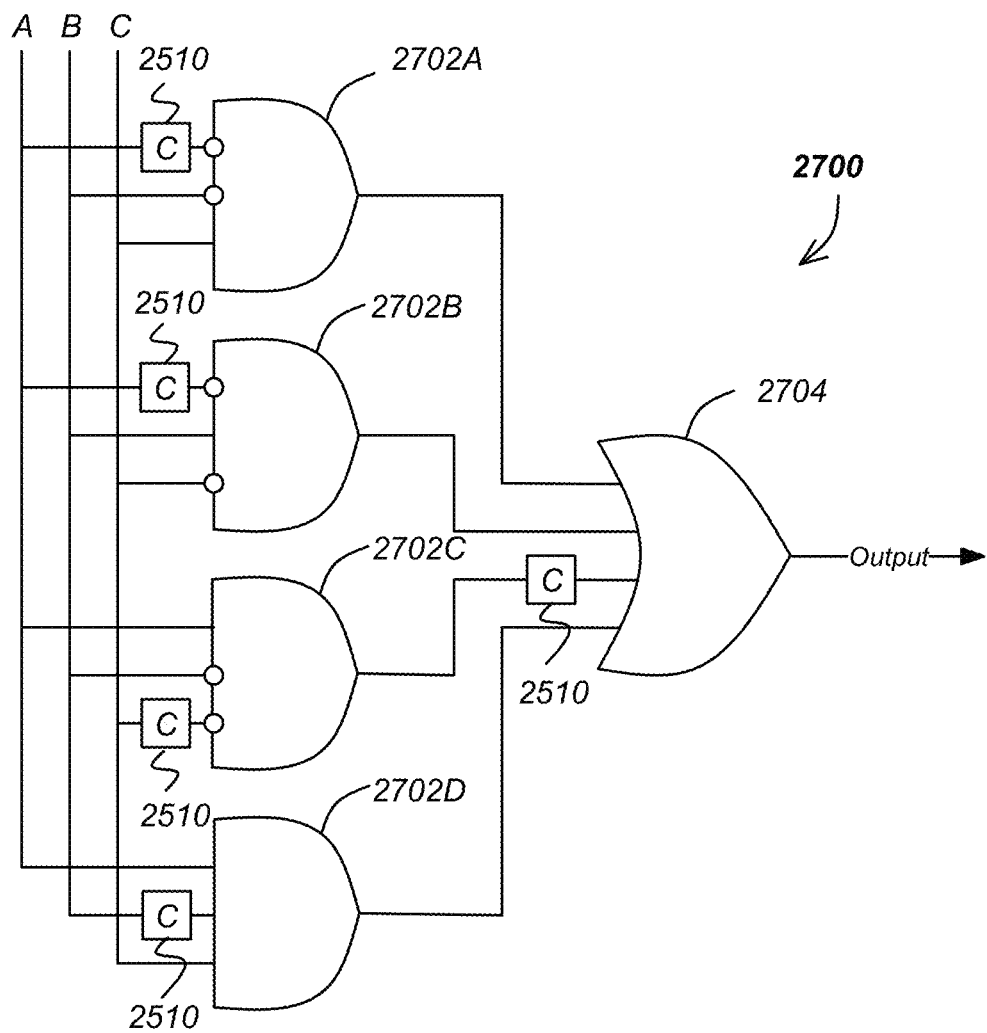
FIG. 27 is a drawing illustrating an example of the camouflaging technique described in FIG. 26.

FIG. 27 is a drawing illustrating an example of this camouflaging technique. The logic circuit 2700 is an implementation of a three-input logical "exclusive or" (XOR) gate, that provides the result A XOR (B XOR C). However, since this is logically equivalent to $\overline{ABC} \oplus \overline{ABC} \oplus A\overline{BC} \oplus ABC$, logic circuit 2700 implements an equivalent logical functionality using a plurality of interconnected AND gates 2702A-2702D, inverters, and OR gate 2704. Karnaugh mapping and other methods can be used to determine logically equivalent circuits for camouflaging. The function of the logic circuit 2700 can be further camouflaged by insertion of camouflaging elements 2510 described above.

This embodiment may be implemented as follows. First, the netlist or logical description of the plurality of cells performing the desired function is given a cell name that can be associated with its true logic function (in the illustrated example, the function A XOR (B XOR C) can be associated with the interconnected cells that implement AND gates 2702A-2702D and OR gate 2704). The computer automated design (CAD) system is then instructed insert this netlist instead of the usual logic function single cell where appropriate. The CAD system may insert the netlist implementing $\overline{ABC} \oplus \overline{A}B\overline{C} \oplus A\overline{BC} \oplus ABC$ for all instances of A XOR (B XOR C) or may do so randomly for each instance of the logic function in the circuit.

Figure 28:
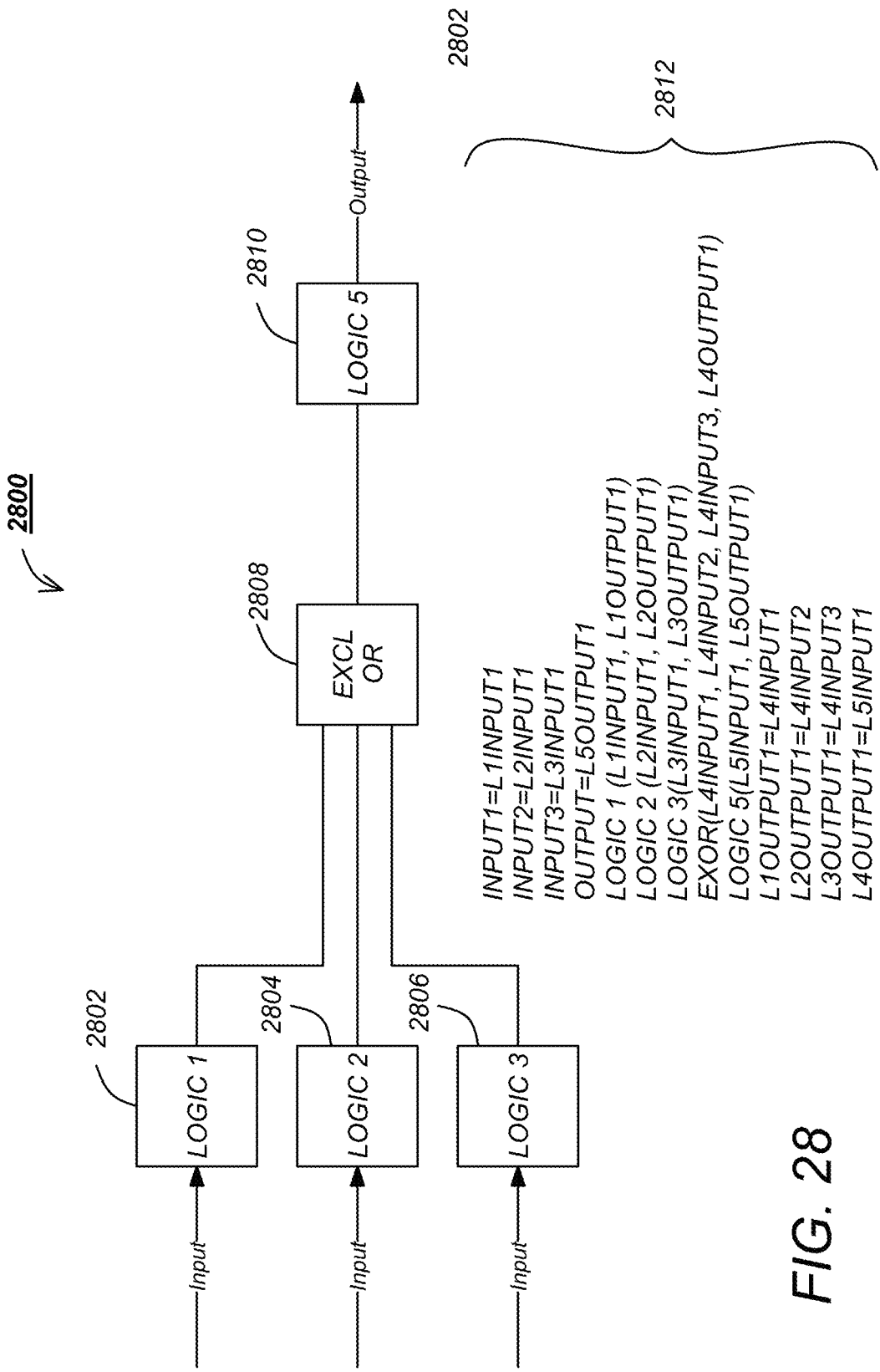
FIGS. 28 and 29 are diagrams further illustrating the camouflaging technique described in FIG. 26.
Figure 29:
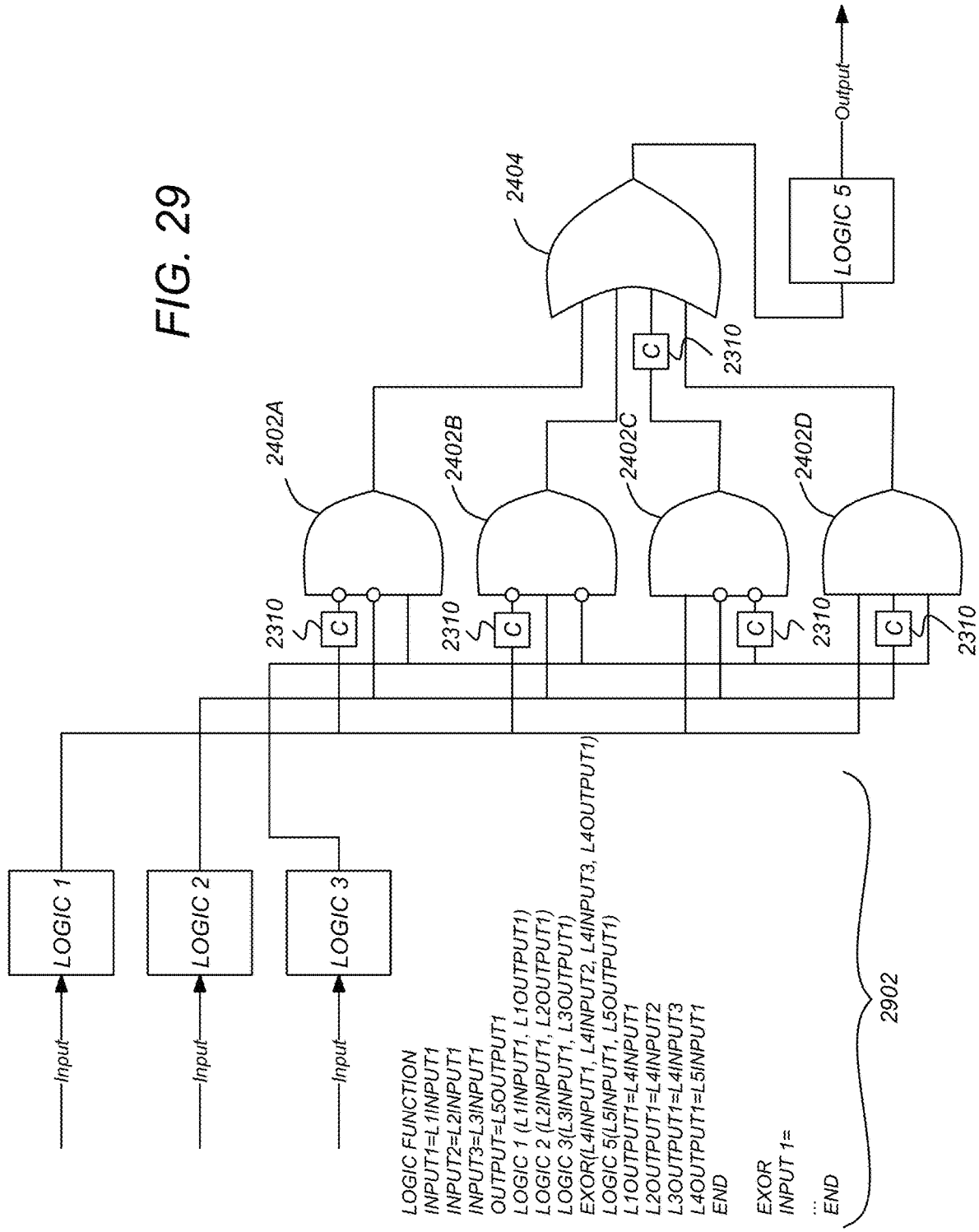

FIGS. 28 and 29 are diagrams further illustrating the foregoing technique. FIG. 28 is a diagram describing an interconnection of logical cells 2800, including cells 2802-2810. Logical cell 2808 provides an EXCLUSIVE OR function, which is one of many standard functions available in the cell library. An exemplary logical description or netlist 2812 of the interconnection of the logical cells 2800 is also shown.

FIG. 29 is a diagram illustrating a camouflaged interconnection of logic cells 2900. In this embodiment, the alternate implementation of the EXCLUSIVE OR function shown in FIG. 27 has been inserted for the EXCLUSIVE OR block 2808 shown in FIG. 28. This can be accomplished by defining a logical function EXOR(*) as the combination of gates shown in FIG. 27 and including a call to the newly redefined EXOR circuit element shown in the logical description 2902. Alternatively, a second EXCLUSIVE OR function can be defined (e.g. EXOR2), and the second EXCLUSIVE OR function can be recited in the logical description.

Micro Circuits

Camouflage elements may serve to protect an ASIC from reverse engineering attack in a number of ways. For example, the filler cells or combination of filler cells can comprise cells that perform none of the ASIC logical functions, or perform some one or more of the ASIC logical functions, but do not affect the ASIC logical function implemented by the standard (non-filler) cells. Or, the routed filler cells can together perform a camouflage logical function that reproduces at least one of the ASIC logical functions for the purposes of mimicking or spoofing that function, yet still does not interfere with any of the ASIC logical functions. For example, the ASIC logical functions may include a binary counter that is output to a NAND gate. The filler cells can be used to define an identical binary counter, but with the counter output coupled to another circuit element such that the ASIC logical function itself remains unaffected.

The combination of filler cells placed in the gap may also include a plurality of filler cells that include a (1) a first cell having a physical design layout modified from that of a corresponding first library cell so as to perform no logical function (e.g. an AND library cell modified to perform no logical function by alteration of its physical layout) (2) a second cell having a physical design layout modified from the corresponding second library cell to perform a modified logical function (e.g. an AND library cell modified to perform the OR function or an OR library cell modified to perform the AND function), and (3) a third cell having a physical design layout unmodified from the corresponding third library cell (e.g. an unmodified AND, OR or NOR library cell).

Importantly, taken together, the camouflage elements (e.g. logical cells and interconnections) are functionally inert to the logical function(s) of the ASIC (they do not alter the logical function(s) of the ASIC). However, the one or more of the filler cells—in fact, even the combination of all of the interconnected camouflage cells—may be functionally active (perform a logical function), yet still be functionally inert to the logical function of the ASIC. For example, the filler cells may (1) be functionally inert (e.g. perform no logical function) (2) be functionally active (perform a logical function) but either (a) unconnected with cells performing the actual ASIC logical function or (b) connected with the cells performing the ASIC logical function, but connected in a way so that ASIC logical function is not altered. Functional or inert camouflage cells and/or traces may also be interconnected to other functional or inert camouflage cells and/or traces, or to extraneous (not used to perform the logical function of the ASIC) but standard logic cells, and placed in an ASIC in such a way that the logical function of the ASIC is not altered.

Accordingly, the camouflage elements may comprise one or more circuits having one or more interconnected camouflage elements that can be either functionally inert or functionally active. Such functional elements such as filler cells, can be described, placed, and routed using CAD software in the gaps between the ASIC cells that are necessary to perform the ASIC logical function. To further conceal the functionally inert status of these filler circuits, some or all of the nodes of these circuits may optionally be connected to extraneous metal traces.

One benefit of using active camouflage elements is that if a filler cell is subjected to physical probe and measurement, it will demonstrate a logical function, which may be different from the logical function that the reverse engineer would expect to find. This raises the attacker's uncertainty and makes reverse engineering more difficult.

Another benefit of this technique is that it makes enables the introduction of time-varying logic behavior of the filler cell and metal fill network. Dynamic signals in the camouflage network make camouflaged components more difficult to distinguish from the original ASIC components, and provide additional resistance to voltage contrast attacks. For example, inputs of functionally active filler cells may be connected to the outputs of functional cells in the ASIC. The functionally active filler cells would be routed with functionally inert filler cells and/or extraneous functional cells in such a way that the ASIC function is not altered. The outputs of the functionally active filler cells would switch as the ASIC's functional cells switch. The outputs of the functionally active cells could also be attached to extraneous metal traces, as disclosed, for example, using the metal fill process of U.S. Pat. No. 6,924,552.

PUCS Overview

In standard-cell based ASIC 100 design, the logic function of the chip is modeled and simulated in higher level hardware description languages such as "Very High Speed Integrated Circuit Hardware Description Language (VHDL) or VERILOG. It is then synthesized in a silicon compiler such as SYNOPSIS to generate a netlist using logic cells from a targeted standard-cell library. The netlist is then used in the backend physical design phase to locate the library cells on the ASIC 100 and route connections between those library cells (known as a "Place and Route" or PR of the library cells), thereby generating the full circuit layout of the ASIC 100 for manufacturing. The PR process uses an automated computer program placing all logic cells in appropriate locations then connects them with metal and via layers according to the connection information in the netlist.

ASICs designed using this approach are vulnerable to reverse engineering (RE) attack. Reverse engineering of an ASIC 100 involves the steps of functional identification of logic cells and the extraction of the cells' connections. With the latest optical and scanning electron microscopic techniques, an ASIC's logic circuits and its wiring network can be easily extracted by RE.

The elementary form of PUCS is a structure that can be manufactured in an ASIC 100 flow whose function is difficult to ascertain from information that is available to reverse engineers or other attackers. The simplest examples include a structure that appears to connect two or more nodes, yet the nodes are actually isolated. Another simple example is a structure that appears to be isolated yet is actually connecting two or more nodes. There are many physical design techniques that can accomplish these goals. Exemplary physical design techniques are disclosed in U.S. Pat. No. 6,815,816, entitled "IMPLANTED HIDDEN INTERCONNECTIONS IN A SEMICONDUCTOR DEVICE FOR PREVENTING REVERSE ENGINEERING," issued to Clark et al on Nov. 9, 2004, U.S. Pat. No. 6,064,110, entitled "DIGITAL CIRCUIT WITH TRANSISTOR GEOMETRY AND CHANNEL STOPS PROVIDING CAMOUFLAGE AGAINST REVERSE ENGINEERING," issued to Baukus et al. on May 16, 2000, and U.S. Pat. No. 7,049,667, entitled "CONDUCTIVE CHANNEL PSEUDO BLOCK PROCESS AND CIRCUIT TO INHIBIT REVERSE ENGINEERING," issued to Chow et al. on May 23, 2006, all of which are hereby incorporated by reference herein.

For example, a camouflaged interconnection can be comprised of an implanted region forming a conducting channel between the two spaced-apart implanted regions. If the channel is the same conductivity type, a connection is made between the two regions. If the channel is the opposite conductivity type, the regions are isolated. A reverse engineer can image this channel from the fabricated die, but cannot easily determine its conductivity type. Thus the circuitry cannot be determined.

At the transistor level, a PUCS-based transistor may appear to be a functional transistor, but in fact its output could be tied to VDD or VSS or totally isolated. Examples of such structure are disclosed in U.S. Pat. No. 6,740,942, entitled "PERMANENTLY ON TRANSISTOR IMPLEMENTED USING A DOUBLE POLYSILICON LAYER CMOS PROCESS WITH BURIED CONTACT," issued to Baukus et al. on May 25, 2004, and U.S. Pat. No. 7,217,997, entitled "GROUND ARCH FOR WIREBOND BALL GRID ARRAYS," issued to Wyland on May 15, 2007, both of which are hereby incorporated by reference herein.

Extensive research and testing have been invested in exploring and developing a variety of techniques that resist reverse engineering at many process nodes. The result of such research and testing is the reverse engineering resistant techniques for use in PUCS applications disclosed herein. Camouflage techniques have been successfully fabricated and qualified at nodes down to and including 28 nm, and there is no foreseeable limitation to the application of these camouflage techniques at smaller nodes, because they are designed using the analogous foundry processes and design rules as a typical ASIC 100 standard cell library and such standard cells continue to the basic design unit at smaller fabrication geometries. Using PUCS cells and design elements as discussed herein as camouflage building blocks, a circuit designer can create elaborate and strong frameworks to protect designs and IP on the ASIC 100 itself.

As disclosed further below, examples of PUGS cells and design elements used in typical applications will be described in this document. PUCS applications include:
  Secure standard cell library
  Challenge-response hardware authentication engine
  Secure chip ID or encryption keys
  Secure memory controller
  One-Time-Programmable camouflage cells
  FPGA configuration manager
  Analog and mixed signal IP
  Full custom digital design Secure Standard Cell Library In one embodiment, PUCS technology is applied to the construction of logic gates. In this embodiment, a secure standard cell library may be designed such that the actual function of each logic cell differs from the functionality discerned from reverse engineering techniques. Since the actual functionality is either different than the function suggested by reverse engineering techniques or undiscernible from such techniques, the actual functionality cannot be easily determined. An ASIC 100 that is designed with such a library would resist reverse engineering attacks, and therefore any cloning or unauthorized modifications that require understanding the logic function.

This technique yields strong resistance to reverse engineering even if a very small percentage of the ASIC 100 logic cells are PUCS-cells. There may be multiple standard cells with apparently identical layouts that perform different functions. Numerous papers have been published on different techniques for designing Circuit Camouflage-based standard cell libraries including U.S. Pat. No. 8,111,089, entitled "BUILDING BLOCK FOR A SECURE CMOS LOGIC CELL LIBRARY," issued to Cocchi et al. on Feb. 7, 2012, U.S. Pat. No. 8,151,235, entitled "CAMOUFLAGING A STANDARD CELL BASED INTEGRATED CIRCUIT," issued to Chow, et al on Apr. 3, 2012, "SMI Circuit Camouflage Data Sheet, and SMI Circuit Camouflage Technology Introduction, all of which are incorporated by reference herein.

PUCS elements and structures can be incorporated into such standard cell libraries, thereby, creating a reverse-engineering resistant cell library. A designer may choose to implement an entire circuit with PUCS-based standard cells, or may use a combination of PUCS-based and traditional standard cells.

Figure 30A:
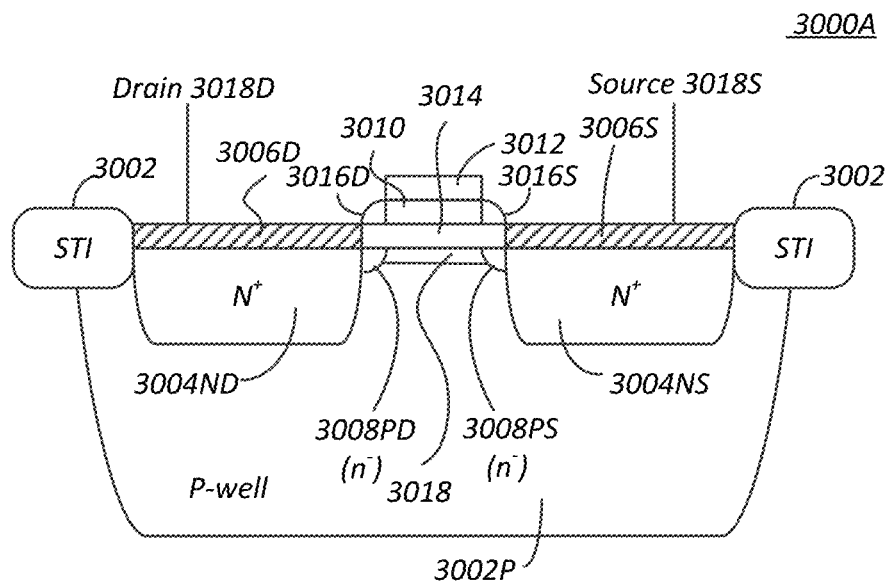
FIGS. 30A and 30B are diagrams presenting a cross-sectional view of an exemplary embodiment of uncamouflaged CMOS N-channel and P-channel functional logic cells.
Figure 30B:
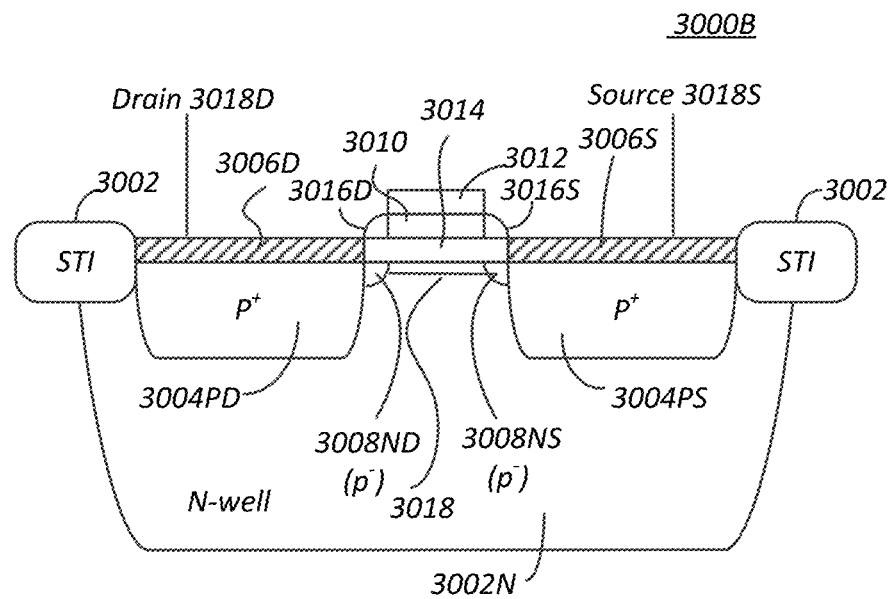

FIGS. 30A and 30B are diagrams presenting a cross-sectional view of an exemplary embodiment of uncamouflaged CMOS N-channel and P-channel functional logic cells 3000A and 3000B, respectively.

Referring first to FIG. 30A, the cell 3000A comprises a well structure composed of P-doped (P-conductivity type) semiconductor material (hereinafter referred to as P-well 3002P). The camouflage cell 3000A also comprises a source region of N-doped (N-conductivity type) semiconductor material (hereinafter referred to as source region 3004NS) and a drain region of N-doped (N-conductivity type) semiconductor material (hereinafter referred to as the drain region 3004ND).

The cell 3000A also comprises a conductivity layer 3006 having a source conductive layer portion 3000S disposed above and in conductive contact with the source region 3004NS and a drain conductive layer portion 3006D above and in conductive contact with the drain region 3004ND.

The conductivity layer 3006 is typically comprises of a conductive silicide. Source conductive layer portion 3006S is typically conductively coupled to a source connector 3018S, and the drain conductive layer portion 3006D is typically conductively coupled to a drain connector 3018D, thus providing a conductive path to the source region 3004NS and the drain region 3004ND. The gate 3010 is insulated from the P-well region 3002P by a non-conductive insulator or gate oxide 3014. Accordingly, application of a voltage to gate 3010 creates an electric field that creates a conduction channel 3018, in the P-well region 3002P, allowing current to flow in proportion to the electric field created. Addition of spacers 3016S and 3016D prevents the source and drain regions 3004NS and 3004ND from entering into the lightly doped regions 3108PD and 3108PS.

Generally, increasing doping concentration of a semiconductor material affords an increase in conductivity due to the higher concentration of carriers available for conduction. Degenerate (very highly doped) semiconductor materials has conductivity levels comparable to metals and are often used in modern integrated circuits as a replacement for metal. Typically, superscript plus and minus symbols are used to denote relative doping concentration in semiconductors. For example, $n^+$ denotes an n-type semiconductor with a high doping concentration, while $p^-$ would indicate a very lightly doped p-type material.

MOSFETS are known to include a sub-structure known as lightly-doped-drain (LDD) implants that are intended to permit operation with higher drain-source voltage. Typically, LDD implants comprise narrow, self-aligned regions are introduced between the conduction channel and the source and drain regions of the MOSFET to spread the high field at the drain pinch-off region and thus reduce the maximum field intensity. Typically, the LDD implants are of the same conductivity type as the source and drain regions. Hence, for an N-channel MOSFET, the source and drain regions are typically $n^+$ doped, and the LDD implant region is $n^-$ doped. Similarly, the source and drain regions are typically doped source and drain regions are typically $p^+$ doped, and the LDD implant region is $p^-$ doped in a P-channel MOSFET. However, in the examples described below, LDD implants are doped using the opposite conductivity type from the source and drain regions (e.g. $p^-$ doped LDD implant regions are utilized with $n^+$ doped source and drain regions and $n^-$ doped LDD implant regions are utilized with $p^+$ doped source and drain regions).

Returning to FIG. 30A, the camouflage cell 3000A also comprises an implanted region 3008P (including source implanted region 3008PS and drain implanted region 3008PD). An ordinary functional logic cell uses a lightly-doped N-type of semiconductor material ($n^-$), for the implanted region 3008P.

FIG. 30B is a diagram of another embodiment of a cell 3000B of a P-channel, rather than N-channel structure. Hence the well structure is a N-well of N-doped semiconductor material 3002N ($n^+$), while the source region 3004PS and drain region 3004PD are both P-doped ($p^+$) regions. The implant regions 3008N (including drain implant region 3008ND and source implant region 3008NS) are lightly doped semiconductor material and the $p^-$ conductivity type.

Figure 31A:
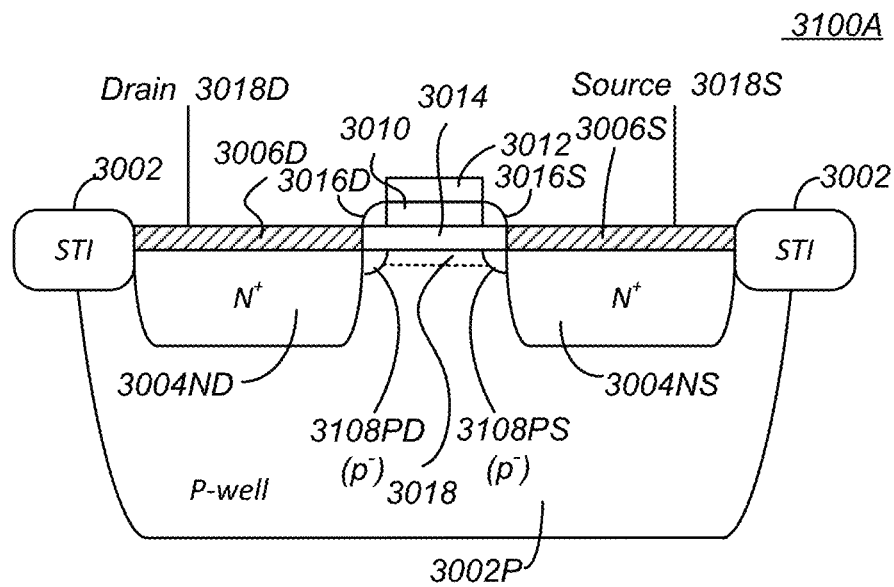
FIGS. 31A and 31B are diagrams presenting a cross-sectional view of an exemplary embodiment of "always off" camouflaged CMOS N-channel and P-channel functional logic cells.
Figure 31B:
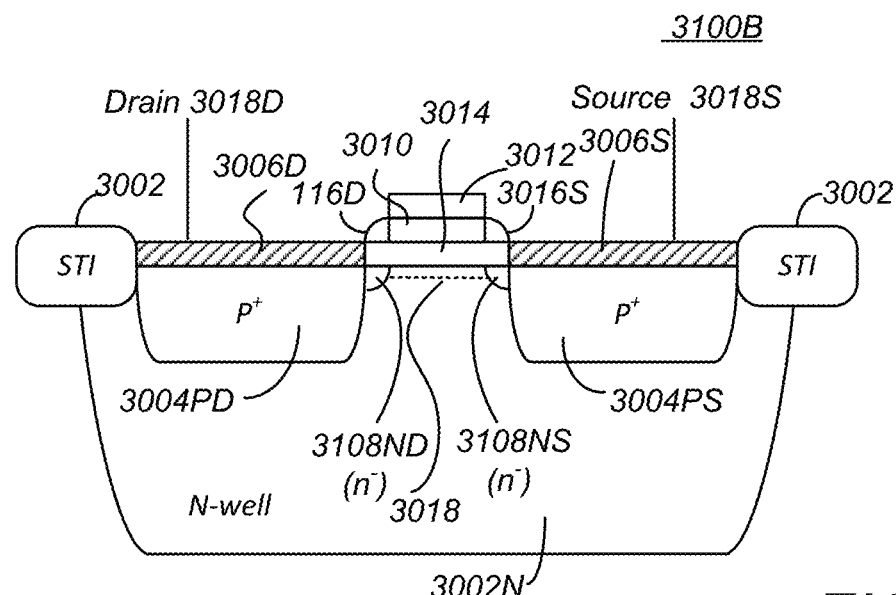

FIGS. 31A and 31B are diagrams presenting a cross-sectional view of an exemplary embodiment of an "always off" CMOS N-channel and P-channel camouflage cell 3100A and 3100B, respectively. As described further below, camouflage cells 3100A and 3100B have the same planar layout (e.g. physical dimensions of their respective components, viewed from above) as their uncamouflaged cell 3000A and 3000B counterparts, and differ only in that the implanted region is doped differently.

Referring first to FIG. 31A, the "always off" N-channel camouflage cell 3100A comprises the well structure composed of P-doped (P-conductivity type) semiconductor material (hereinafter referred to as P-well 3002P). The camouflage cell 3100A also comprises the source region of N-doped (N-conductivity type) semiconductor material (hereinafter referred to as source region 3004NS) and the drain region of N-doped (N-conductivity type) semiconductor material (hereinafter referred to as the drain region 3004ND).

Like the uncamouflaged cell 3000A, the camouflage cell 3100A further comprises the conductivity layer 3006 having the source conductive layer portion 3006S disposed above and in conductive contact with the source region 3004NS and the drain conductive layer portion 3006D above and in conductive contact with the drain region 3004ND. The conductivity layer 3006 is also typically comprised of a conductive silicide. Source conductive layer portion 3006S is also conductively coupled to a source connector 3018S, and the drain conductive layer portion 3006D is conductively coupled to a drain connector 3018D, thus providing a conductive path to the source region 3004NS and the drain region 3004ND.

Like the uncamouflaged cell 3000A, the camouflage cell 3100A also comprises a camouflage region 3108P (including source camouflage region 3108PS and drain camouflage region 3108PD). The camouflage region is an implant region identical to the implant region 3008P of the uncamouflaged cell, however, unlike the uncamouflaged cell 3000A, the camouflage region 3108P of camouflage cell 3100A of FIG. 31A is created with an opposite type of dopant than the uncamouflaged cell 3000A. Specifically, instead of a lightly-doped N-type of semiconductor material ($n^-$), the camouflage region 3108P of the camouflaged cell 3100A is lightly-doped implant of the same conductivity type as the P-well 3002P ($p^-$). As a result, the camouflage region 3108P prevents the formation of a conduction channel 3018 between the source region 3004NS and the drain region 3004ND, thus rendering the camouflage cell 3100A in an "always off" state, regardless of the voltage applied to gate 3010.

Since the "always off" functionality of the camouflage cell 3000B is a product of using the opposite conductivity type doping than usual for the LDD implant region 3108P and not by making changes to its planar layout, the camouflage cell 3000B of FIG. 31A has precisely the same planar layout (e.g. the physical dimensions of the source region 3004NS, drain region, 3004ND, implant regions 3108PD and 3108PS as viewed from above the cell 3100A) as the uncamouflaged cell 3000A which is not "always off." Since the conductivity type of the regions is not discernable from using optical and scanning electron microscopic RA techniques, the camouflage cell 3100B of FIG. 31A is indistinguishable from an uncamouflaged cell 3000A of FIG. 30A.

FIG. 31B is a diagram of a P-channel embodiment of an "always off" camouflage cell 3100B. This embodiment of the camouflage cell 3100B also remains in the "always off" state regardless of the gate 3110 voltage, but is of a P-channel, rather than N-channel structure. Hence the well structure is a N-well of N-doped semiconductor material 3002N, while the source region 3004PS and drain region 3004PD are both P-doped ($p^+$) regions. The camouflage regions 3108N (including drain camouflage region 3108ND and source camouflage region 3108NS) are implants of lightly doped semiconductor material of the $n^-$ conductivity type, also preventing the formation of the conduction channel 3118, also rendering the camouflage cell 3100B in the "always off" state. Also, like camouflage cell 3100A, camouflage cell 3100B has precisely the same planar layout and is therefore indistinguishable from an uncamouflaged cell 3000B using optical and scanning electron microscope RA techniques.

Accordingly, FIGS. 31A and 31B show two examples of "always off" camouflage cells that can be used to camouflage the true functionality of the ASIC 100. Such camouflage cells can be used to build a reverse engineering resistant standard cell library to be used in the PUCS. In both FIGS. 31A and 31B, both N and P type of "always-off" CMOS use an opposite type of dopant for the Lightly-Doped-Drain (LDD) implants than is ordinarily used. The opposite LDD implant 3108 blocks the source and drain connections to the conduction channel 3118 under the poly gate 3110. These "always-off" devices can be implemented by only changing the LDD implant 3108 mask in the standard CMOS fabrication process.

Figure 32A:
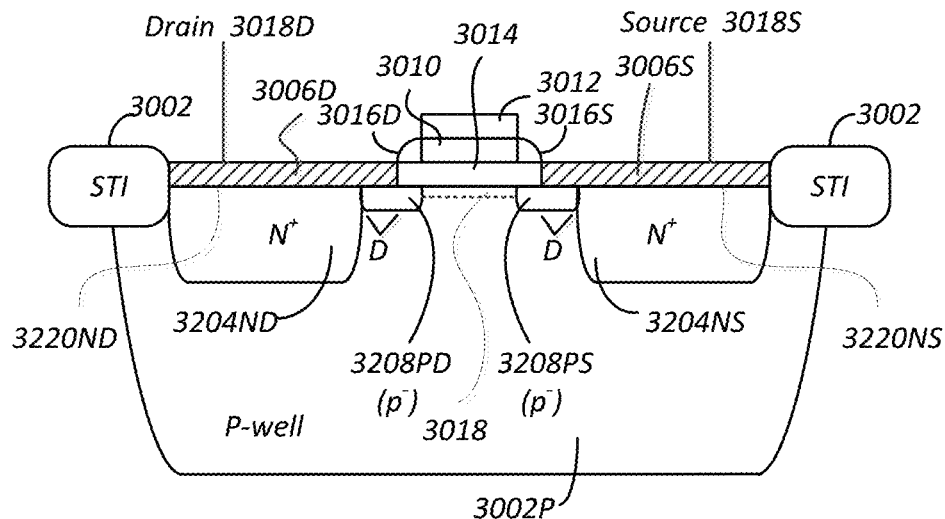
FIGS. 32A and 32B are diagrams presenting a cross-sectional view of an exemplary embodiment of "always on" camouflaged CMOS N-channel and P-channel functional logic cells.
Figure 32B:
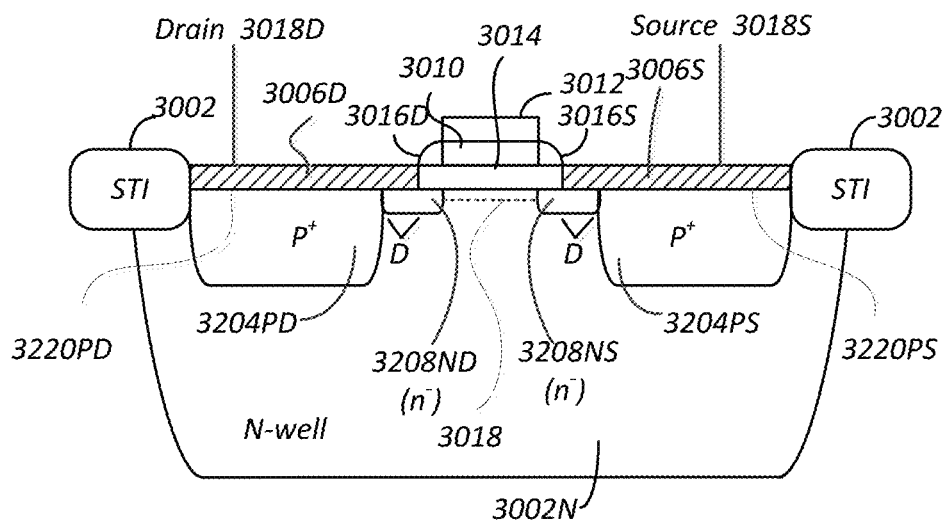

FIGS. 32A and 32B are diagrams presenting a cross-sectional view of an exemplary embodiment of an "always on" CMOS N-channel and P-channel camouflage cell 3200A and 3200B, respectively.

The N-channel type of camouflage cell 3200A comprises a well structure composed of P-doped (P-conductivity type) semiconductor material (hereinafter referred to as P-well 3002P). The camouflage cell 3200A also comprises a source region of N-doped (N-conductivity type) semiconductor material (hereinafter referred to as source region 3204NS) and a drain region of N-doped (N-conductivity type) semiconductor material (hereinafter referred to as the drain region 3204ND). In this embodiment of the camouflage cell 3200A, the edge of the drain region 3204ND closest to the gate 3010 is pulled a distance D away from the junction of the conductive silicide layer 3006D and the insulator 3014 for reasons discussed further below.

The camouflage cell 3200A also comprises a camouflage region 3208P (including source camouflage region 3208PS and drain camouflage region 3208PD). As was the case with the "always off" camouflage cell 3100A, the camouflage region 3208P of camouflage cell 3200A of FIG. 32A is created with the opposite dopant than ordinarily used for the lightly doped drain (LDD) implants in the uncamouflaged cell 3000A. Specifically, in this embodiment of a N-channel "always on" camouflage cell 3200A, a lightly-doped p-type of semiconductor material (p⁻) is used in the camouflage region 3208P instead of the typical lightly doped n-type of semiconductor material (n⁻).

In the "always off" N-channel camouflage cell 3100A shown in FIG. 31A, the source conductive layer portion 3006S is conductively isolated from the source camouflage region 3108PS and the drain conductive layer portion 3006D is conductively isolated from the drain camouflage region 3108PD by an insulator 3014 disposed in the conductive layer 3006 between the source conductive layer portion 3006S and the drain conductive layer portion 3006D. However, in the "always on" N-channel camouflage cell 3200A shown in FIG. 32A, the source conductive layer portion 3006S is conductively coupled to the source camouflage region 3208PS and the drain conductive layer portion 3006D is conductively coupled to the drain camouflage region 3208PD. This is accomplished by reducing the size of the source contact surface 3220NS between the source region 3204NS and the source conductive layer portion 3006S and the drain contact surface 3220ND between the drain region 3204ND and the drain conductive layer portion 3006D by a distance D compared to the analogous dimensions of the "always off" N-channel camouflage cell 3100A. The later addition of the silicide layer 3006 in the standard CMOS process shorts the source region 3204NS to the source camouflage region 3208PS and the drain region 3204ND to the drain camouflage region 3208PD, thus creating conduction channel 3018 or short between the source region 3204NS and the drain region 3204ND through the P-well 3002P substrate, and rendering the camouflage cell 3200A in an "always on" state, regardless of the voltage applied to gate 3010.

FIG. 32B is a diagram of a P-channel embodiment of an "always on" camouflage cell 3200B. This embodiment of the camouflage cell 3200B also remains in the "always on" state regardless of the gate 3010 voltage, but is of a P-channel, rather than N-channel structure. Hence, the well structure is a N-well of N-doped semiconductor material 3002N, while the source region 3204PS and drain region 3204PD are both P-doped regions. The camouflage region 3208N is of N⁻ conductivity type. Accordingly, the source portion of the conductivity layer 3006S shorts the source region 3204PS to the source implant region 3208NS and the drain portion of the conductivity layer 3006D shorts the drain region 3204PD to the drain implant region 3208ND, thus creating conduction channel 3018 or short between the source region 3204PS and the drain region 3204PD through the N-well 3002N substrate, and rendering the camouflage cell 3200B in an "always on" state, regardless of the voltage applied to gate 3010.

Hence, the "always-on" camouflage cells 3200A and 3200B illustrated in FIGS. 32A and 32B also use LDD implants of opposite conductivity type than the uncamouflaged cells 3000A and 3000B along with the further pull away of the source and drain region implants 3204 from the gate 3010 area. The later formation of the silicide conduction layer 3006D on silicon in the standard CMOS process shorts the PN junctions of N⁺ to PLDD (p⁻) and P⁺ to NLDD (n⁻), thus creating a short between the source 3018S and drain 3018D through the P-well 3002P or N-well 3002N substrate.

Notably, the planar layout of the "always off" camouflage cells 3100A and 3100B is of the same physical dimensions and therefore indistinguishable from the planar layout of the uncamouflaged cell 3000A and 3000B. Further, although the "always on" camouflage cells 3200A and 3200B have a slightly different planar layout (due to the "pull away" of the source region 3204S and the drain region 3204D from the gate 3010 and the larger implant regions 3208), the difference is substantially indistinguishable. The always off camouflage cells 3100 have identical imaging features to the uncamouflaged cells 3000, and the always on camouflage cell has almost identical imaging features to the "always off" camouflaged cells 3100 and the uncamouflaged cells 3000. Hence, although the cells have different functionality, it is very difficult to differentiate the different cells from each other during a reverse engineering attack.

Furthermore, as described in the applications below, devices can be fashioned from complementary pairs of camouflage cells 3100 and 3200, in which one of the camouflage cells is an N-channel camouflage cell 3100A and 3200A, while the other is a P-channel camouflage cell 3100B and 3200B, with the resulting device having the same output regardless of the input, yet having a planar layout indistinguishable from a device that produces a different output depending on the input.

PUCS Applications

A typical standard cell-based ASIC 100 or System on Chip (SoC) utilizes processing units for performing specific algorithms with input data. Camouflaging may be implemented by camouflaging the processing units to effectively hide the true function of selected functions of the ASIC 100 (for example, the encryption/decryption of data streams), or hide the true value of data used to compute those functions. Furthermore, ASIC 100 functional modules performing different functions can be controlled to logically connect different functional blocks within the ASIC 100 to perform the required calculations. PUCS technology can be used to not only camouflage the true functions implemented by such processing units, but also the logic controlling and connecting different functional blocks and the data used by such functional blocks within an ASIC 100.

Challenge-Response Hardware Authentication Engine

Cryptographic hardware engines are often used in authentication schemes to validate genuine hardware, prevent counterfeit parts from being used with a system, or a number of other applications. For example, such engines can be used in a challenge-response paradigm in which an alphanumeric value is provided (e.g. via software) to the cryptographic hardware engine to compute a response using a secret cryptographic asymmetric or symmetric function. The process fails unless the computed response sufficiently matches the expected response.

PUCS can be used to design a cryptographic hardware authentication engine to validate genuine hardware, preventing counterfeit parts from entering a system. This is accomplished by integrating PUCS elements into the cryptographic functions themselves. Because PUCS resists reverse engineering through analysis of the manufactured die, the function cannot be determined by an attacker and the secrecy of the cryptographic function is protected. An attacker would be unable to generate the correct response using any means, including cloned hardware, emulated hardware, and software.

Secure Chip ID or Encryption Keys

In addition to camouflaging the functions performed by the ASIC 100, PUCS technology can also be used to camouflage data as well. Such data may include, for example, chip identifiers (e.g. identifiers of the ASIC 100 itself or other chips) and encryption/decryption keys stored in the ASIC 100. Such data can be obscured by PUCS technology to make them impossible to be extracted by reverse engineering a device in the field.

In this embodiment PUCS elements such as the camouflage cells 3100, 3200 described above are incorporated into the integrated circuit design and used to hide the data within the standard cell logic area in which the memory storage cells are built to appear identical to other types of logic gates. This can be implemented using PUCS One-Time Programming (OTP) cells, discussed further below. The ability to use PUGS camouflage cells 3100, 3200 and other elements to hide data in the standard logic area can greatly obfuscate sensitive key material from an attacker.

Secure Memory Controller

To protect on-chip memory and OTP cell contents from probing or other analysis, a secure memory controller can be designed with PUCS camouflage cells 3100, 3200 or elements. This is accomplished by incorporating PUCS camouflage cells 3100, 3200 or elements into the memory fabric.

Memory contents can also be encrypted or obfuscated using a secret algorithm implemented in hardware by a hardware processor whose functionality is obfuscated by the use of PUCS camouflage cells 3100, 3200 and other elements. Such PUCS elements can be used to protect the algorithm itself or the design of circuits used for memory address encoders. To further enhance protection, word and bit line protection techniques can be applied to prevent the reading of the content in a memory block with direct probing or voltage contrast techniques, as described in U.S. Pat. No. 6,459,629, entitled "MEMORY WITH A BIT LINE BLOCK AND/OR A WORD LINE BLOCK FOR PREVENTING REVERSE ENGINEERING," by Clark et al, issued Oct. 30, 2002, which is hereby incorporated by reference herein.

Figure 33:
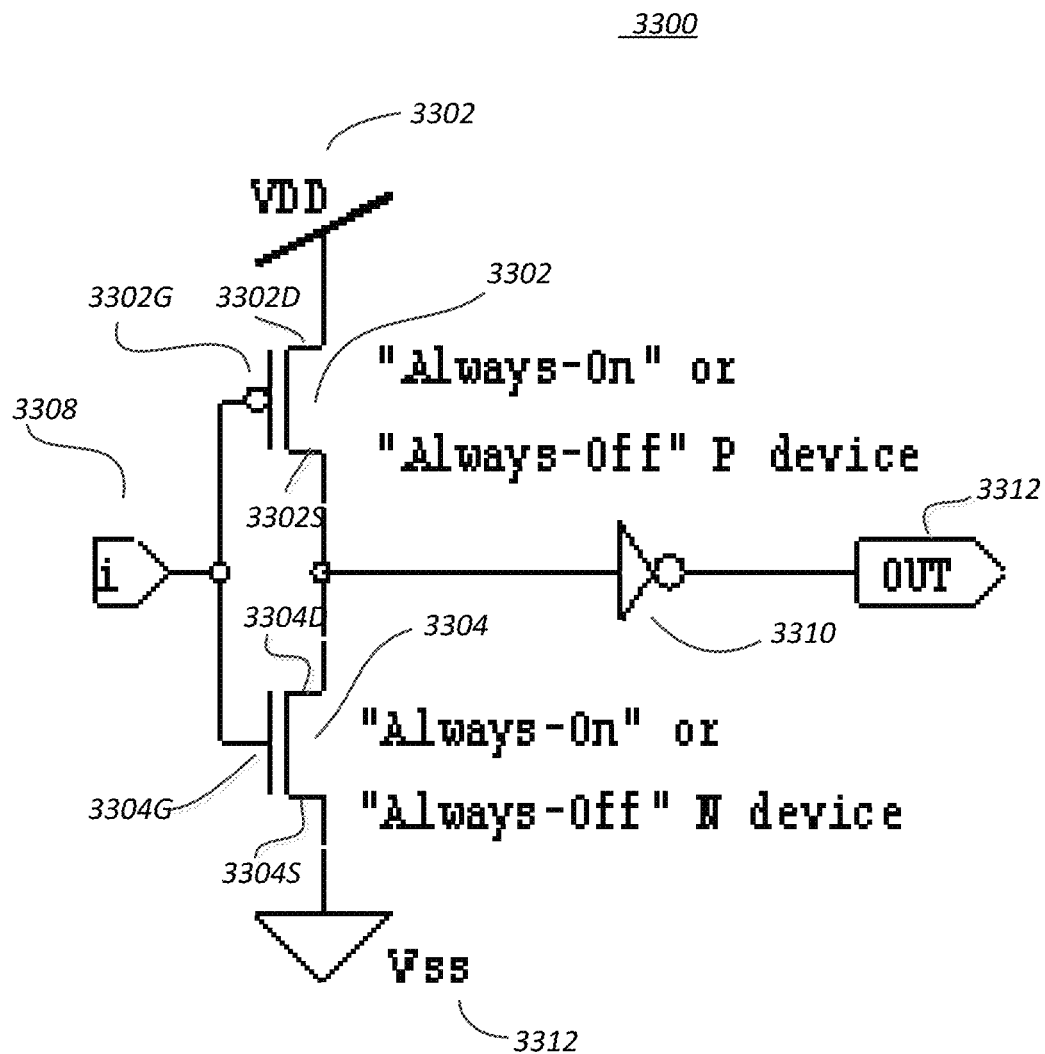
FIG. 33 is a diagram illustrating a schematic diagram of a buffer cell of a standard cell library that can be re-designed as a one-bit OTP cell using "always-on" and/or "always-off" camouflage cells.

FIG. 33 is a diagram illustrating a schematic diagram of a buffer cell 3300 of a standard cell library that can be re-designed as a one-bit OTP cell using the above "always-on" 3200 and "always-off" 3100 camouflage cells.

Nominally (uncamouflaged), the buffer cell 3300 comprises a first logic cell 3302 having a source 3302S, drain 3302D, and gate 3302G and a second logic cell 3304 having a source 3304S, drain 3304D, and gate 3304G. The first cell 3302 and the second camouflage cell 3304 are communicatively coupled in a complementary pair configuration in which drain 3304D is communicatively coupled to source 3302S. Cells 3302 and 3304 are both driven by input signal 3308, and provide an output from the source 3302S of the first camouflage cell 3302 and the drain 3304D of the second camouflage cell 3304, inverted by inverter element 3310. The gate 3302G of the first cell 3302 is an inverting gate. When the input 3308 is a logical one (high voltage), the first logic cell 3302 is off, and the second logic cell 3304 is on, thus pulling the junction between the first cell 3302 and the second cell 3304 to VSS or a logical zero. That logical zero is inverted by inverter 3310 to present a logical one at output 3312. Similarly, when the input 3308 is a logical zero, logic cell 3302 is turned on and logic cell 3304 is turned on, providing VDD (logical one) to the junction between the first cell and the second cell. That logical one is inverted by inverter 3310 to present a logical zero. Thus, in the standard (non-camouflage cell) configuration, the logical state of the output 3312 matches that of the input 3308, but provides buffering to clean up signals provided to the input 3308.

In a camouflaged embodiment, the buffer cell 3300 is fashioned with camouflaged cells of the always off 3100 or always on 3200 variety. For example, first cell 3302 may be a P-channel "always on" camouflage cell 3200B and second cell 3304 may be an N-channel "always off" camouflage cell 3100A. In this configuration, the voltage at the junction of the first cell 3302 and the second cell 3304 is VDD (logical one) output of the buffer cell 3300 will be a logical zero, regardless of the logical value of the input 3308. Further, if the first cell is an always off camouflage cell and the second cell is a N-channel always off camouflage cell, the junction of the first cell 3302 and the second cell 3304 is VSS (logical zero) and the output of the buffer cell 3300 will be a logical one regardless of the logical value of the input 3308. Hence, whether using the always on or always off devices, the with the camouflaged configuration, the storage bit content will not be affected by the input 3308. When the reverse engineer views this storage cell 3300 among the sea of gates of standard cells, it is always misinterpreted as a logic buffer cell with its output 3312 logically equivalent to the input 3308.

Figure 34:
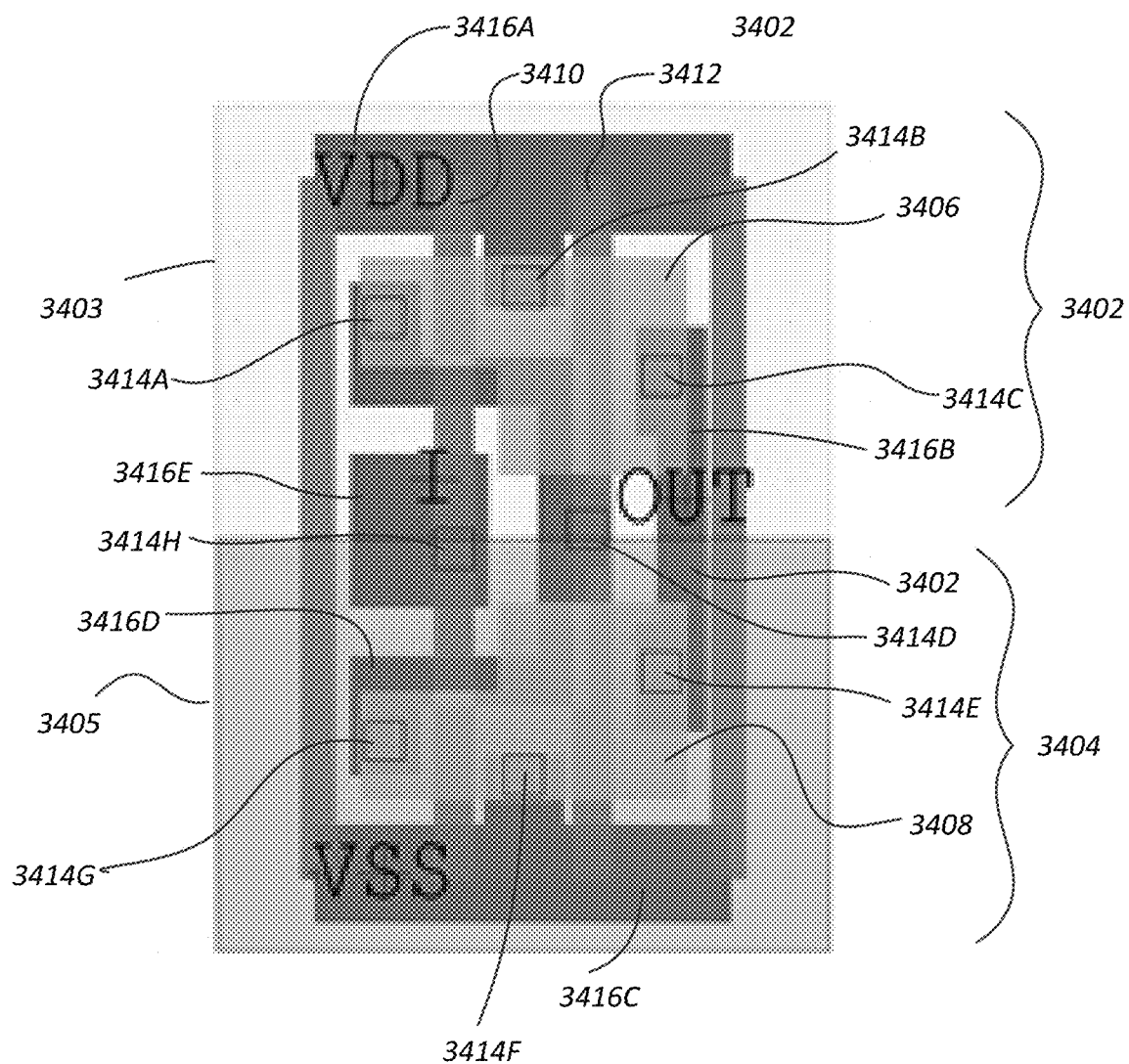
FIG. 34 is a diagram depicting a layout of the logic buffer depicted in FIG. 33.

FIG. 34 is a diagram depicting a layout of the logic buffer 3300 depicted in FIG. 33. The logic buffer comprises an "always on" or "always off" P-channel camouflage cell 3402 and an always on or always off N-channel camouflage cell 3404. The P-channel camouflage cell 3402 comprises an N-well 3403 and the N-channel device comprises P-well 3405. The buffer 3300 further comprises implants 3406 and 3408 and gates 3410 and 3412, and a plurality of vias 3414A-3414H interconnecting different layers of the device to metallic structures 3416A-3416E. Together, these structures create logic buffer cell having a layout physically indistinguishable from that of a normally functioning buffer cell 3300.

One-Time Programmable Camouflage Cells

It would be harmful to system security if original design data was leaked to attackers. To mitigate this risk, it is possible to further enhance security by incorporating a relatively small number of PUCS camouflaged cells 3100, 3200 to OTP (one-time programmable) logic or data cells that must be correctly programmed for proper operation of the system. Like standard cells based on PUCS, these PUCS OTP device resist reverse engineering. PUCS OTP logic devices can be programmed to have one of two or more possible logic functions, depending on post-manufacture programming.

PUCS OTP data cells can be used to store key data, device ID, or other hardware configuration data. This is accomplished by incorporating PUCS elements into the design fabric of the OTP cell. Both types of PUCS OTP cells are designed to resemble other standard cells in the logic area, and can be pseudo-randomly distributed throughout the logic area as described in U.S. Pat. No. 8,168,487, entitled "PROGRAMMABLE CONNECTION AND ISOLATION OF ACTIVE REGIONS IN AN INTEGRATED CIRCUIT USING AMBIGUOUS FEATURES TO CONFUSE A REVERSE ENGINEER," by Clark et al., issued May 30, 2012, which is hereby incorporated by reference herein. By allowing for post-manufacture programmability, the final design secrets will be known only to a secure programming facility.

Figure 35:
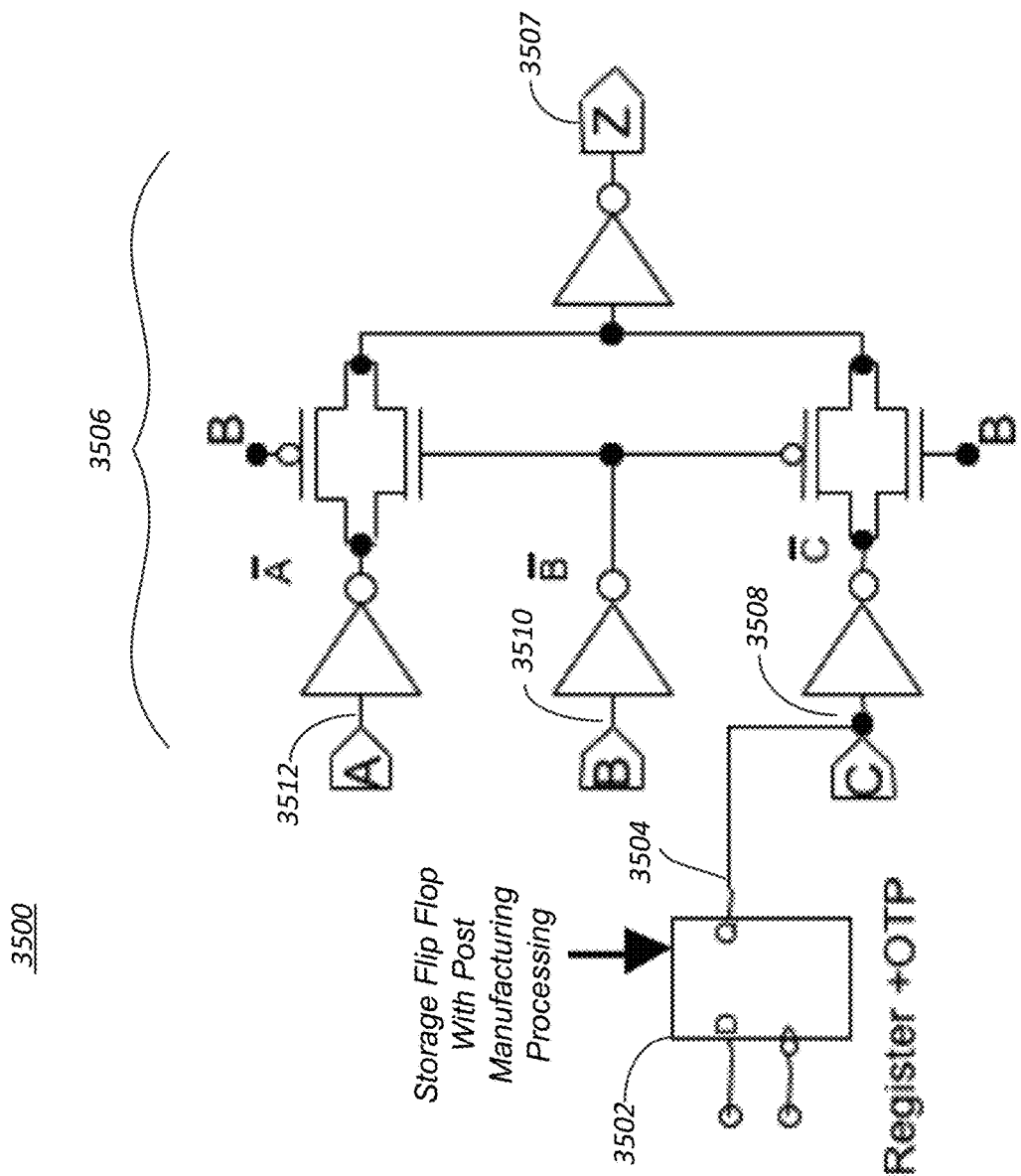
FIG. 35 is a diagram of a circuit with post manufacturing one time programmable capability.

FIG. 35 is a diagram of a circuit 3500 with post manufacturing OTP capability. The programming technique uses a high voltage (4-6 V) to blow off the device gate oxide creating leakage so that the output of the device is changed from a logical one to a logical zero. The circuit 3500 comprises a high voltage OTP flip flop 3502 having an output Q 3504 that can be altered by post-manufacturing programming and a alterable logic circuit 3506. The output 3504 of the flip flop drives an input of the alterable logic circuit 3506 having an output 3507 logic function that is at least partially based on the logical value or hit content of the output 3504 of the flip flop 3502. For example, the alterable logic circuit 3506 has provides a different logical output Z 3506 from inputs A 3512 and B 3510 depending on the value of input C. If the output of the flip flop at drives the logical value at pin C, programming the OTP flip flop 3502 determines the logical function of the alterable logic circuit 3506. After the flip flop output 3504 is programmed by the end user, the circuit 3506 performs a unique logic function which is only known to the end user. Again, these cells used for the OTP flip flop 3502 will be residing among a sea of gates and will be misinterpreted by reverse engineering as a normal logic circuit.

Figure 36:
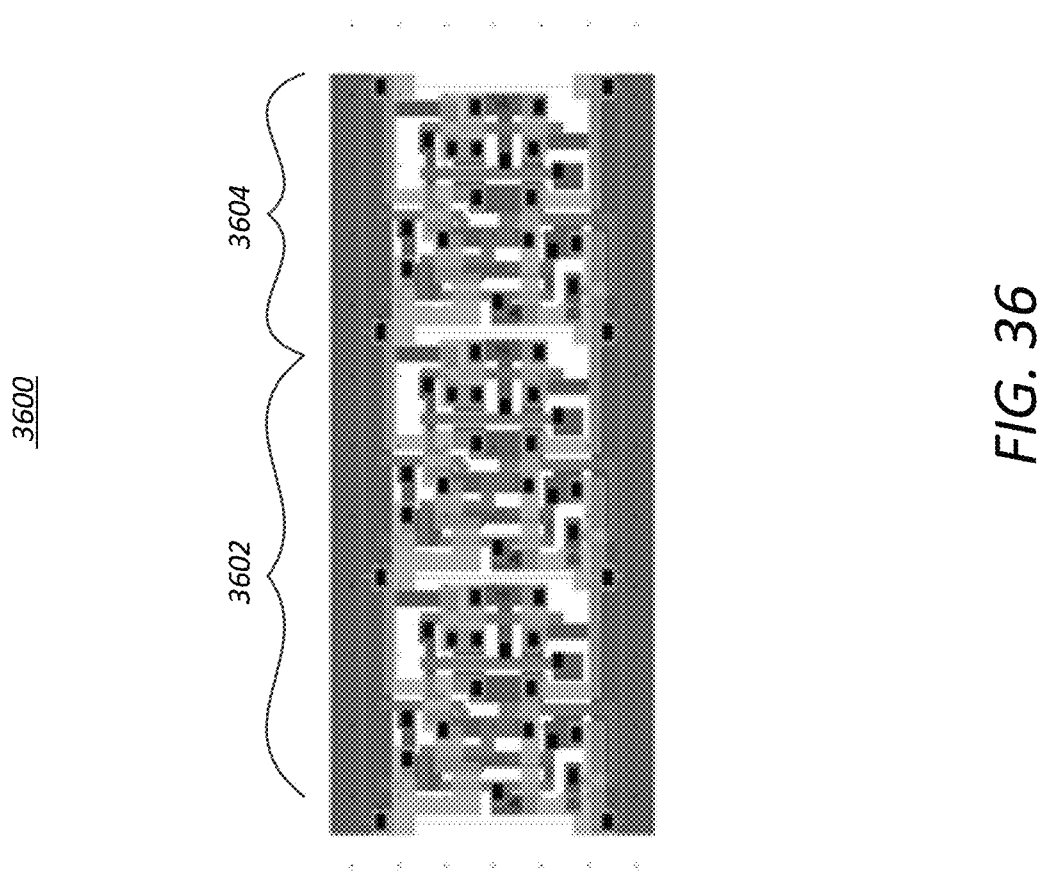
FIG. 36 is a diagram illustrating an exemplary planar layout of a post-manufacturing programmable OTP cell circuit.

FIG. 36 is a diagram illustrating an exemplary planar layout of a post-manufacturing programmable OTP cell circuit. The circuit 3600 comprises a first area 3602 implementing a storage flip flop with post manufacturing OTP capability, such as flip flop 3502 and a second area 3604 implementing the alterable logic circuit 3506.

FPGA Configuration Manager

The ASIC 100 portion of a field programmable gate array (FPGA) device performs critical tasks related to configuring the FPGA portion of the chip and securing the configuration bitstream. Accordingly, it is important to prevent compromise of the functions performed by the FPGA configuration manager itself. This can be accomplished by a PUCS-based implementation enhances both the protection of the FPGA's configuration bitstream as well as the functions and data contained in the FPGA configuration manager block. The incorporation of PUGS elements in the FPGA bitstream and configuration manager blocks protects the design-sensitive functions and data from being extracted from a highly configurable FPGA device.

Analog and Mixed Signal IP

PUCS can be employed to design an analog or mixed signal device whose apparent function differs from its actual function. Utilizing unclonable PUCS elements in the analog or mixed signal circuit design can present a significant deterrent to analysis and cloning of an analog or mixed signal ASIC 100.

PUCS camouflage cells 3100 and 3200 can be used to connect extraneous analog components that appear to modify a signal but in fact do not. For example, the layout of the logic cells on the ASIC 100 may appear to present a 16-bit digital to analog (D/A) converter, but the input to D/A converter may in fact be scrambled 8 bits. In another example, a layout of the logical cells may indicate that the circuit is a two-stage amplifier, but the circuit may in fact provide single stage amplifier or a hidden ratio between current sources. Unlike many digital designs, circuit parasitics may become important, hence, modeling parasitics may become an important factor when utilizing PUCS in analog circuitry. This can accomplished by incorporating PUCS elements into traditional analog or mixed devices.

Full Custom Digital Design

In contrast to the use of camouflaged foundry standard cell libraries, PUCS elements can be integrated into a completely unique custom cell logic library or custom design that is not based on any foundry standard cell logic library. PUCS primitives can be applied to full custom circuit designs or a portion of a conventional design. While full custom circuit designs are inherently more difficult to reverse engineer than standard cell circuits, they certainly are not immune to attack. Incorporation of PUCS to a full custom circuit provides another layer of protection against analysis, IP theft, and counterfeit parts.

Figure 37:
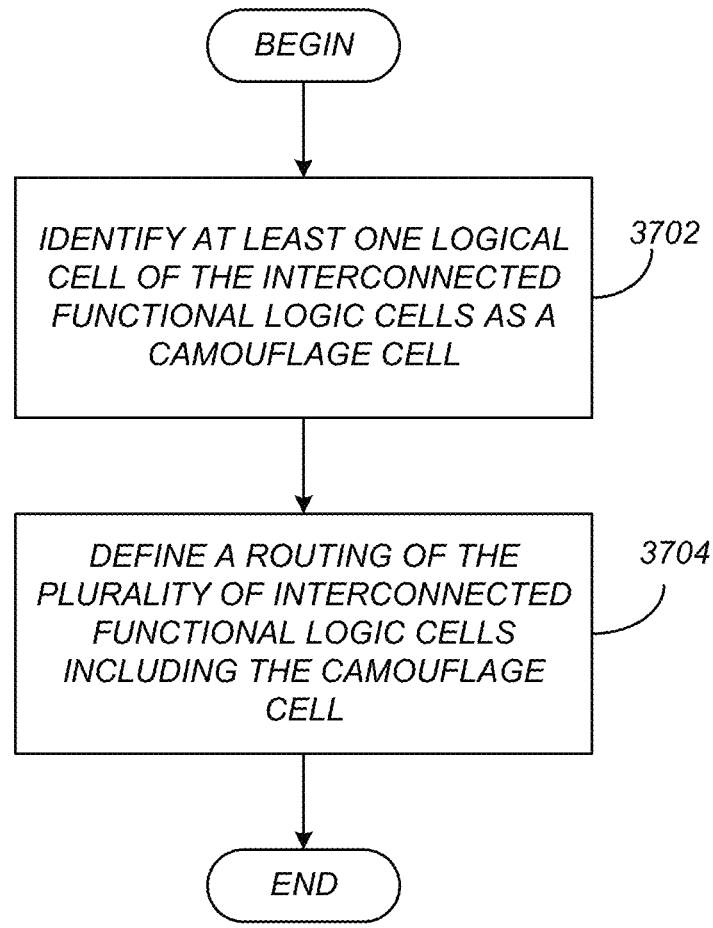
FIG. 37 is diagram depicting a flow chart describing one embodiment of how an ASIC using PUCS technology may be fabricated.

FIG. 37 is diagram depicting a flow chart describing one embodiment of how an ASIC 100 using PUCS technology may be fabricated. In block 3702, at least one cell of the interconnected functional logic cells of an ASIC design is identified as a camouflage cell 3100, 3200. A routing is defined of the plurality of interconnected functional logic cells including the camouflage cell, as shown in block 3704. When fabricating the ASIC 100 itself, the "always off" camouflage cells 3100 are fabricated by the usual methods, but using oppositely doped semiconductor material for the camouflage implant region 3108, and the "always" on camouflage cells 3200 are fabricated by the usual methods as well, except that they too are oppositely doped, and the masks for the source and gain region 3204 are reduced in size to pull them away from the gate 3010, and the camouflage implant regions 3208 are extended to contact the edge of the pulled back source and gain regions.

Figure 38:
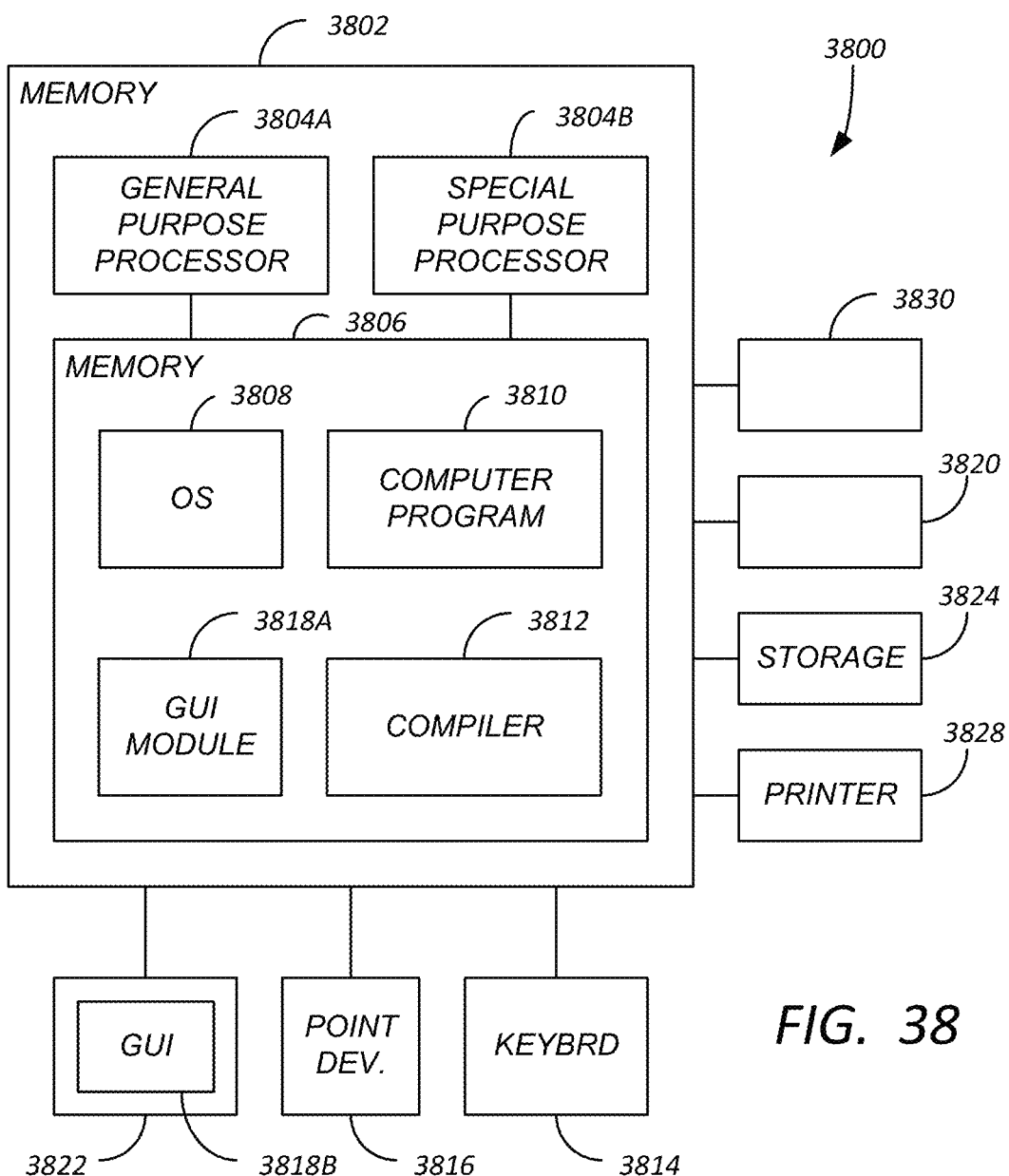
FIG. 38 illustrates an exemplary computer system that could be used to implement the camouflaging process.

FIG. 38 is a diagram illustrating an exemplary computer system 3800 that could be used to implement elements the present invention. The computer system 3800 comprises a computer 3802 that can include a general purpose hardware processor 3804A and/or a special purpose hardware processor 3804B (hereinafter alternatively collectively referred to as processor 3804) and a memory 3806, such as random access memory (RAM). The computer 3802 may be coupled to other devices, including input/output (I/O) devices such as a keyboard 3814, a mouse device 3816 and a printer 3828.

In one embodiment, the computer 3802 operates by the general purpose processor 3804A performing instructions defined by the computer program 3810 under control of an operating system 3808. The computer program 3810 and/or the operating system 3808 may be stored in the memory 3806 and may interface with the user and/or other devices to accept input and commands and, based on such input and commands and the instructions defined by the computer program 3810 and operating system 3808 to provide output and results.

Output/results may be presented on the display 3822 or provided to another device for presentation or further processing or action. In one embodiment, the display 3822 comprises a liquid crystal display (LCD) having a plurality of separately addressable pixels formed by liquid crystals. Each pixel of the display 3822 changes to an opaque or translucent state to form a part of the image on the display in response to the data or information generated by the processor 3804A from the application of the instructions of the computer program 3810 and/or operating system 3808 to the input and commands. Other display 3822 types also include picture elements that change state in order to create the image presented on the display 3822. The image may be provided through a graphical user interface (GUI) module 3818A. Although the GUI module 3818A is depicted as a separate module, the instructions performing the GUI functions can be resident or distributed in the operating system 3808, the computer program 3810, or implemented with special purpose memory and processors.

Some or all of the operations performed by the computer 3802 according to the computer program 3810 instructions may be implemented in a special purpose processor 3804B. In this embodiment, some or all of the computer program 3810 instructions may be implemented via Firmware instructions stored in a read only memory (ROM), a programmable read only memory (PROM) or flash memory within the special purpose processor 3804B or in memory 3806. The special purpose processor 3804B may also be hardwired through circuit design to perform some or all of the operations to implement the present invention. Further, the special purpose processor 3804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 3802 may also implement a compiler 3812 which allows an application program 3810 written in a programming language such as COBOL, C++, FORTRAN, or other language to be translated into processor 3804 readable code. After completion, the application or computer program 3810 accesses and manipulates data accepted from I/O devices and stored in the memory 3806 of the computer 3802 using the relationships and logic that was generated using the compiler 3812.

The computer 3802 also optionally comprises an external communication device such as a modem, satellite link, Ethernet card, or other device for accepting input from and providing output to other computers.

In one embodiment, instructions implementing the operating system 3808, the computer program 3810, and/or the compiler 3812 are tangibly embodied in a computer-readable medium, e.g., hard drive 3824 and/or data storage device 3820, which could include one or more fixed or removable data storage devices, such as a zip drive, floppy disc drive 3824, CD-ROM drive, tape drive, or a flash drive. Further, the operating system 3808 and the computer program 3810 are comprised of computer program instructions which, when accessed, read and executed by the computer 3802, causes the computer 3802 to perform the steps necessary to implement and/or use the present invention or to load the program of instructions into a memory, thus creating a special purpose data structure causing the computer to operate as a specially programmed computer executing the method steps described herein. Computer program 3810 and/or operating instructions may also be tangibly embodied in memory 3806 and/or data communications devices 3830, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 3802.

Although the term "computer" is referred to herein, it is understood that the computer may include portable devices such as cellphones, notebook computers, pocket computers, or any other device with suitable processing, communication, and input/output capability.

CONCLUSION

This concludes the description of the preferred embodiments of the present invention. In summary, the present invention describes a method and apparatus for camouflaging an circuit and a circuit formed by the camouflaging process. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A camouflaged application specific integrated circuit (ASIC), comprising:
   a plurality of interconnected functional logic cells that together perform one or more ASIC logical functions;

wherein the plurality of interconnected functional logic cells comprise:
an uncamouflaged functional cell performing a first functional logic cell function and having a first planar layout; and
a camouflaged functional cell performing a second functional logic cell function and having a second planar layout indistinguishable from the first planar layout.

2. The ASIC of claim 1, wherein:
the first planar layout is of same physical dimensions as the second planar layout.

3. The ASIC of claim 1, wherein the camouflaged functional cell comprises:
a source region of a first conductivity type;
a drain region of the first conductivity type;
a camouflage region of a second conductivity type disposed between the source region and the drain region; and
a gate;
wherein the camouflage region prevents a conduction channel between the source region and the drain region independent of a gate voltage.

4. The ASIC of claim 3, wherein the camouflage region renders the camouflaged functional cell always off.

5. The ASIC of claim 4, wherein the camouflage region comprises a lightly doped region of the second conductivity type.

6. The ASIC of claim 5, wherein:
the source region and the drain region are disposed in a well region;
the camouflage region comprises a source camouflage region adjacent the source region and a drain camouflage region adjacent the drain region; and
the camouflaged functional cell further comprises:
a conductive layer, having a source conductive layer portion disposed in conductive contact with the source region and a drain conductive layer portion disposed in conductive contact with the drain region, wherein:
the source conductive layer portion is conductively isolated from the source camouflage region and the drain conductive layer portion is conductively isolated from the drain camouflage region.

7. The ASIC of claim 6, wherein:
the source conductive layer portion is conductively isolated from the source camouflage region and the drain conductive layer portion is conductively isolated from the drain camouflage region by a spacer disposed between the source conductive layer portion and the drain conductive layer portion.

8. The ASIC of claim 7, wherein the spacer is disposed between the gate and the source region and the drain region.

9. The ASIC of claim 3, wherein:
the camouflaged functional cell is of a first camouflage cell configuration; and
the plurality of interconnected functional logic cells comprise a second camouflaged functional cell of the first camouflage cell configuration, the second camouflaged functional cell comprising:
a second camouflage cell source region of the second conductivity type;
a second camouflage cell drain region of the second conductivity type; and
a second camouflage region of the first conductivity type disposed between the source region and the drain region;

wherein the second camouflage region renders the second camouflaged functional cell always off the second camouflaged functional cell having a planar layout indistinguishable from the first planar layout.

10. The ASIC of claim 9, wherein the camouflaged functional cell and the second camouflaged functional cell comprise a logic buffer.

11. The ASIC of claim 1, wherein:
the camouflaged functional cell is of the first planar layout; and
the plurality of interconnected functional logic cells comprise a second camouflaged functional cell of the second planar layout.

12. The ASIC of claim 11, wherein the camouflaged functional cell and the second camouflaged functional cell together comprise a logic buffer.

13. The ASIC of claim 1, wherein:
at least a subset of the interconnected functional logic cells together comprise a one time programmable logic circuit having the camouflaged functional cell.

14. The ASIC of claim 1, wherein:
at least a subset of the interconnected functional logic cells together comprise:
a logic circuit having a plurality of inputs and a logical circuit output; and
a one time programmable circuit having a one time programmable circuit output communicatively coupled to at least one of the plurality of inputs, the one time programmable circuit further comprising the camouflaged functional cell.

15. The ASIC of claim 1, wherein:
at least a subset of the interconnected functional logic cells together comprise a field programmable gate array configuration manager block having the camouflaged functional cell.

16. The ASIC of claim 1, wherein:
at least a subset of the interconnected functional logic cells together comprise a memory controller having the camouflaged functional cell.

17. The ASIC of claim 1, wherein:
at least a subset of the plurality of interconnected functional logic cells together comprise a challenge-response authentication function containing the camouflaged functional cell.

18. The ASIC of claim 1, wherein:
at least a subset of the plurality of interconnected functional logic cells together comprise logic to compute on-chip encryption keys containing the camouflaged functional cell.

19. The ASIC of claim 1, wherein:
at least a subset of the plurality of interconnected functional logic cells together comprise on-chip identifiers containing the camouflaged functional cell.

20. The ASIC of claim 1, wherein:
at least a subset of the plurality of interconnected functional logic cells together comprise analog or mixed-signal processing circuitry containing the camouflaged functional cell.

21. A method of camouflaging an application specific integrated circuit (ASIC), comprising:
defining a plurality of interconnected functional logic cells that together perform one or more ASIC logical functions, wherein the plurality of interconnected functional logic cells comprise:
an uncamouflaged functional cell performing a first functional logic cell function and having a first planar layout;

a camouflaged functional cell performing a second functional logic cell function different from the first functional logic cell function and having a second planar layout indistinguishable from the first planar layout; and defining a routing of the plurality of interconnected functional logical cells, including the camouflaged functional cell.

22. The method of claim 21, wherein the camouflaged functional cell comprises:
a source region of a first conductivity type;
a drain region of the first conductivity type;
a camouflage region of a second conductivity type disposed between the source region and the drain region; and
a gate;
wherein the camouflage region prevents a conduction channel between the source region and the drain region.

23. An apparatus for camouflaging an application specific integrated circuit (ASIC) comprising:
a silicon compiler configured for defining a plurality of interconnected functional logic cells that together perform one or more ASIC logical functions, wherein the plurality of interconnected functional logic cells comprise:
an uncamouflaged functional cell performing a first functional logic cell function and having a first planar layout;
a camouflaged functional cell performing a second functional logic cell function and having a second planar layout indistinguishable from the first planar layout; and
a place and route program for defining a routing of the plurality of interconnected functional logical cells, including the camouflaged functional cell.

24. A camouflaged application specific integrated circuit (ASIC), comprising:
a plurality of interconnected functional logic cells that together perform one or more ASIC logical functions;
wherein the plurality of interconnected functional logic cells comprise:
an uncamouflaged functional cell performing a first functional logic cell function and having a first planar layout; and
a camouflaged functional cell performing a second functional logic cell function and having a second planar layout differing from the first planar layout by a substantially indistinguishable pull back of a source region and a drain region from a gate of the camouflaged functional cell.

25. The ASIC of claim 24, wherein the source region and the drain region are of a first conductivity type, and the camouflaged functional cell further comprises:
a camouflage region of a second conductivity type disposed between the source region and the drain region; and
wherein the camouflage region forms a gate voltage independent conduction channel between the source region and the drain region.

26. The ASIC of claim 25, wherein the camouflage region renders the camouflaged functional cell always on.

27. The ASIC of claim 26, wherein the camouflage region comprises a lightly doped region of the second conductivity type.

28. The ASIC of claim 27, wherein:
the source region and the drain region are disposed in a well region;
the camouflage region comprises a source camouflage region adjacent the source region and a drain camouflage region adjacent the drain region; and
the camouflaged functional cell further comprises:
a conductive layer, having a source conductive layer portion disposed in conductive contact with the source region and a drain conductive layer portion disposed in conductive contact with the drain region, wherein:
the source conductive layer portion is conductively coupled to the source camouflage region and the drain conductive layer portion is conductively coupled to the drain camouflage region.

29. The ASIC of claim 28, wherein:
the source region is conductively coupled to the source camouflage region via the source conductive layer portion and the drain region is conductively coupled to the drain camouflage region via the drain conductive layer portion.

30. The ASIC of claim 29, wherein a spacer is disposed between the gate and the source region and the drain region.

31. The ASIC of claim 29, wherein:
the source region contacts the source conductive layer portion along a source contact surface;
the drain region contacts the drain conductive layer portion along a drain contact surface;
the source contact surface extends a pull back distance D less than the source contact surface of the first planar layout; and
the drain contact surface extends a pull back distance D less than the drain contact surface of the first planar layout.

32. The ASIC of claim 25, wherein:
the camouflaged functional cell is of a second camouflage cell configuration; and
the plurality of interconnected functional logic cells comprise a second camouflaged functional cell of the second camouflage cell configuration, the second camouflaged functional cell comprising:
a second camouflage cell source region of the second conductivity type;
a second camouflage cell drain region of the second conductivity type; and
a second camouflage region of the first conductivity type disposed between the source region and the drain region;
wherein the second camouflage region renders the second camouflaged functional cell always on, the second camouflaged functional cell having a planar layout differing from the first planar layout by a substantially indistinguishable pull back of the source region of the second camouflage functional cell and the drain region of the second camouflage functional cell from a gate of the second camouflaged functional cell.

33. The ASIC of claim 32, wherein the camouflaged functional cell and the second camouflaged functional cell comprise a logic buffer.

34. The ASIC of claim 24, wherein:
the camouflaged functional cell is of the first planar layout; and
the plurality of interconnected functional logic cells comprise a second camouflaged functional cell of the second planar layout.

35. The ASIC of claim 34, wherein the camouflaged functional cell and the second camouflaged functional cell together comprise a logic buffer.

36. The ASIC of claim 24, wherein:
at least a subset of the interconnected functional logic cells together comprise a one time programmable logic circuit having the camouflaged functional cell.

37. The ASIC of claim 24, wherein:
at least a subset of the interconnected functional logic cells together comprise:
  a logic circuit having a plurality of inputs and a logic circuit output; and
  a one time programmable circuit having a one time programmable circuit output communicatively coupled to at least one of the plurality of inputs, the one time programmable circuit further comprising the camouflaged functional cell.

38. The ASIC of claim 24, wherein:
at least a subset of the interconnected functional logic cells together comprise a field programmable gate array configuration manager block having the camouflaged functional cell.

39. The ASIC of claim 24, wherein:
at least a subset of the interconnected functional logic cells together comprise a memory controller having the camouflaged functional cell.

40. The ASIC of claim 24, wherein:
at least a subset of the plurality of interconnected functional logic cells together comprise a challenge-response authentication function containing the camouflage functional cell.

41. The ASIC of claim 24, wherein:
at least a subset of the plurality of interconnected functional logic cells together comprise logic to compute on-chip encryption keys containing the camouflage functional cell.

42. The ASIC of claim 24, wherein:
at least a subset of the plurality of interconnected functional logic cells together comprise on-chip identifiers containing the camouflage functional cell.

43. The ASIC of claim 24, wherein:
at least a subset of the plurality of interconnected functional logic cells together comprise analog or mixed-signal processing circuitry containing the camouflage functional cell.

44. A method of camouflaging an application specific integrated circuit (ASIC), comprising:
defining a plurality of interconnected functional logic cells that together perform one or more ASIC logical functions, wherein the plurality of interconnected functional logic cells comprise:
  an uncamouflaged functional cell performing a first functional logic cell function and having a first planar layout;
  a camouflaged functional cell performing a second functional logic cell function and having a second planar layout substantially indistinguishable from the first planar layout; and
defining a routing of the plurality of interconnected functional logical cells, including the camouflaged functional cell.

45. The method of claim 44, wherein the camouflaged functional cell comprises:
  a source region of a first conductivity type;
  a drain region of the first conductivity type;
  a camouflage region of a second conductivity type disposed between the source region and the drain region; and
  a gate;
  wherein the camouflage region forms a gate voltage independent conduction channel between the source region and the drain region.

46. An apparatus for camouflaging an application specific integrated circuit (ASIC) comprising:
  a silicon compiler configured for defining a plurality of interconnected functional logic cells that together perform one or more ASIC logical functions, wherein the plurality of interconnected functional logic cells comprise:
    an uncamouflaged functional cell performing a first functional logic cell function and having a first planar layout;
    a camouflaged functional cell performing a second functional logic cell function and having a second planar layout differing from the first planar layout by a substantially indistinguishable pull back of a source region and a drain region from a gate of the camouflaged functional cell; and
  a place and route program for defining a routing of the plurality of interconnected functional logical cells, including the camouflaged functional cell.

* * * * *